US011363560B2

(12) United States Patent
Mochizuki et al.

(10) Patent No.: US 11,363,560 B2
(45) Date of Patent: Jun. 14, 2022

(54) COMMUNICATION SYSTEM, TERMINAL DEVICE AND BASE STATION FOR MACHINE TYPE COMMUNICATION

(71) Applicant: Mitsubishi Electric Corporation, Chiyoda-ku (JP)

(72) Inventors: Mitsuru Mochizuki, Tokyo (JP); Miho Maeda, Tokyo (JP); Yasushi Iwane, Tokyo (JP); Takayuki Nonami, Tokyo (JP); Taisei Suemitsu, Tokyo (JP); Yuichi Nakai, Tokyo (JP)

(73) Assignee: Mitsubishi Electric Corporation, Chiyoda-ku (JP)

(*) Notice: Subject to any disclaimer, the term of this patent is extended or adjusted under 35 U.S.C. 154(b) by 0 days.

(21) Appl. No.: 16/713,767

(22) Filed: Dec. 13, 2019

(65) Prior Publication Data

US 2020/0120633 A1  Apr. 16, 2020

Related U.S. Application Data

(60) Division of application No. 16/394,727, filed on Apr. 25, 2019, which is a continuation of application No.
(Continued)

(30) Foreign Application Priority Data

Oct. 1, 2010  (JP) ................................. 2010-223331

(51) Int. Cl.
*H04W 68/00* (2009.01)
*H04W 68/02* (2009.01)
(Continued)

(52) U.S. Cl.
CPC ............. *H04W 68/00* (2013.01); *H04W 4/70* (2018.02); *H04W 68/02* (2013.01); *H04W 84/045* (2013.01)

(58) Field of Classification Search
CPC ....... H04W 68/00; H04W 68/02; H04W 4/70; H04W 84/045
See application file for complete search history.

(56) References Cited

U.S. PATENT DOCUMENTS 5,280,541 A   1/1994  Marko et al.
6,339,588 B1  1/2002  Katsuragawa
(Continued)

FOREIGN PATENT DOCUMENTS

CN    101841911 A    9/2010
CN    102202394      9/2011
(Continued)

OTHER PUBLICATIONS

CATT (Paging and downlink transmission for MTC, 3GPP TSG RAN WG2 Meeting #70).
(Continued)

*Primary Examiner* — Marisol Figueroa
(74) *Attorney, Agent, or Firm* — Oblon, McClelland, Maier & Neustadt, L.L.P.

(57) ABSTRACT

The present invention has an object to provide a communication system capable of avoiding congestion in downlink communication or uplink communication and a shortage of radio resources arising therefrom. In the present invention, in a communication system including a normal user equipment (normal UE) that performs human to human communication and a machine type communication device (MTCD) that performs machine to machine communication, a base station device transmits a paging message to the normal UE and the MTCD for calling the normal UE and the MTCD. The paging message contains, for example, an equipment identity (UE-ID). A maximum number of equipment identities (UE-IDs) that can be accommodated within this paging message is set individually for the normal UE and the MTCD. Alternatively, the paging message contains a calling
(Continued)

indicator in place of the equipment identity of the MTCD (UE-ID of MTCD).

12 Claims, 41 Drawing Sheets

Related U.S. Application Data

15/834,817, filed on Dec. 7, 2017, which is a continuation of application No. 13/877,286, filed as application No. PCT/JP2011/071981 on Sep. 27, 2011, now Pat. No. 9,872,272.

(51) Int. Cl.
*H04W 4/70* (2018.01)
*H04W 84/04* (2009.01)

(56) References Cited

U.S. PATENT DOCUMENTS

| | | | |
|---|---|---|---|
| 6,477,382 | B1 | 11/2002 | Mansfield et al. |
| 6,683,871 | B1 | 1/2004 | Lee |
| 6,765,893 | B1 | 7/2004 | Bayley |
| 7,206,588 | B2 | 4/2007 | Moriguchi |
| 8,619,685 | B2 | 12/2013 | Chun et al. |
| 8,660,064 | B2 | 2/2014 | Lee et al. |
| 8,824,427 | B2 * | 9/2014 | Ryu ............ H04W 72/042 370/336 |
| 9,820,247 | B2 * | 11/2017 | Xiong ............ H04W 4/70 |
| 9,872,272 | B2 | 1/2018 | Mochizuki |
| 10,306,440 | B2 * | 5/2019 | Deng ............ H04W 8/186 |
| 2004/0028207 | A1 | 2/2004 | Kato |
| 2006/0104225 | A1 | 5/2006 | Kim et al. |
| 2007/0099635 | A1 | 5/2007 | Mohanty et al. |
| 2007/0161384 | A1 | 7/2007 | Terry |
| 2009/0253401 | A1 | 10/2009 | Lee |
| 2010/0091720 | A1 | 4/2010 | Chun et al. |
| 2010/0248735 | A1 | 9/2010 | Hamabe et al. |
| 2010/0279715 | A1 | 11/2010 | Alanara et al. |
| 2011/0051668 | A1 | 3/2011 | Lee |
| 2011/0235558 | A1 * | 9/2011 | Diachina ............ H04W 48/02 370/310 |
| 2011/0256898 | A1 | 10/2011 | Higuchi |
| 2011/0310769 | A1 * | 12/2011 | Lee ............ H04L 67/12 370/254 |
| 2011/0310804 | A1 | 12/2011 | Beygzadeh |
| 2012/0004003 | A1 | 1/2012 | Shaheen |
| 2012/0076085 | A1 | 3/2012 | Chou |
| 2013/0028224 | A1 * | 1/2013 | Chen ............ H04W 76/10 370/329 |
| 2013/0114570 | A1 * | 5/2013 | Park ............ H04W 4/70 370/335 |
| 2014/0192720 | A1 | 7/2014 | Lee et al. |
| 2016/0360504 | A1 | 12/2016 | Wanq |
| 2021/0250916 | A1 * | 8/2021 | Mu ............ H04W 4/70 |

FOREIGN PATENT DOCUMENTS

| | | |
|---|---|---|
| GB | 1005312.2 | 3/2010 |
| JP | 2000-32556 A | 1/2000 |
| WO | WO 94/05095 A1 | 3/1994 |
| WO | WO 2004/017541 A1 | 2/2004 |
| WO | WO 2009/013810 A1 | 1/2009 |
| WO | WO 2009/148258 A2 | 12/2009 |

OTHER PUBLICATIONS

Chinese Office Action dated Mar. 6, 2017 in Patent Application No. 201180047787.1 (with Partial English Translation).
Extended European Search Report dated Mar. 24, 2017 in European Application No. 11829077.4.
Combined Chinese Office Action and Search Report dated Oct. 17, 2016 in Patent Application No. 201180047787.1 (with Partial English Translation).
Supplementary Partial European Search Report dated Dec. 15, 2016 in Patent Application 11829077.4.
"RAN Overload Control Solutions" Huawei, 3GPP TSG-RAN WG2, R2-103967, XP050451070, Jun. 21, 2016, pp. 1-5.
Office Action and Search Report dated Apr. 12, 2016 in Chinese Patent Application No. 201180047787.1 (with partial English language translation).
Office Action dated Aug. 28, 2015 in Chinese Patent Application No. 201180047787.1, along with a partial English translation.
International Preliminary Report on Patentability and Written Opinion of the International Searching Authority dated Dec. 6, 2011, in PCT/JP2011/071981 (with English-language translation).
3GPP TSG SA WG2 Meeting #79E (Electronic) TD S2-103183, "Add required function of MTC devices detaching and/or bears deactivating for overload control," HTC, pp. 1 to 3, (Jul. 6-13, 2010).
3GPP TSG SA WG2 Meeting #79E (Electronic) TD S2-103190, "Access restriction control for MTC Groups," Panasonic, pp. 1 to 4, (Jul. 6-13, 2010).
3GPP TS 36.300 V10.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," LTE, pp. 1-183. (Jun. 2010).
3GPP TS 36.331 V9.3.0, "3rd Generation Partnership Project, Technical Specification Group Radio Access Network; Evolved Universal Terrestrial Radio Access (E-UTRA); Radio Resource Control (RRC); Protocol specification (Release 9)," LTE, pp. 1-250. (Jun. 2010).
3GPP TS 36.304 V9.3.0, "3rd Generation Partnership Project; Technical Specification Group Radio Access Network; Evolved Universal Terrestrial Radio Access (E-UTRA); User Equipment (UE) procedures in idle mode (Release 9)," LTE, pp. 1-33, (Jun. 2010).
3GPP TSG-SA1 #42 S1-083461, "LS on HNB/HeNB Open Access Mode," 3GPP SA WG1, Total 2 Pages, (Oct. 13-17, 2008).
3GPP TSG-RAN WG 2 meeting #62 R2-082899, "LS on CSG cell identification," RAN2, Total 2 Pages, (May 5-9, 2008).
3GPP TR 36.814 V9.0.0, "3rd Generation Partnership Project; Technical Specification Group Radio Access Network; Evolved Universal Terrestrial Radio Access (E-UTRA); Further advancements for E-UTRA physical layer aspects (Release 9)," LTE Advanced, pp. 1-104, (Mar. 2010).
3GPP TR 36.912 V9.0.0, 3rd Generation Partnership Project: Technical Specification Group Radio Access Network; Feasibility study for Further Advancements for E-UTRA (LTE-ADvanced) (Release 9), LTE Advanced, pp. 1-146, (Sep. 2009).
3GPP TS 22.368 V2.0.0, "3rd Generation Partnership Project; Technical Specification Group Services and System Aspects; Service requirements for machine-type communications; Stage 1(Release 10)," pp. 1-132, (Mar. 2010).
3GPP TSG-RAN WG3 Meeting #66bis R3-100315, "MTC Features, RAN Enhancements and Related Procedures," CMCC, Total 3 Pages, (Jan. 18-22, 2010).
3GPP TSG-RAN WG2 #70 R2-102962, "RACH Overload Control for MTC Devices," Vodafone, Total 3 Pages, (May 10-14, 2010).
3GPP TSG-RAN2 meeting #70bis R2-104004, "Group paging for Mtc devices," LG Electronics Inc., Total 2 Pages, (Jun. 28-Jul. 2, 2010).
3GPP TSG RAN WG2 #69 R2-102297, "RAN Mechanisms to Distribute RACH Intensity," Vodafone, Total 8 Pages, (Jan. 22-26, 2010).
3GPP TSG RAN WG2 Meeting #70 R2-102781, "Paging and downlink transmission for MTC," CATT, Total 3 Pages, (May 10-14, 2010).
3GPP TS 23. 401 V9.4.0, 3rd Generation Partnership Project: Technical Specification Group Services and System Aspects; General Packet Radio Service (GPRS) enhancements for Evolved Universal Terrestrial Radio Access Network (E-UTRAN) acess (Release 9), pp. 1-258, (Mar. 2010).

(56) References Cited

OTHER PUBLICATIONS

International Search Report dated Dec. 6, 2011 in PCT/JP11/071891 Filed Sep. 27, 2011.
Office Action dated Jul. 3, 2018 in Japanese Patent Application No. 2017-124836 (with English language translation), citing documents therein, 6 pages.
"Pull based RAN overload control", Huawei, China Unicom, 3GPP TSG-RAN WG2 Meeting #71, R2-104870, 4.3.2.3, 2010, 4 pages.
"Consideration on Paging for MTC device", Catt, 3GPP TSG RAN WG2 Meeting #69, R2-101112, 4.3.2, 2010, 2 pages.
Office Action dated Mar. 25, 2019 in Indian Patent Application No. 2385/CHENP/2013, 7 pages.
Japanese Office Action dated May 21, 2019 in Patent Application No. 2018-160322 (with English translation), 6 pages.
"On-Demand SMS for MTC" [online], Alcatel-Lucent Shanghai Bell, Alcatel-Lucent, 3GPP TSG-SA WG2 #81 S2-104497, Internet <URL:http://www.3gpp.org/ftp/tsg_sa/WG2_Arch/TSGS2_81_Prague/Docs/S2-104497.zip>, Sep. 29, 2010, pp. 1-3.
European Search Report dated Jun. 3, 2019 in European Patent Application No. 11 829 077.4.
Office Action dated Sep. 10, 2019 in Japanese Patent Application No. 2018-160322 (with English translation).
Combined Chinese Office Action and Search Report dated Dec. 23, 2019, in Patent Application No. 201711275827.3, 9 pages (with unedited computer generated English translation).
Chinese Office Action dated Jul. 14, 2020 in Patent Application No. 201711275827.3 (with English translation), 8 pages.
Japanese Office Action dated Oct. 27, 2020 in Japanese Application No. 2019-221873 (with Computer Generated English Translation).
3GPP TSG-RAN "New Logical Channel for MTC Applications [online]", WG2#70bis R2-103977, VIA Telecom, 2010, 3 pages.
Decision of Refusal dated Apr. 6, 2021 in Japanese Patent Application No. 2019-221873 (with English language translation), 4 pages.
Combined Chinese Office Action and Search Report dated Jan. 22, 2021 in Chinese Patent Application No. 201711275827.6 (with English translation), 11 pages.
Indian Office Action dated Jan. 29, 2021 in Indian Patent Application No. 201948032675 (with English translation), 6 pages.
Indian Office Action dated Jan. 29, 2021 in Indian Patent Application No. 201948032690 (with English translation), 6 pages.
European Office Action dated May 26, 2021 in European Patent Application No. 20 151 134.2, 8 pages.
Extended European Search Report dated Apr. 7, 2020, in Patent Application No. 20151134.2, 9 pages.
PANASONIC: "Signalling congestion control for MTC Groups", S2-102285, May 4, 2010, XP050434482, 3 pages.
"3rd Generation Partnership Project; Technical Specification Group Radio Access Network; Study on RAN Improvements for Machine-type Communications; (Release 10)", R2-104963, Aug. 27, 2010, XP050452228, 18 pages.
Chinese Office Action dated Oct. 15, 2021 in Chinese Patent Application No. 201711275827.3 (with English translation), 9 pages.
Extended European Search Report dated Mar. 15, 2022, in European Application No. 21211384.9.
"Universal Mobile Telecommunications System (UMTS); Introduction of the Multimedia Broadcast/Multicast Service (MBMS) in the Radio Access Network (RAN); Stage 2 (3GPP TS 25.346 version 8.3.0 Release 8); ETSI TS 125 346", Apr. 2009, 74 pages.

* cited by examiner

F I G. 1
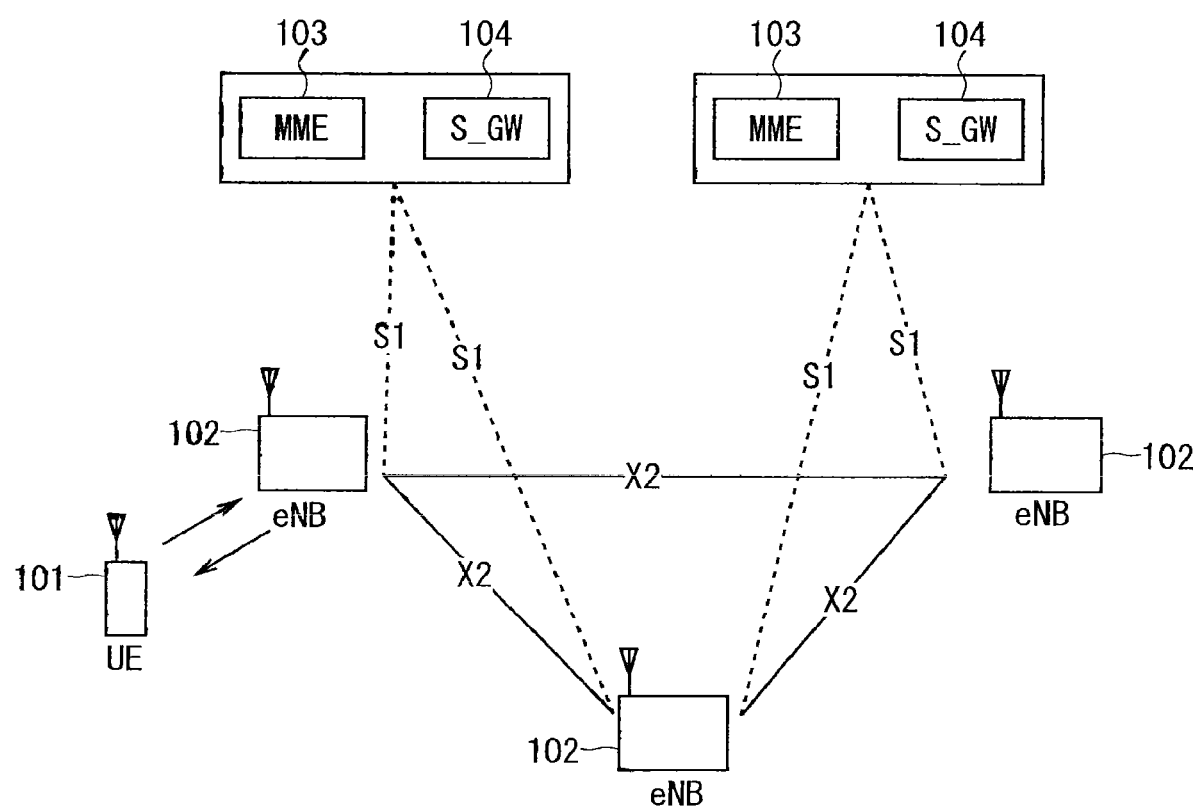

F I G. 2
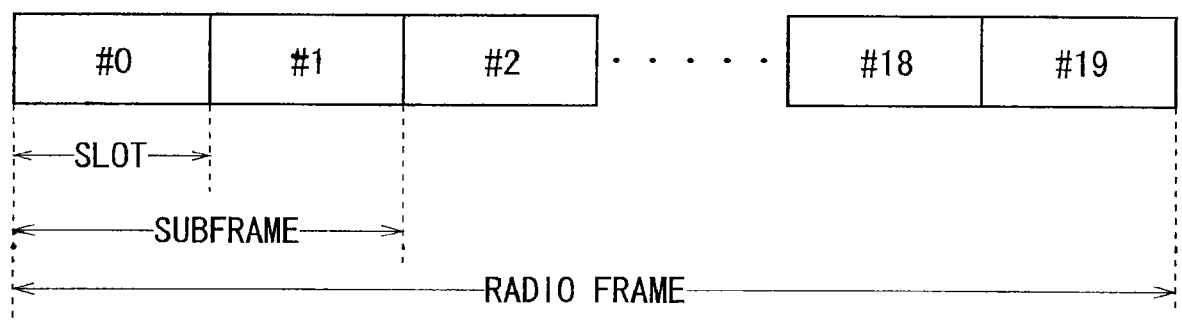

F I G. 4
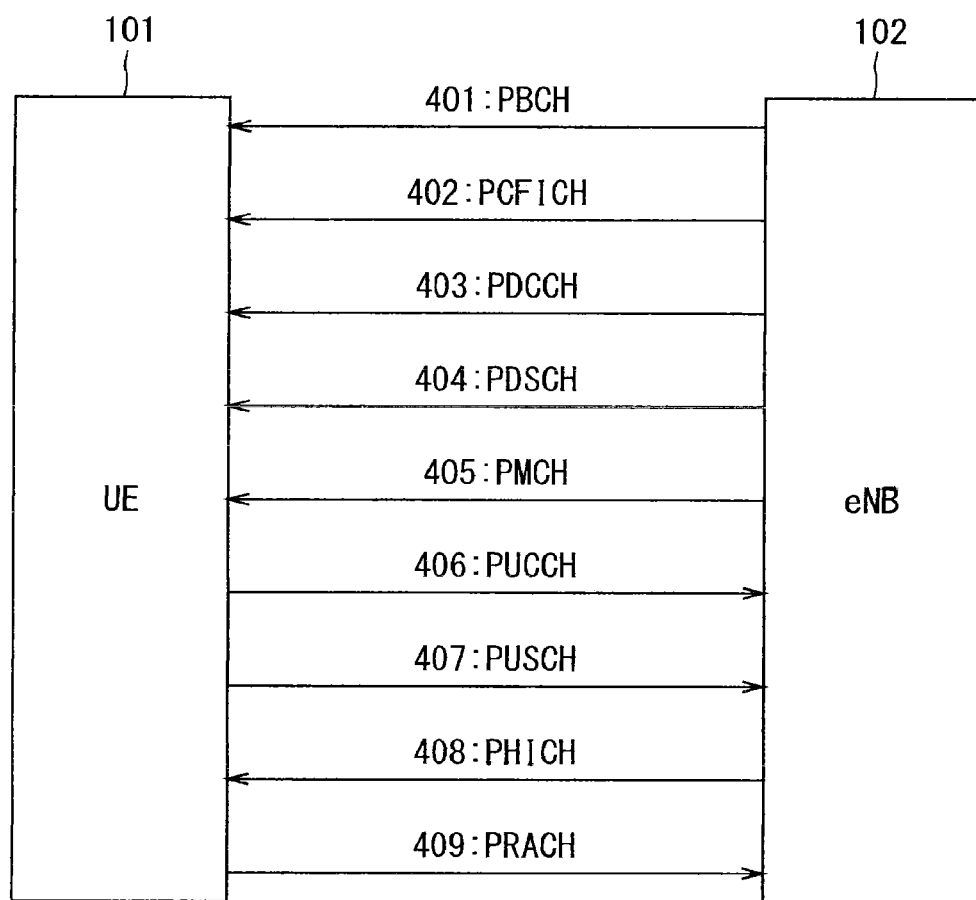

F I G. 5
(A)
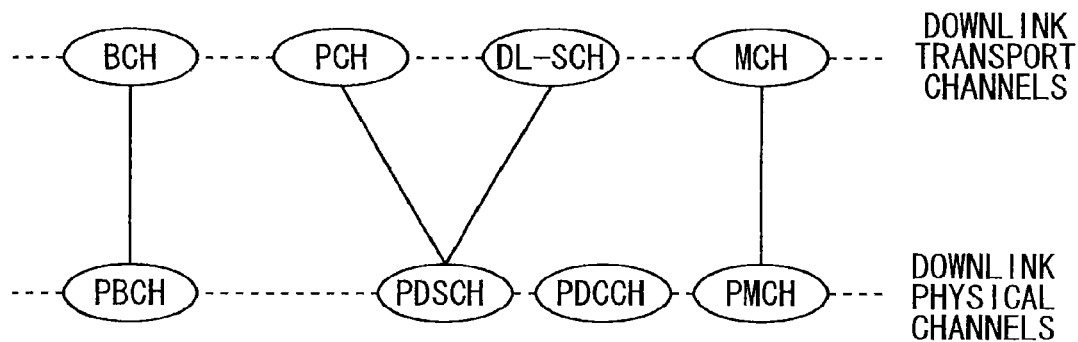
(B)
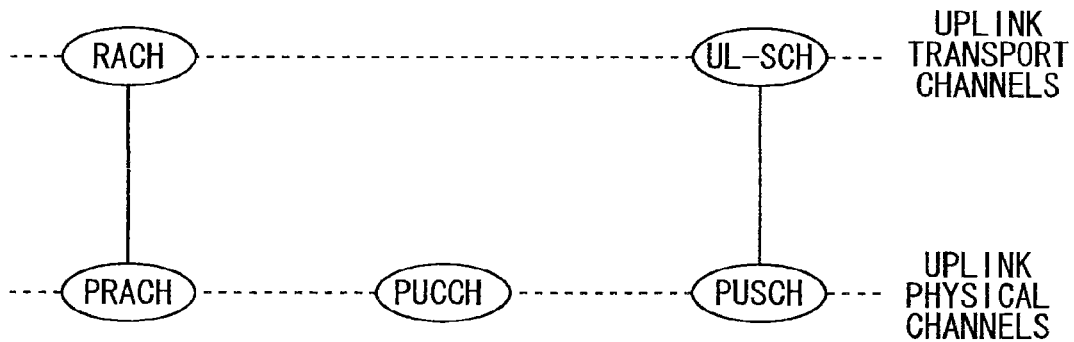

F I G. 6
(A)
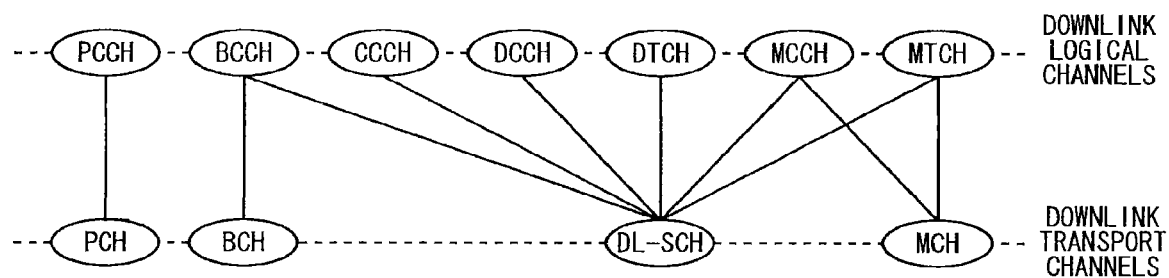
(B)
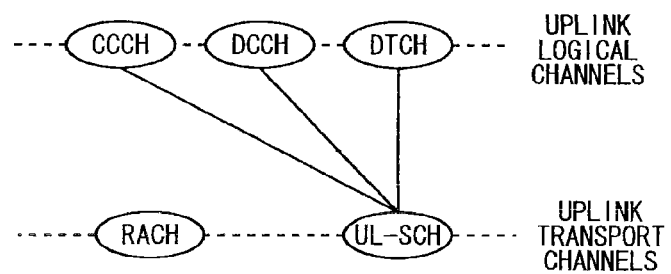

F I G. 1 5

Paging message pagingrecordlist

| 1 | UE-ID of normal UE |
|---|---|
| 2 | UE-ID of normal UE |
| : | : |
| : | : |
| maxpagerec | UE-ID of normal UE | mtc-pagingrecordlist

| 1 | UE-ID of MTCD |
|---|---|
| 2 | UE-ID of MTCD |
| : | : |
| : | : |
| mtc-maxpagerec | UE-ID of MTCD | systeminfomodification etws-indication

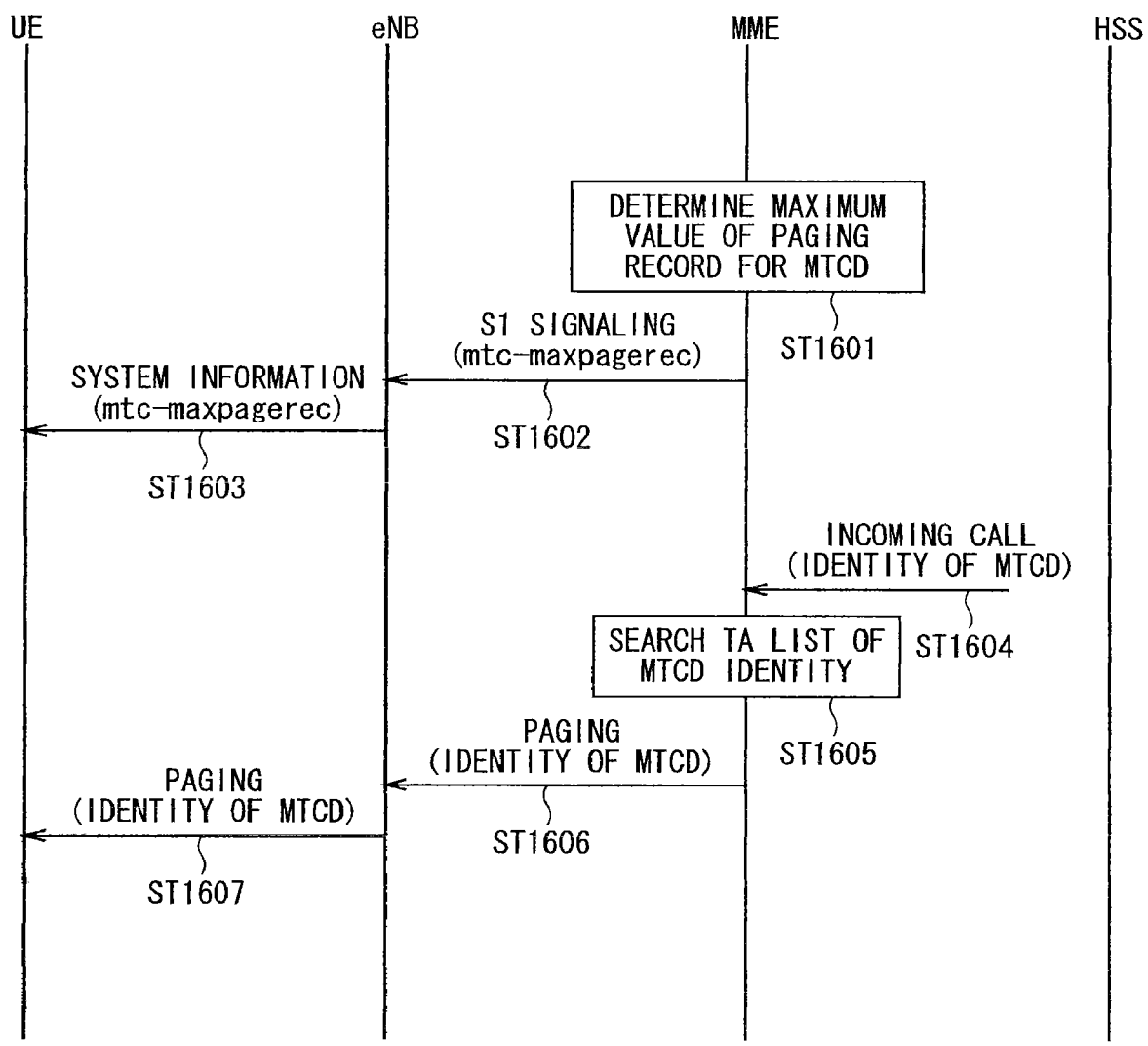
F I G. 1 6

F I G. 1 7

Paging message pagingrecordlist

| 1 | UE-ID of normal UE |
|---|---|
| 2 | UE-ID of normal UE |
| : | : |
| maxpagerec | UE-ID of normal UE | mtc-indication systeminfomodification etws-indication

F I G. 1 9
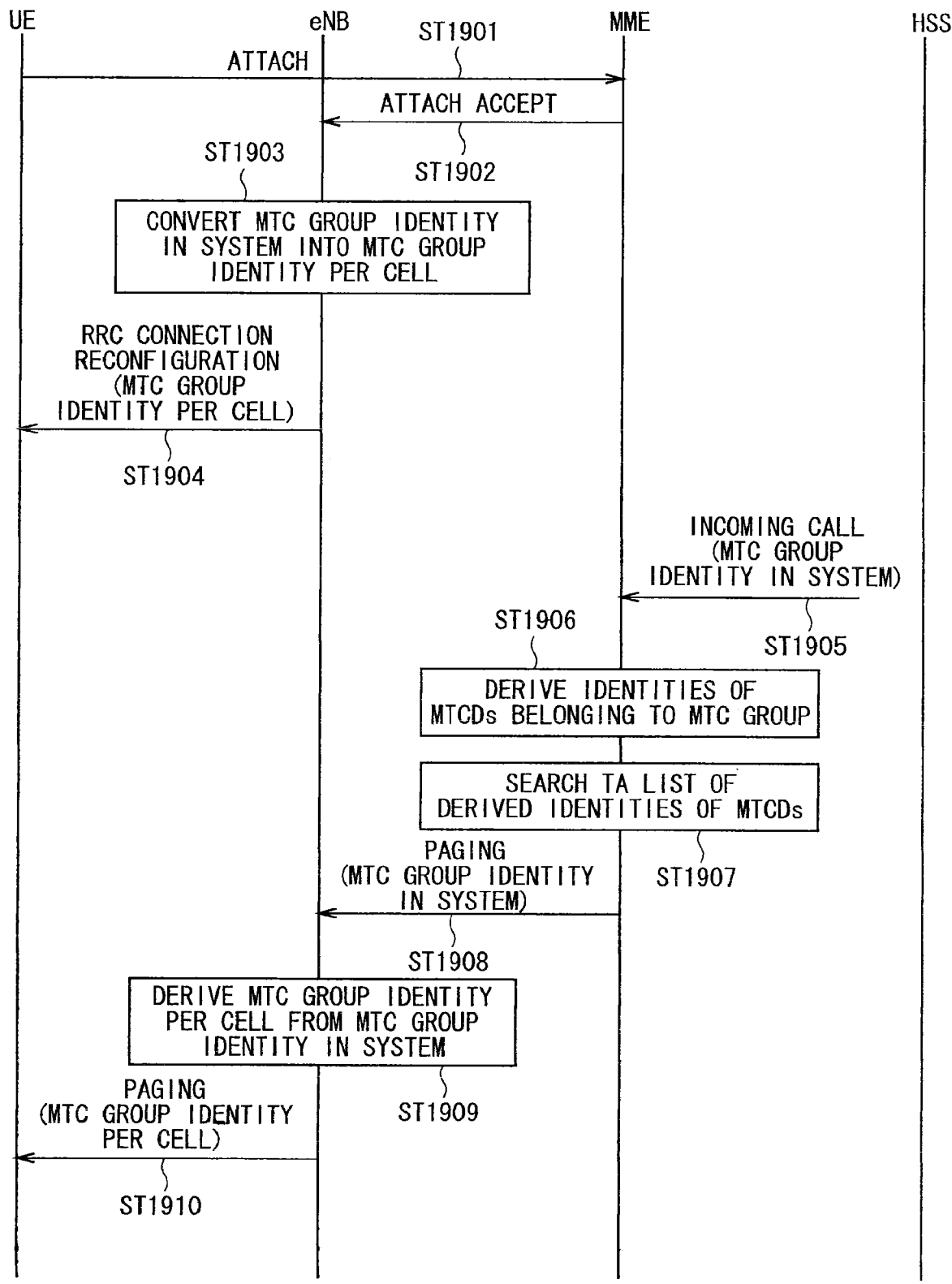

FIG. 20

Normal UE

| Ns | PO when i_s=0 | PO when i_s=1 | PO when i_s=2 | PO when i_s=3 |
|---|---|---|---|---|
| 1 | 9 | N/A | N/A | N/A |
| 2 | 4 | 9 | N/A | N/A |
| 4 | 0 | 4 | 5 | 9 |

FIG. 21

MTCD

| Ns | PO when i_s=0 | PO when i_s=1 | PO when i_s=2 | PO when i_s=3 |
|---|---|---|---|---|
| 1 | 4 | N/A | N/A | N/A |
| 2 | 0 | 5 | N/A | N/A |
| 4 | 1 | 3 | 6 | 8 |

FIG. 22

MTCD

| Ns | PO when i_s=0~3 |
|---|---|
| 1 | 4 |
| 2 | 0 |
| 4 | 1 |

FIG. 23

MTCD

| Ns | PO when i_s=0~3 |
|---|---|
| 1 | 1 |
| 2 | 1 |
| 4 | 1 |

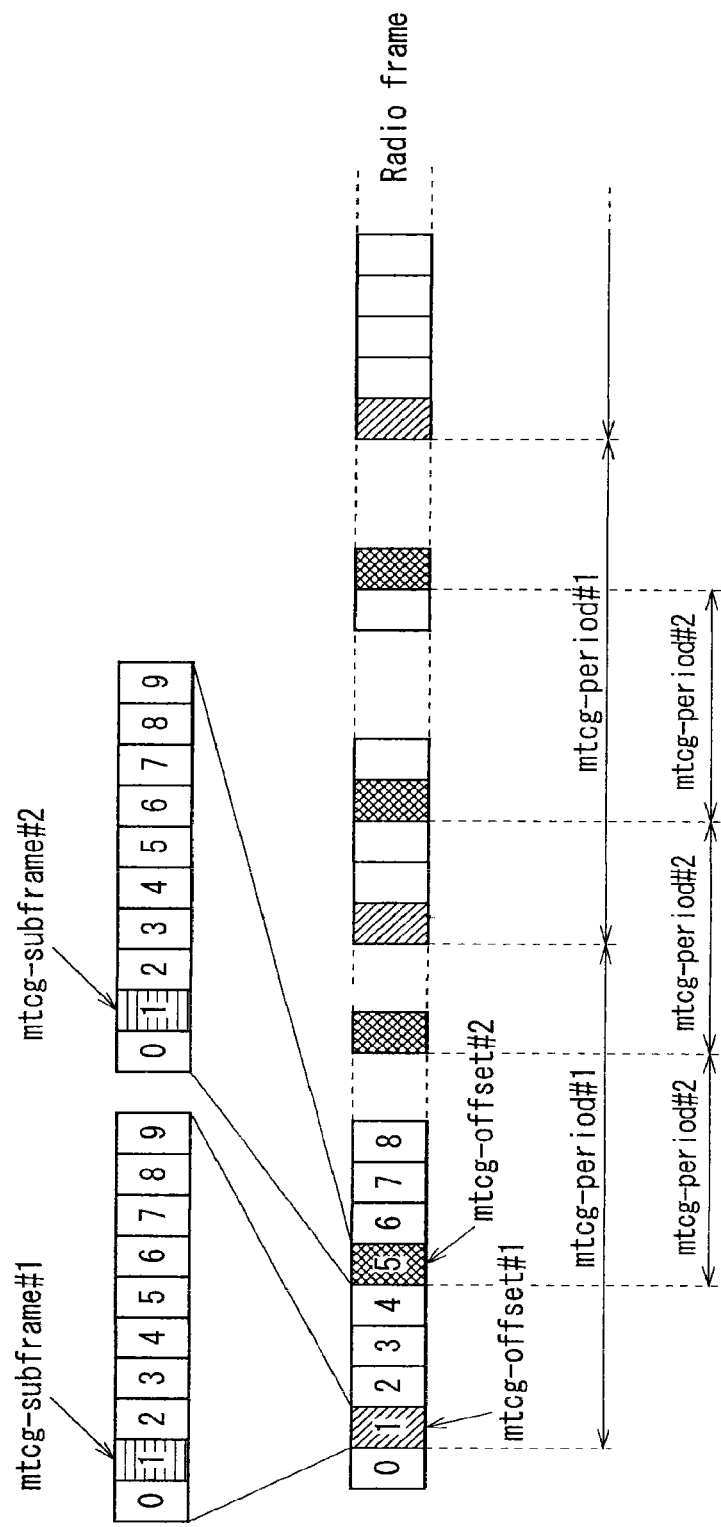
F I G. 27

F I G. 2 9
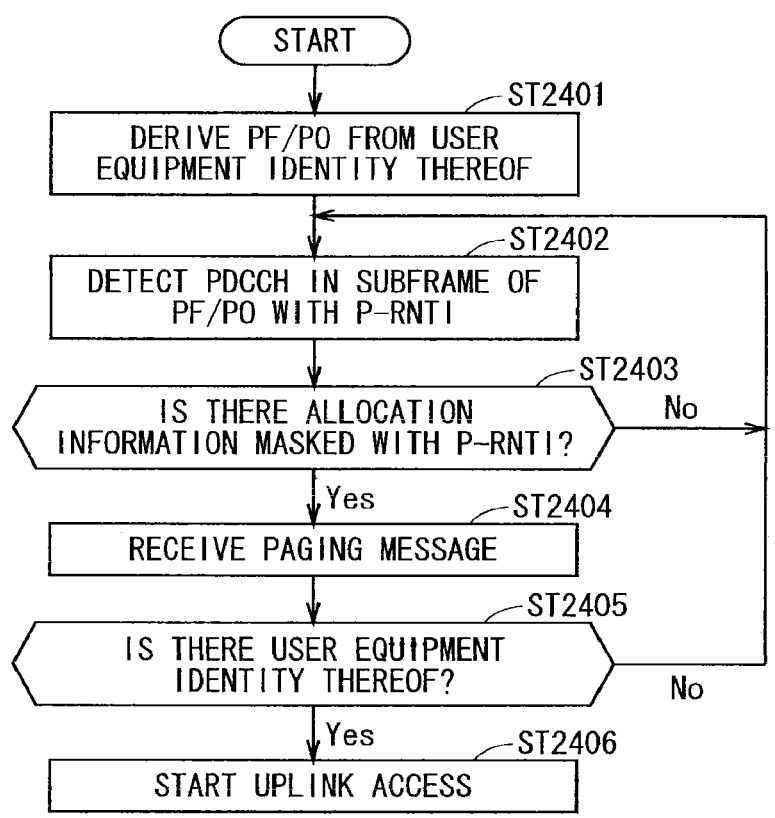

F I G. 3 0
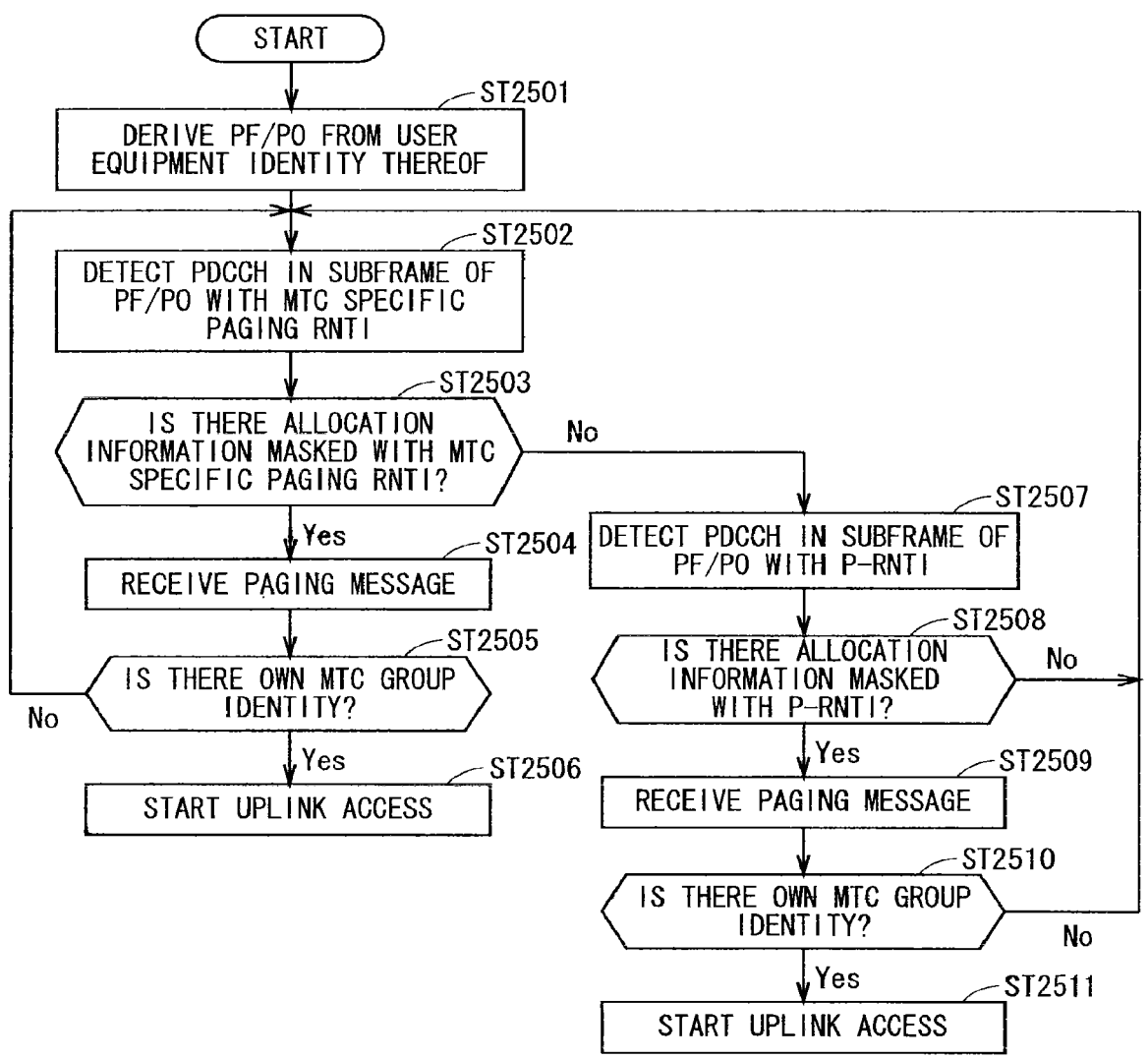

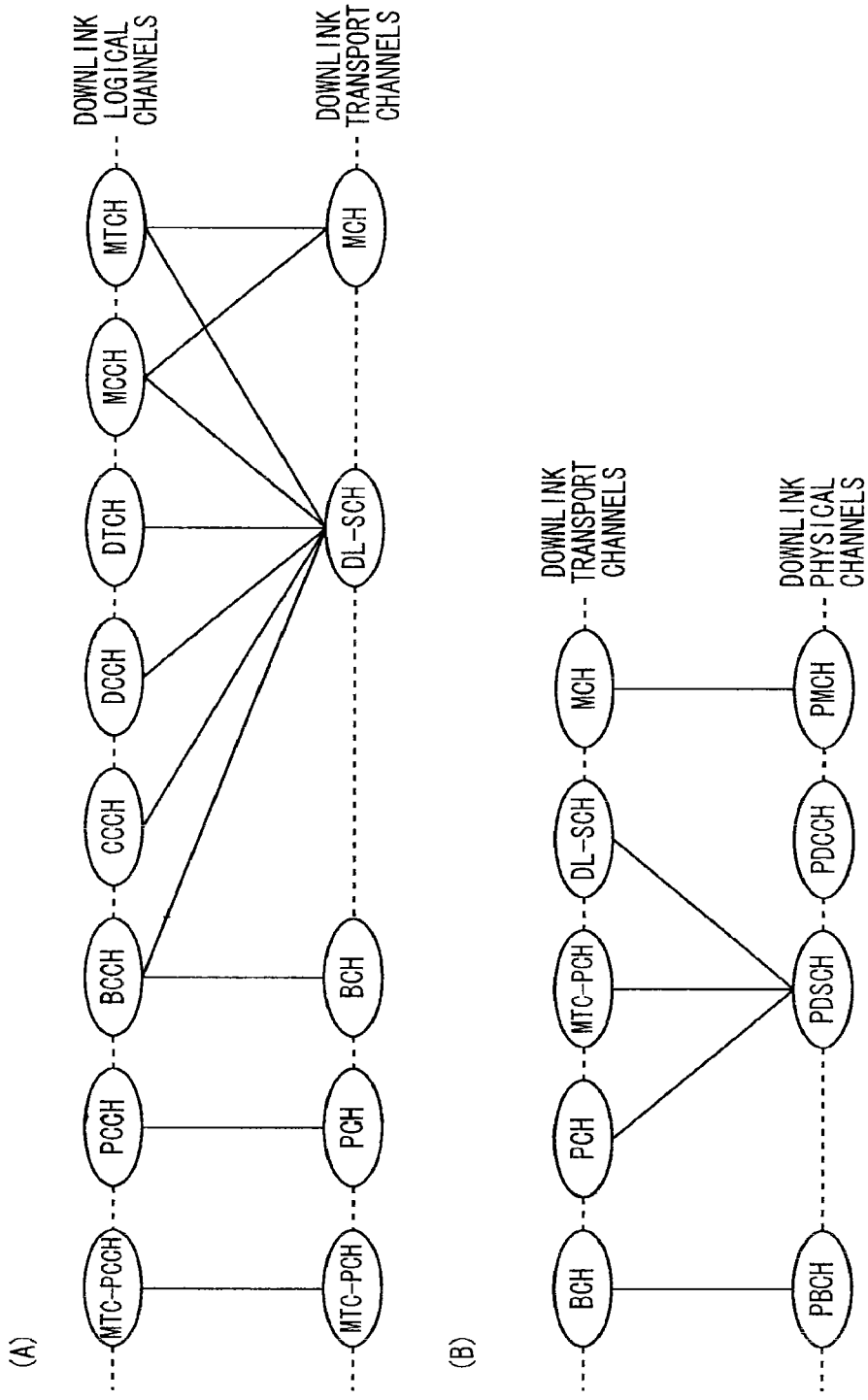

F I G. 3 2
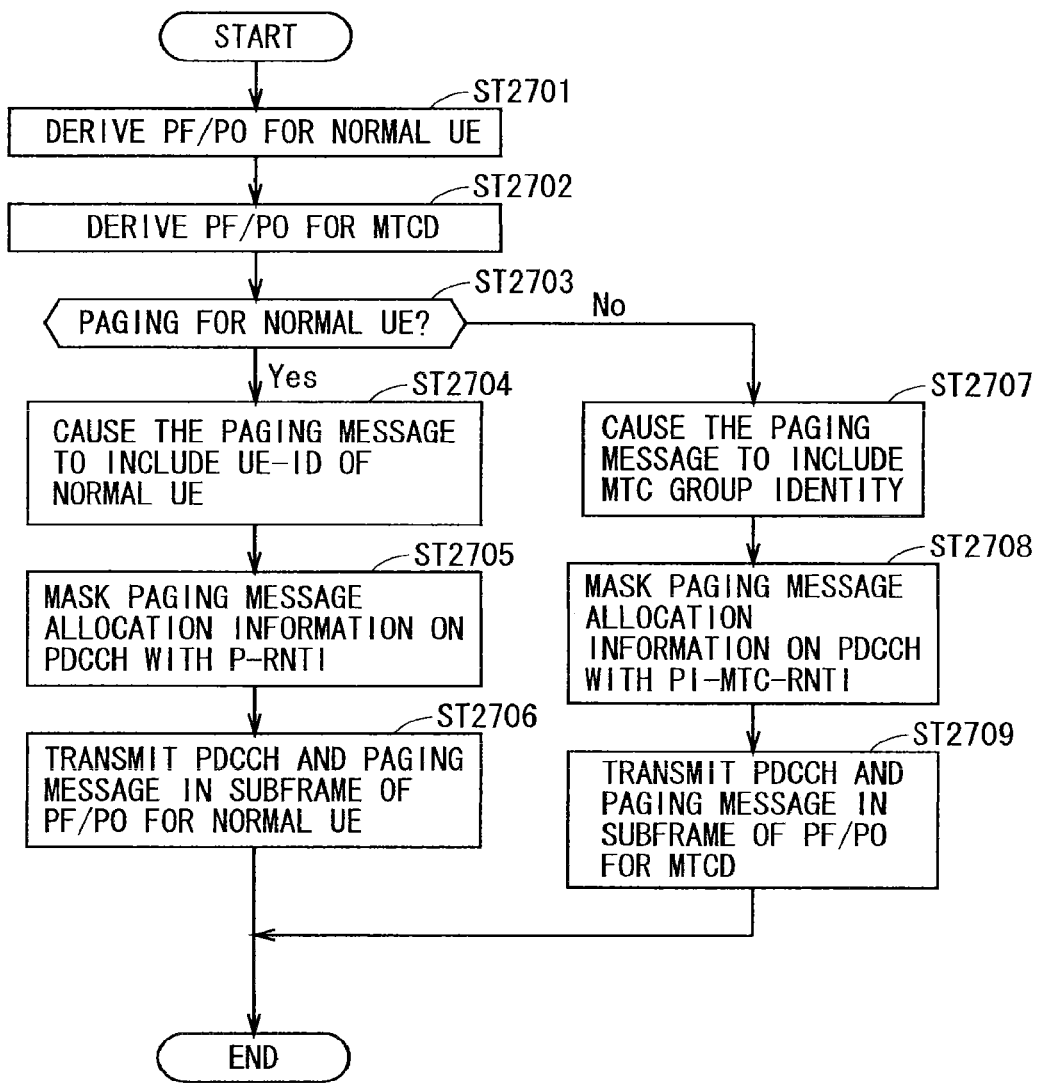

F I G. 3 3
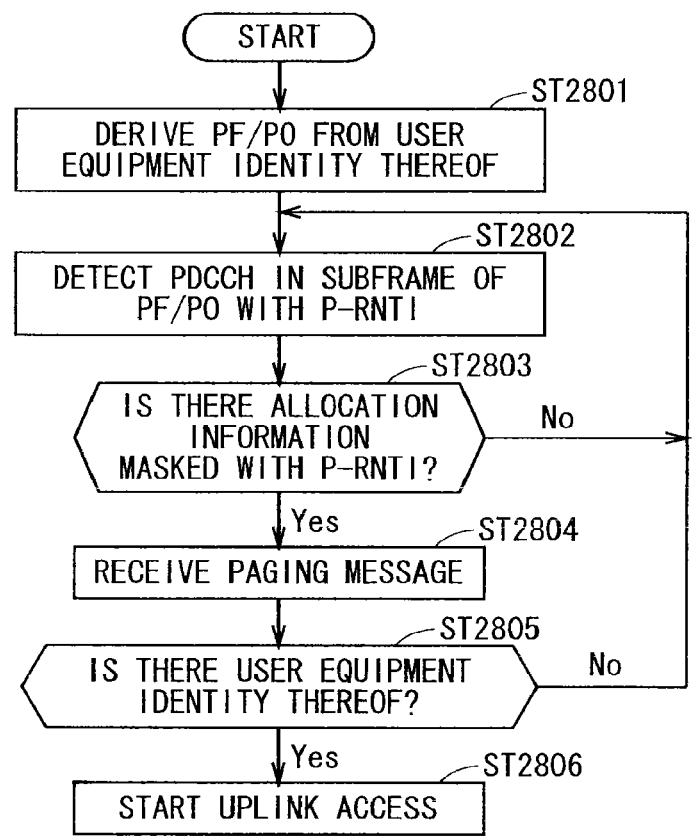

F I G. 3 5
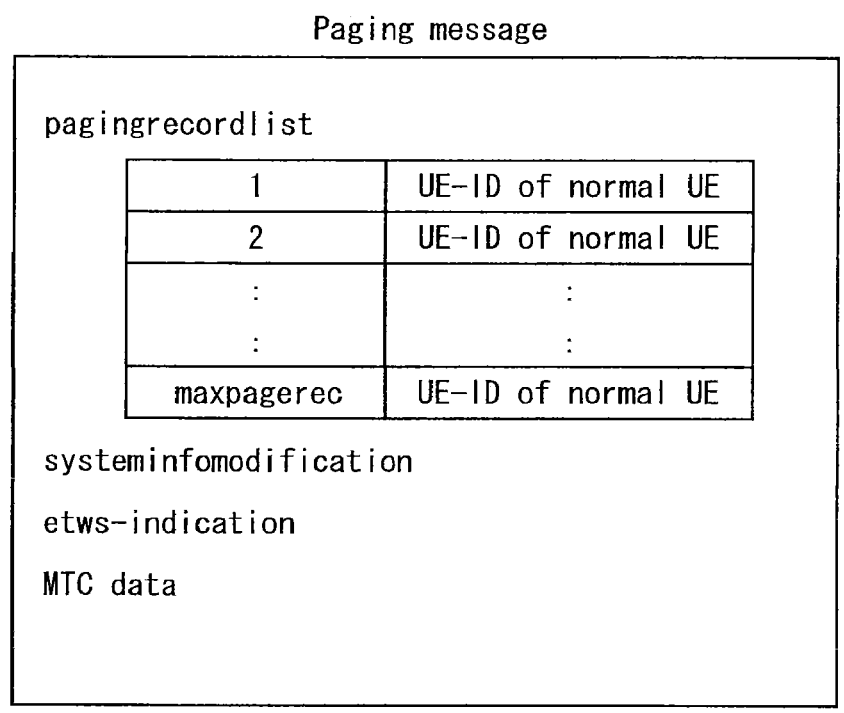

F I G. 3 7

Paging message pagingrecordlist

| 1 | UE-ID of normal UE |
|---|---|
| 2 | UE-ID of normal UE |
| : | : |
| : | : |
| maxpagerec | UE-ID of normal UE | systeminfomodification etws-indication

MTC data list

| MTCD UE-ID#1 | MTC data#1 |
|---|---|
| : | : |
| : | : |
| MTCD UE-ID#n | MTC data#n |

F I G. 3 9
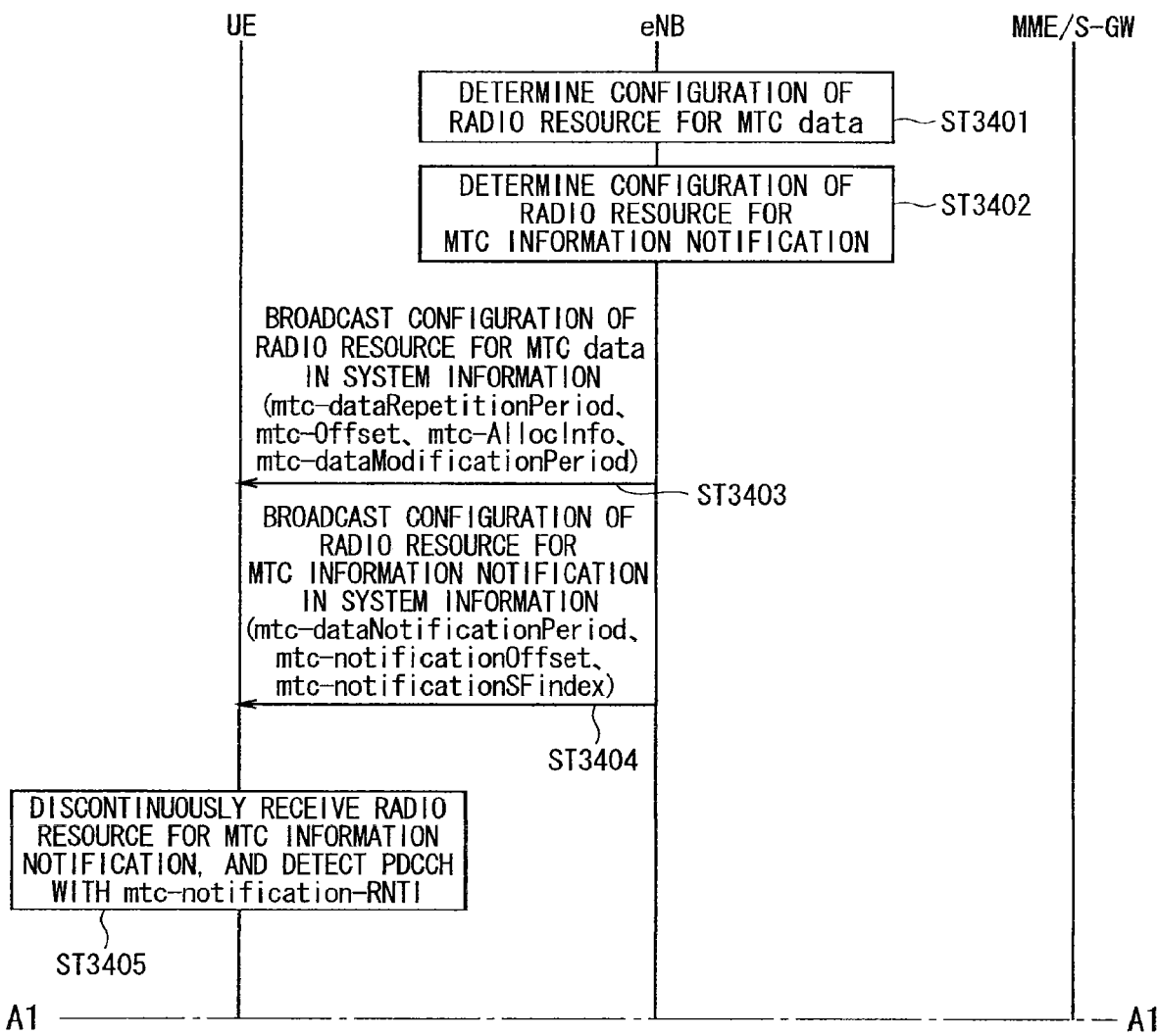

COMMUNICATION SYSTEM, TERMINAL DEVICE AND BASE STATION FOR MACHINE TYPE COMMUNICATION

CROSS-REFERENCE TO RELATED APPLICATIONS

This application is a divisional of U.S. application Ser. No. 16/394,727, filed Apr. 25, 2019, which is a continuation of U.S. application Ser. No. 15/834,817, filed Dec. 7, 2017, which is a continuation of U.S. application Ser. No. 13/877,286, filed Apr. 1, 2013, which the national stage of PCT/JP2011/071981, filed Sep. 27, 2011, which is based upon and claims the benefit of priority from Japanese Patent Application No. 2010-223331, filed on Oct. 1, 2010; the entire contents of each of which are incorporated herein by reference.

TECHNICAL FIELD

The present invention relates to a communication system in which a base station device performs radio communication with a plurality of communication terminal devices.

BACKGROUND ART

Commercial service of a wideband code division multiple access (W-CDMA) system among so-called third-generation communication systems has been offered in Japan since 2001. In addition, high speed downlink packet access (HSDPA) service for achieving higher-speed data transmission using a downlink has been offered by adding a channel for packet transmission (high speed-downlink shared channel (HS-DSCH)) to the downlink (dedicated data channel, dedicated control channel). Further, in order to increase the speed of data transmission in an uplink direction, service of a high speed uplink packet access (HSUPA) system has been offered. W-CDMA is a communication system defined by the 3rd generation partnership project (3GPP) that is the standard organization regarding the mobile communication system, where the specifications of Release 8 version are produced.

Further, 3GPP is studying new communication systems referred to as long term evolution (LTE) regarding radio areas and system architecture evolution (SAE) regarding the overall system configuration including a core network (merely referred to as network as well) as communication systems independent of W-CDMA. This communication system is also referred to as 3.9 generation (3.9 G) system.

In the LTE, an access scheme, a radio channel configuration and a protocol are totally different from those of the current W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz for each base station. Further, differently from the W-CDMA, circuit switching is not provided but a packet communication system is only provided in the LTE.

The LTE is defined as a radio access network independent of the W-CDMA network because its communication system is configured with a new core network different from a core network (general packet radio service: GPRS) of the W-CDMA. Therefore, for differentiation from the W-CDMA communication system, a base station that communicates with a user equipment (UE) and a radio network controller that transmits/receives control data and user data to/from a plurality of base stations are referred to as an E-UTRAN NodeB (eNB) and an evolved packet core (EPC) or access gateway (aGW), respectively, in the LTE communication system. Unicast service and evolved multimedia broadcast multicast service (E-MBMS service) are provided in this LTE communication system. The E-MBMS service is broadcast multimedia service, which is merely referred to as MBMS in some cases. Bulk broadcast contents such as news, weather forecast and mobile broadcast are transmitted to a plurality of user equipments. This is also referred to as point to multipoint service.

Non-Patent Document 1 (Chapter 4.6.1) describes the current decisions by 3GPP regarding an overall architecture in the LTE system. The overall architecture is described with reference to FIG. 1. FIG. 1 is a diagram illustrating the configuration of the LTE communication system. With reference to FIG. 1, the evolved universal terrestrial radio access (E-UTRAN) is composed of one or a plurality of base stations 102, provided that a control protocol for a user equipment 101 such as a radio resource control (RRC) and user planes such as a packet data convergence protocol (PDCP), radio link control (RLC), medium access control (MAC) and physical layer (PHY) are terminated in the base station 102.

The base stations 102 perform scheduling and transmission of paging signal (also referred to as paging messages) notified from a mobility management entity (MME) 103. The base stations 102 are connected to each other by means of an X2 interface. In addition, the base stations 102 are connected to an evolved packet core (EPC) by means of an S1 interface. More specifically, the base station 102 is connected to the mobility management entity (MME) 103 by means of an S1_MME interface and connected to a serving gateway (S-GW) 104 by means of an S1_U interface.

The MME 103 distributes the paging signal to a plurality of or a single base station 102. In addition, the MME 103 performs mobility control of an idle state. When the user equipment is in the idle state and an active state, the MME 103 manages a list of tracking areas.

The S-GW 104 transmits/receives user data to/from one or a plurality of base stations 102. The S-GW 104 serves as a local mobility anchor point in handover between base stations. Moreover, a PDN gateway (P-GW) is provided in the EPC, which performs per-user packet filtering and UE-ID address allocation.

The control protocol RRC between the user equipment 101 and the base station 102 performs broadcast, paging, RRC connection management and the like. The states of the base station and the user equipment in RRC are classified into RRC_IDLE and RRC_CONNECTED. In RRC_IDLE, public land mobile network (PLMN) selection, system information (SI) broadcast, paging, cell reselection, mobility and the like are performed. In RRC_CONNECTED, the user equipment has RRC connection, is capable of transmitting/receiving data to/from a network, and performs, for example, handover (HO) and measurement of a neighbor cell.

The current decisions by 3GPP regarding the frame configuration in the LTE system described in Non-Patent Document 1 (Chapter 5) are described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS).

Multiplexing of channels for multimedia broadcast multicast service single frequency network (MBSFN) and for non-MBSFN is performed on a per-subframe basis. MBSFN transmission is a simulcast transmission technique realized by simultaneous transmission of the same waveforms from a plurality of cells. The MBSFN transmission from a plurality of cells in the MBSFN area is seen as a single transmission by a user equipment. The MBSFN is a network that supports such MBSFN transmission. Hereinafter, a subframe for MBSFN transmission is referred to as MBSFN subframe.

Non-Patent Document 2 describes a signaling example when MBSFN subframes are allocated. FIG. 3 is a diagram illustrating the configuration of the MBSFN frame. With reference to FIG. 3, the MBSFN subframes are allocated for each MBSFN frame. The MBSFN frame is repeated in allocation periods (radio frame allocation periods). The MBSFN subframe is a subframe allocated for the MBSFN in a radio frame defined by the allocation period and the allocation offset (radio frame allocation offset), and serves to transmit multimedia data. The radio frame satisfying Equation (1) below is a radio frame including the MBSFN subframes.

$$\text{SFN mod radioFrameAllocationPeriod} = \text{radioFrameAllocationOffset} \quad (1)$$

The MBSFN subframe is allocated with six bits. The leftmost bit defines the MBSFN allocation for the second subframe (#1). The second bit, third bit, fourth bit, fifth bit, and sixth-bit define the MBSFN allocation for the third subframe (#2), fourth subframe (#3), seventh subframe (#6), eighth subframe (#7), and ninth subframe (#8), respectively. The case where the bit indicates "one" represents that the corresponding subframe is allocated for the MBSFN.

Non-Patent Document 1 (Chapter 5) describes the current decisions by 3GPP regarding the channel configuration in the LTE system. It is assumed that the same channel configuration is used in a closed subscriber group cell (CSG cell) as that of a non-CSG cell. Physical channels are described with reference to FIG. 4. FIG. 4 is a diagram illustrating physical channels used in the LTE communication system.

With reference to FIG. 4, a physical broadcast channel (PBCH) 401 is a downlink channel transmitted from the base station 102 to the user equipment 101. A BCH transport block is mapped to four subframes within a 40 ms interval. There is no explicit signaling indicating 40 ms timing. A physical control format indicator channel (PCFICH) 402 is transmitted from the base station 102 to the user equipment 101. The PCFICH notifies the number of OFDM symbols used for PDCCHs from the base station 102 to the user equipment 101. The PCFICH is transmitted in each subframe.

A physical downlink control channel (PDCCH) 403 is a downlink channel transmitted from the base station 102 to the user equipment 101. The PDCCH notifies the resource allocation, hybrid automatic repeat request (HARD) information related to DL-SCH (downlink shared channel that is one of the transport channels shown in FIG. 5 described below) and the PCH (paging channel that is one of the transport channels shown in FIG. 5). The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) 404 is a downlink channel transmitted from the base station 102 to the user equipment 101. A DL-SCH (downlink shared channel) that is a transport channel and a PCH that is a transport channel are mapped to the PDSCH. A physical multicast channel (PMCH) 405 is a downlink channel transmitted from the base station 102 to the user equipment 101. A multicast channel (MCH) that is a transport channel is mapped to the PMCH.

A physical uplink control channel (PUCCH) 406 is an uplink channel transmitted from the user equipment 101 to the base station 102. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR). A physical uplink shared channel (PUSCH) 407 is an uplink channel transmitted from the user equipment 101 to the base station 102. A UL-SCH (uplink shared channel that is one of the transport channels shown in FIG. 5) is mapped to the PUSCH.

A physical hybrid ARQ indicator channel (PHICH) 408 is a downlink channel transmitted from the base station 102 to the user equipment 101. The PHICH carries Ack/Nack that is a response to uplink transmission. A physical random access channel (PRACH) 409 is an uplink channel transmitted from the user equipment 101 to the base station 102. The PRACH carries a random access preamble.

A downlink reference signal is a known symbol in a mobile communication system. The physical layer measurement objects of a user equipment include reference symbol received power (RSRP).

The transport channel described in Non-Patent Document 1 (Chapter 5) is described with reference to FIG. 5. FIG. 5 is a diagram illustrating transport channels used in the LTE communication system. Part (A) of FIG. 5 shows mapping between a downlink transport channel and a downlink physical channel. Part (B) of FIG. 5 shows mapping between an uplink transport channel and an uplink physical channel.

A broadcast channel (BCH) is broadcast to the entire coverage of a base station (cell) regarding the downlink transport channel. The BCH is mapped to the physical broadcast channel (PBCH).

Retransmission control according to a hybrid ARQ (HARD) is applied to a downlink shared channel (DL-SCH). The DL-SCH enables broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to broadcast to the entire coverage of the base station (cell). The PCH is mapped to physical resources such as the physical downlink shared channel (PDSCH) that can be used dynamically for traffic or physical resources such as the physical downlink control channel (PDCCH) of the other control channel.

The multicast channel (MCH) is used for broadcast to the entire coverage of the base station (cell). The MCH supports SFN combining of MBMS service (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH). The UL-SCH supports dynamic or semi-static resource allocation. The UL-SCH is mapped to the physical uplink shared channel (PUSCH).

A random access channel (RACH) shown in part (B) of FIG. 5 is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ has an advantage that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. In a case where the receiver fails to successfully decode the received data, in other words, in a case where a cyclic redundancy check (CRC) error occurs (CRC=NG), the receiver transmits "Nack" to the transmitter. The transmitter that has received "Nack" retransmits the data. In a case where the receiver successfully decodes the received data, in other words, in a case where a CRC error does not occur (CRC=OK), the receiver transmits "AcK" to the transmitter. The transmitter that has received "Ack" transmits the next data.

Examples of the HARQ system include chase combining. In chase combining, the same data sequence is transmitted in the first transmission and retransmission, which is the system for improving gains by combining the data sequence of the first transmission and the data sequence of the retransmission in retransmission. This is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

A logical channel described in Non-Patent Document 1 (Chapter 6) is described with reference to FIG. 6. FIG. 6 is a diagram illustrating logical channels used in an LTE communication system. Part (A) of FIG. 6 shows mapping between a downlink logical channel and a downlink transport channel. Part (B) of FIG. 6 shows mapping between an uplink logical channel and an uplink transport channel.

A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging signals. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in a case where the user equipments have no RRC connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is a channel used for transmission of MBMS control information for one or several MTCHs from a network to a user equipment. The MCCH is a channel used only by a user equipment during reception of the MBMS. The MCCH is mapped to the downlink shared channel (DL-SCH) or multicast channel (MCH) that is a transport channel.

A dedicated control channel (DCCH) is a channel that transmits dedicated control information between a user equipment and a network. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the downlink shared channel (DL-SCH) or multicast channel (MCH).

GCI represents a global cell identity. A closed subscriber group cell (CSG cell) is introduced in the LTE and universal mobile telecommunication system (UMTS). The CSG is described below (see Chapter 3.1 of Non-Patent Document 3). The closed subscriber group (CSG) is a cell in which subscribers who are allowed to use are specified by an operator (cell for specific subscribers).

The specified subscribers are allowed to access one or more E-UTRAN cells of a public land mobile network (PLMN). One or more E-UTRAN cells in which the specified subscribers are allowed access are referred to as "CSG cell(s)". Note that access is limited in the PLMN. The CSG cell is part of the PLMN that broadcasts a specific CSG identity (CSG ID; CSG-ID). The authorized members of the subscriber group who have registered in advance access the CSG cells using the CSG-ID that is the access permission information.

The CSG-ID is broadcast by the CSG cell or cells. A plurality of CSG-IDs exist in a mobile communication system. The CSG-IDs are used by user equipments (UEs) for making access from CSG-related members easier.

The locations of user equipments are tracked based on an area composed of one or more cells. The locations are tracked for enabling tracking of the locations of user equipments and calling (calling of user equipments) even in an idle state. An area for tracing locations of user equipments is referred to as a tracking area.

A CSG whitelist is a list stored in a universal subscriber identity module (USIM) in which all CSG IDs of the CSG cells to which the subscribers belong are recorded. The CSG whitelist is also referred to as an allowed CSG ID list in some cases.

A "suitable cell" is described below (see Chapter 4.3 of Non-Patent Document 3). The "suitable cell" is a cell on which a UE camps to obtain normal service. Such a cell shall fulfill the following conditions (1) and (2).

(1) The cell is part of the selected PLMN or the registered PLMN, or part of the PLMN of an "equivalent PLMN list".

(2) According to the latest information provided by a non-access stratum (NAS), the cell shall further fulfill the following conditions (a) to (d):
(a) the cell is not a barred cell;
(b) the cell is part of at least one tracking area (TA), not part of the list of "forbidden LAs for roaming", where the cell needs to fulfill (1) above;
(c) the cell shall fulfill the cell selection criteria; and
(d) for a cell specified as CSG cell by system information (SI), the CSG-ID is part of a "CSG whitelist" of the UE (contained in the CSG whitelist of the UE).

An "acceptable cell" is described below (see Chapter 4.3 of Non-Patent Document 3). This is the cell on which a UE camps to obtain limited service (emergency calls). Such a cell shall fulfill the all following requirements. That is, the minimum required set for initiating an emergency call in an E-UTRAN network are as follows: (1) the cell is not a barred cell; and (2) the cell fulfills the cell selection criteria.

Camping on a cell represents the state where a UE has completed the cell selection/reselection process and the UE has selected a cell for monitoring the system information and paging information.

3GPP is studying base stations referred to as Home-NodeB (Home-NB; HNB) and Home-eNodeB (Home-eNB; HeNB). HNB/HeNB is a base station for, for example, household, corporation or commercial access service in UTRAN/E-UTRAN. Non-Patent Document 4 discloses three different modes of the access to the HeNB and HNB. Specifically, those are an open access mode, a closed access mode and a hybrid access mode.

The respective modes have the following characteristics. In the open access mode, the HeNB and HNB are operated as a normal cell of a normal operator. In the closed access mode, the HeNB and HNB are operated as a CSG cell. The CSG cell is a cell where only CSG members are allowed access. In the hybrid access mode, non-CSG members are allowed access at the same time. In other words, a cell in the hybrid access mode (also referred to as hybrid cell) is the cell that supports both the open access mode and the closed access mode.

3GPP is discussing that all physical cell identities (PCIs) are split (referred to as PCI-split) into ones reserved for CSG cells and the others reserved for non-CSG cells (see Non-Patent Document 5). Further, 3GPP is discussing that the PCI split information is broadcast in the system information from the base station to the user equipments being served thereby. The basic operation of a user equipment using PCI split is disclosed. The user equipment that does not have the PCI split information needs to perform cell search using all PCIs (for example, using all 504 codes). On the other hand, the user equipment that has the PCI split information is capable of performing cell search using the PCI split information.

Further, 3GPP is pursuing specifications standard of long term evolution advanced (LTE-A) as Release 10 (see Non-Patent Document 6 and Non-Patent Document 7).

As to the LTE-A system, it is studied that a relay (relay node (RN)) is supported for achieving a high data rate, high cell-edge throughput, new coverage area or the like. The relay node is wirelessly connected to the radio-access network via a donor cell (Donor eNB; DeNB). The network (NW)-to-relay node link shares the same frequency band with the network-to-UE link within the range of the donor cell. In this case, the UE in Release 8 can also be connected to the donor cell. The link between a donor cell and a relay node is referred to as a backhaul link, and the link between the relay node and the UE is referred to as an access link.

3GPP is studying not only a normal eNB (macro cell) but also so-called local nodes such as pico eNB (pico cell), HeNB/HNB/CSG cell, node for hotzone cells, relay node, and remote radio head (RRH).

3GPP is pursuing the study of the machine type communication (MTC) technique (see Non-Patent Documents 8 and 9). MTC is the machine to machine (M2M) communication, which differs from the conventional human to human (H2H) communication. In other words, the MTC does not require human interaction, that is, communication between humans. Examples of applications of the service using the MTC technique (hereinafter, referred to as "MTC service") include metering of gas, power and water, and fleet management and order management (tracking and tracing). The MTC service is characterized by a large number of MTC devices (MTCDs). As one example, 30,000 or more MTCDs are assumed to be served by one cell. Non-Patent Document 8 shows the specifications regarding the MTC in 3GPP.

There occurs a situation where in the MTC service, data is communicated from a large number of MTCDs or to a large number of MTCDs at the same time. The conventional communication system is optimized for H2H communication, and thus, no measure is taken against a situation where data is communicated among a large number of MTCDs at the same time. This causes a problem that in a situation where data is communicated from a large number of MTCDs or to a large number of MTCDs at the same time, a radio network and a core network become congested, leading to an overloaded state.

3GPP is proposed the techniques of Non-Patent Document 10, Non-Patent Document 11, and Non-Patent Document 12 as the method of solving congested downlink communication (hereinafter, referred to as "downlink congestion" in some cases) and a problem arising therefrom. Also, 3GPP is proposed the technique of Non-Patent Document 13 as the method of solving congested uplink communication (hereinafter, referred to as "uplink congestion" in some cases) and a problem arising therefrom.

PRIOR ART DOCUMENTS

Non-Patent Documents

Non-Patent Document 1: 3GPP TS 36.300 Va.0.0
Non-Patent Document 2: 3GPP TS 36.331 V9.3.0
Non-Patent Document 3: 3GPP TS 36.304 V9.3.0
Non-Patent Document 4: 3GPP S1-083461
Non-Patent Document 5: 3GPP R2-082899
Non-Patent Document 6: 3GPP TR 36.814 V9.0.0
Non-Patent Document 7: 3GPP TR 36.912 V9.0.0
Non-Patent Document 8: 3GPP TS 22.368 V2.0.0
Non-Patent Document 9: 3GPP R3-100315
Non-Patent Document 10: 3GPP R2-102962
Non-Patent Document 11: 3GPP R2-104004
Non-Patent Document 12: 3GPP R2-102297
Non-Patent Document 13: 3GPP S2-103183

SUMMARY OF INVENTION

Problems to be Solved by the Invention

In a case of supporting the MTC service, data is communicated from a large number of MTCDs or to a large number of MTCDs at the same time, which causes a problem that a radio network and a core network become congested and accordingly become overloaded.

As described above, 3GPP has proposed the techniques of Non-Patent Document 10, Non-Patent Document 11, and Non-Patent Document 12 as the method of solving downlink congestion and a problem arising therefrom. Non-Patent Documents 10 to 12 disclose the method of reducing a paging load by sending paging per MTC group, not per MTCD. However, the methods disclosed in Non-Patent Documents 10 to 12 have an unresolved problem that in a case where paging is simultaneously broadcast to a large number of MTCDs, radio resources for paging are short for user equipments that are not MTCDs.

Also, as described above, 3GPP is proposed the technique of Non-Patent Document 13 as the method of solving uplink congestion and a problem arising therefrom. Non-Patent Document 13 describes that detach procedure is performed by an upper node even in a case where there is no request for detach procedure from the MTCD. However, a problem of a shortage of radio resources for uplink RACH of the MTCD occurs in the method disclosed in Non-Patent Document 13.

An object of the present invention is to provide a communication system capable of avoiding congestion in downlink communication or uplink communication and a shortage of radio resources arising therefrom.

Means to Solve the Problems

A communication system according to the present invention includes a base station device connected to a core network and a plurality of terminal device groups including communication terminal devices connected to the base station device so as to perform radio communication therewith, wherein: the base station device transmits, to the communication terminal device to be called, a paging message including an equipment identity indicating the communication terminal device; the communication terminal device starts, upon reception of the paging message including the equipment identity indicating the communication terminal device from the base station device, communication with the base station device; and a maximum number of the equipment identities allowed to be included within the paging message is set for each of the terminal device groups.

Further, a communication system according to the present invention includes a base station device connected to a core network and a plurality of terminal device groups including communication terminal devices connected to the base station device so as to perform radio communication therewith, wherein: the base station device transmits, to the communication terminal device to be called, a paging message including a calling indicator indicating that the communication terminal device is being called; and the communication terminal device starts, upon reception of the paging message including the calling indicator indicating that the communication terminal device is being called, communication with the base station device.

Further, a communication system according to the present invention includes a base station device connected to a core network and a plurality of terminal device groups including communication terminal devices connected to the base station device so as to perform radio communication therewith, wherein: the base station device transmits, to the communication terminal device to be called, a paging message notifying calling; the communication terminal device starts, upon reception of the paging message addressed to the own device from the base station device, communication with the base station device; and when the paging message is transmitted to the plurality of communication terminal devices included in the different terminal device groups, the paging message is transmitted to each of the terminal device groups over a different radio frame.

Further, a communication system according to the present invention includes a base station device connected to a core network and a plurality of terminal device groups including communication terminal devices connected to the base station device so as to perform radio communication therewith, wherein the base station device transmits, to the communication terminal device, data to be provided to the communication terminal device and information for notifying whether or not the data has been generated.

Further, a communication system according to the present invention includes a base station device connected to a core network and a plurality of terminal device groups including communication terminal devices connected to the base station device so as to perform radio communication therewith, wherein: if a predetermined disconnection condition is satisfied after a predetermined equipment-side-process is performed between the communication terminal device and the base station device, the base station device disconnects the communication with the communication terminal device; and if a prediction condition of predicting that the base station device has disconnected the communication with the communication terminal device is satisfied, the communication terminal device performs a process for establishing communication with the base station device.

Effects of the Invention

According to the communication system of the present invention, the base station device transmits a paging message to a communication terminal device to be called. The communication terminal device that has received the paging message starts communication with the base station device. A maximum number of equipment identities that can be accommodated within the paging message is set per terminal device group. Accordingly, even in a case where a relatively large number of communication terminal devices included in one terminal device group are called, calling can be performed without hindering the communication of a communication terminal device included in another terminal device group. Therefore, it is possible to avoid the congestion in downlink communication and a shortage of radio resources arising therefrom.

Further, according to the communication system of the present invention, the base station device transmits a paging message to a communication terminal device to be called. The communication terminal device that has received the paging message starts communication with the base station device. The paging message contains a calling indicator, whereby the paging message does not have to dedicatedly contain an equipment identity representing the communication terminal device to be called. Accordingly, even in a case where a relatively large number of communication terminal devices included in one terminal device group are called, the paging message does not have to contain the equipment identities for that amount. This allows calling without hindering the communication of a communication terminal device included in another terminal device group. Therefore, it is possible to avoid the congestion in downlink communication and a shortage of radio resources arising therefrom.

Further, according to the communication system of the present invention, the base station device transmits a paging message to a communication terminal device to be called.

The communication terminal device that has received the paging message starts communication with the base station device. The paging message is transmitted over a different radio frame per terminal device group. Accordingly, even in a case where a relatively large number of communication terminal devices included in one terminal device group are called, calling can be made without hindering the communication of a communication terminal device included in another terminal device group. Therefore, it is possible to avoid the congestion in downlink communication and a shortage of radio resources arising therefrom.

Further, according to the communication system of the present invention, the base station device transmits, to the communication terminal device, the data to be provided to the communication terminal device and the information for notifying whether or not the data has been generated. Accordingly, it is possible to reduce radio resources for use in the transmission of data compared with the case in which data is dedicatedly transmitted per communication terminal device. Therefore, it is possible to avoid the congestion in downlink communication and a shortage of radio resources arising therefrom.

Further, according to the communication system of the present invention, if a disconnection condition is satisfied after the process by an equipment side is performed between a base station device and a communication terminal device, the base station device disconnects the communication with the communication terminal device. If a prediction condition of predicting that communication has been disconnected as described above is satisfied, the communication terminal device performs the process for establishing communication with the base station device. As a result, in a case where it is predicted that the communication between the communication terminal device and the base station device is kept, the process for establishing communication between the communication terminal device and the base station device can be avoided. Therefore, it is possible to avoid the congestion in uplink communication and a shortage of radio resources arising therefrom.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of an LTE communication system.

FIG. 2 is a diagram illustrating the configuration of a radio frame used in the LTE communication system.

FIG. 4 is a diagram illustrating physical channels used in the LTE communication system.

FIG. 5 is a diagram illustrating transport channels used in the LTE communication system.

FIG. 6 is a diagram illustrating logical channels used in the LTE communication system.

FIG. 15 is a diagram showing an example of the information contained in a paging message in a first embodiment.

FIG. 16 is a diagram showing an example of a paging sequence in a case where a maximum value of the number of paging records of an MTCD is set in a semi-static manner.

FIG. 17 is a diagram showing an example of the information contained in a paging message in a second embodiment.

FIG. 19 is a diagram showing an example of a paging sequence in a case where an eNB allocates an MTC group identity per cell.

FIG. 20 is a diagram showing subframes to which paging is mapped, which is determined in the current LTE.

FIG. 21 is a diagram showing subframes to which paging for MTCD is mapped.

FIG. 22 is a diagram showing an example of a subframe in a case where paging for MTCD is mapped to one subframe.

FIG. 23 is a diagram showing another example of a subframe in a case where paging for MTCD is mapped to one subframe.

FIG. 27 is a diagram showing an example in a case where a period, an offset value, and a subframe number are configured per MTC group of two MTC groups.

FIG. 29 is a flowchart showing a procedure of the process of receiving a paging message by a normal UE in the fifth embodiment.

FIG. 30 is a flowchart showing a procedure of the process of receiving a paging message by an MTCD in the fifth embodiment.

FIG. 31 is a diagram showing the correspondence relationship among downlink logical channels, downlink transport channels, and downlink physical channels in a sixth embodiment.

FIG. 32 is a flowchart showing a procedure of a method of masking with an RNTI by an eNB in the sixth embodiment.

FIG. 33 is a flowchart showing a procedure of the process of receiving a paging message by a normal UE in the sixth embodiment.

FIG. 35 is a diagram showing an example of the information contained in a paging message in a seventh embodiment.

FIG. 37 is a diagram showing an example of the information contained in a paging message in a case where an MTCD user equipment identity is paired with MTC data to be transmitted.

FIG. 39 is a diagram showing a sequence of a process of transmitting/receiving downlink data for MTC service in a ninth embodiment.

EMBODIMENTS FOR CARRYING OUT THE INVENTION

First Embodiment

Figure 3:
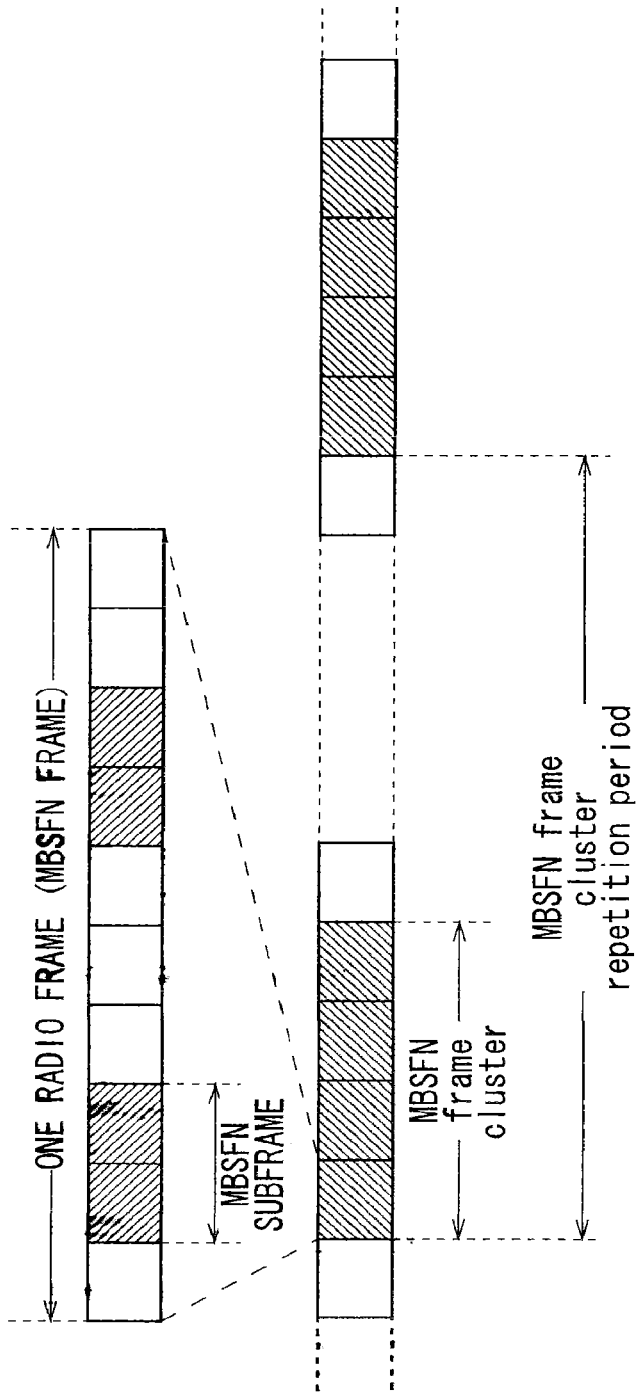
FIG. 3 is a diagram illustrating the configuration of an MBSFN frame.
Figure 7:
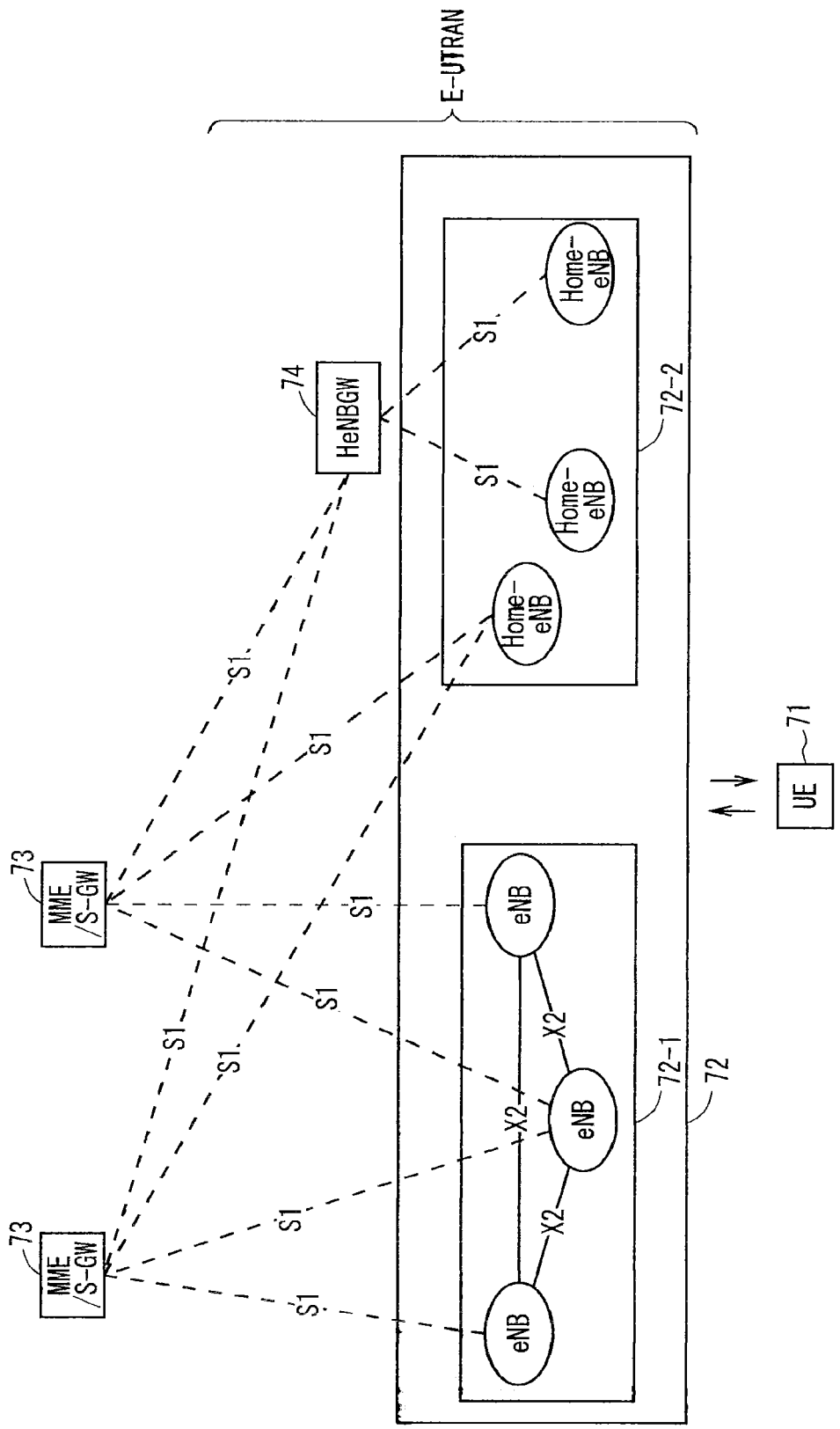
FIG. 7 is a block diagram showing the overall configuration of an LTE mobile communication system currently under discussion of 3GPP.

FIG. 7 is a block diagram showing an overall configuration of an LTE mobile communication system, which is currently under discussion of 3GPP. Currently, 3GPP is studying an overall system configuration including closed subscriber group (CSG) cells (Home-eNodeBs (Home-eNB; HeNB) of E-UTRAN, Home-NB (HNB) of UTRAN) and non-CSG cells (eNodeB (eNB) of E-UTRAN, NodeB (NB) of UTRAN, and BSS of GERAN) and, as to E-UTRAN, is proposing the configuration as shown in FIG. 7 (see Chapter 4.6.1 of Non-Patent Document 1).

FIG. 7 is described. A user equipment device (hereinafter, referred to as "user equipment" or "UE") 71 is capable of performing radio communication with a base station device (hereinafter, referred to as "base station") 72 and transmits/receives signals through radio communication. The user equipment device is equivalent to a communication terminal device. The base stations 72 are classified into an eNB 72-1 that is a macro cell and a Home-eNB 72-2 that is a local node. The eNB 72-1 is equivalent to a large-scale base station device and has a relatively large-scale coverage as the coverage in a range in which communication is allowed with the user equipment UE 71. The Home-eNB 72-2 is equivalent to a small-scale base station device and has a relatively small-scale coverage as the coverage.

The eNB 72-1 is connected to an MME/S-GW unit (hereinafter, referred to as an "MME unit" in some cases) 73 including an MME, S-GW or MME and S-GW through an S1 interface, and control information is communicated between the eNB 72-1 and the MME unit 73. A plurality of MME units 73 may be connected to one eNB 72-1. The eNBs 72-1 are connected to each other by means of an X2 interface, and control information is communicated between the eNBs 72-1.

The Home-eNB 72-2 is connected to the MME unit 73 by means of an S1 interface, and control information is communicated between the Home-eNB 72-2 and the MME unit 73. A plurality of Home-eNBs 72-2 are connected to one MME unit 73. Also, the Home-eNBs 72-2 are connected to the MME units 73 through a Home-eNB Gateway (HeNBGW) 74. The Home-eNBs 72-2 are connected to the HeNBGW 74 by means of the S1 interface, and the HeNBGW 74 is connected to the MME units 73 through an S1 interface. One or a plurality of Home-eNBs 72-2 are connected to one HeNBGW 74, and information is communicated therebetween through an S1 interface. The HeNBGW 74 is connected to one or a plurality of MME units 73, and information is communicated therebetween through an S1 interface.

Further, 3GPP is currently studying the configuration below. The X2 interface between the Home-eNBs 72-2 is not supported. The HeNBGW 74 appears to the MME unit 73 as the eNB 72-1. The HeNBGW 74 appears to the Home-eNB 72-2 as the MME unit 73. The interfaces between the Home-eNBs 72-2 and the MME units 73 are the same, which are the S1 interfaces, irrespective of whether or not the Home-eNB 72-2 is connected to the MME unit 73 through the HeNBGW 74. The mobility to the Home-eNB 72-2 or the mobility from the Home-eNB 72-2 that spans the plurality of MME units 73 is not supported. The Home-eNB 72-2 supports a single cell.

Figure 8:
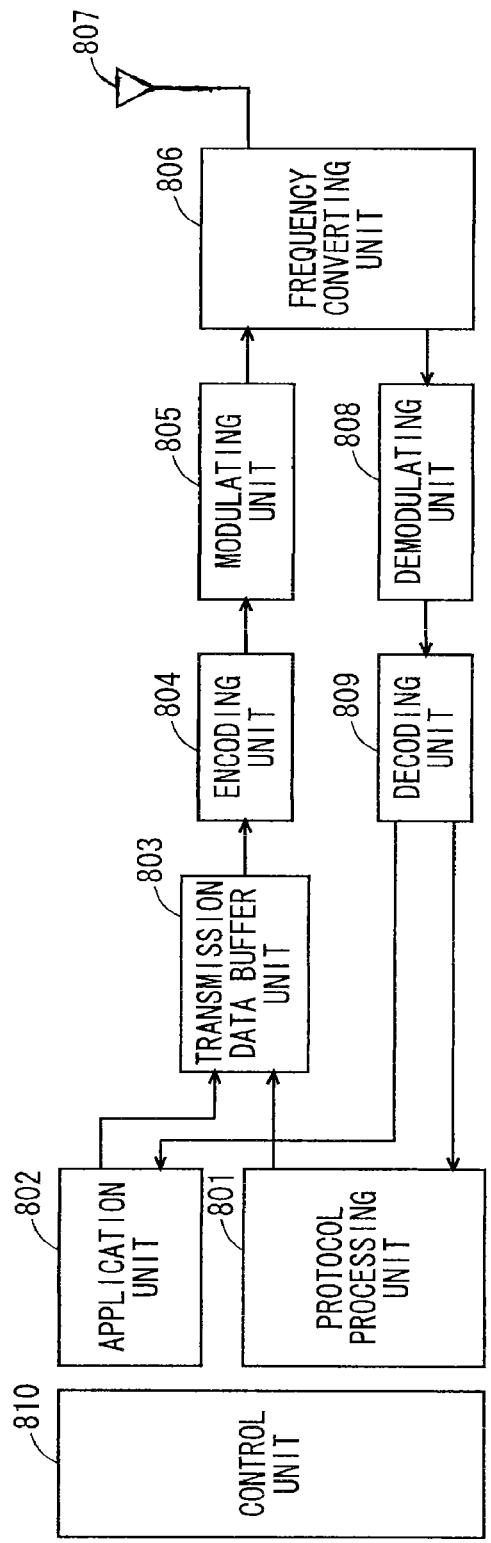
FIG. 8 is a block diagram showing the configuration of a user equipment (user equipment 71 of FIG. 7) according to the present invention.

FIG. 8 is a block diagram showing the configuration of the user equipment (user equipment 71 of FIG. 7) according to the present invention. The transmission process of the user equipment 71 shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to the base station 72.

The user equipment 71 executes the reception process as follows. The radio signal is received through the antenna 807 from the base station 72. The received signal is converted from a radio reception frequency to a baseband signal by the frequency converting unit 806 and is then demodulated by a demodulating unit 808. The demodulated data is transmitted to a decoding unit 809 and is subjected to a decoding process such as error correction. Among the pieces of decoded data, the control data is transmitted to the protocol processing unit 801, while the user data is transmitted to the application unit 802. A series of processes of the user equipment 71 is controlled by a control unit 810.

This means that, though not shown in FIG. 8, the control unit 810 is connected to the respective units 801 to 809.

Figure 9:
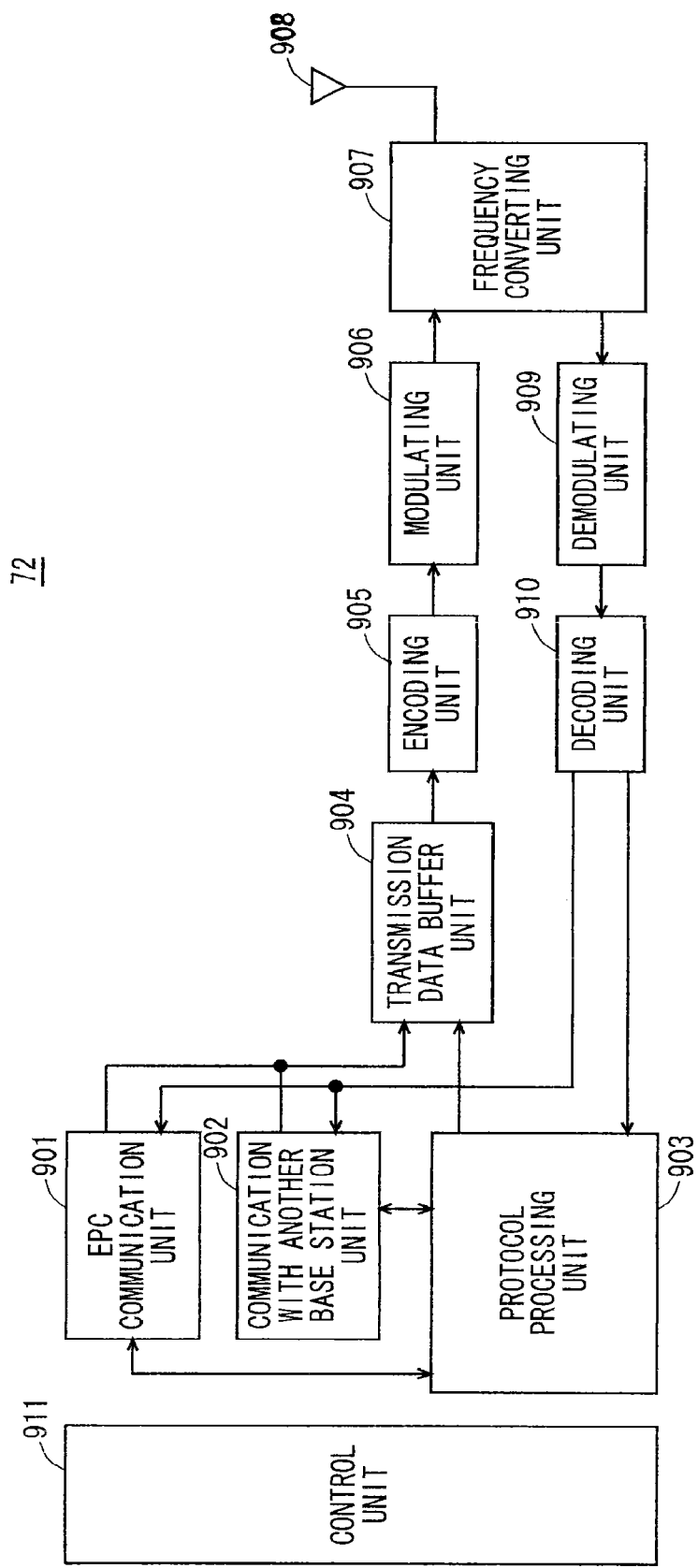
FIG. 9 is a block diagram showing the configuration of a base station (base station 72 of FIG. 7) according to the present invention.

FIG. 9 is a block diagram showing the configuration of the base station (base station 72 of FIG. 7) according to the present invention. The transmission process of the base station 72 shown in FIG. 9 is described. An EPC communication unit 901 performs data transmission/reception between the base station 72 and the EPCs (such as MME unit 73 and HeNBGW 74). A communication with another base station unit 902 performs data transmission/reception to/from another base station. The X2 interface between the Home-eNBs 72-2 is not intended to be supported, and accordingly, it is conceivable that the communication with another base station unit 902 may not exist in the Home-eNB 72-2. The EPC communication unit 901 and the communication with another base station unit 902 respectively transmit/receive information to/from a protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is transmitted to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is output to a frequency converting unit 907 after being converted into a baseband signal, and is then converted into a radio transmission frequency. After that, a transmission signal is transmitted from an antenna 908 to one or a plurality of user equipments 71.

While, the reception process of the base station 72 is executed as follows. A radio signal from one or a plurality of user equipments 71 is received through the antenna 908. The received signal is converted from a radio reception frequency into a baseband signal by the frequency converting unit 907, and is then demodulated by a demodulating unit 909. The demodulated data is transmitted to a decoding unit 910 and is then subjected to a decoding process such as error correction. Among the pieces of decoded data, the control data is transmitted to the protocol processing unit 903, EPC communication unit 901, or communication with another base station unit 902, while the user data is transmitted to the EPC communication unit 901 and the communication with another base station unit 902. A series of processes by the base station 72 is controlled by a control unit 911. This means that, though not shown in FIG. 9, the control unit 911 is connected to the respective units 901 to 910.

The functions of the Home-eNB 72-2 currently under discussion of 3GPP are described below (see Chapter 4.6.2 of Non-Patent Document 1). The Home-eNB 72-2 has the same function as that of the eNB 72-1. In addition, the Home-eNB 72-2 has the function of discovering a suitable serving HeNBGW 74 in a case of connection to the HeNBGW 74. The Home-eNB 72-2 is connected only to one HeNBGW 74. That is, in a case of the connection to the HeNBGW 74, the Home-eNB 72-2 does not use the Flex function in the S1 interface. When the Home-eNB 72-2 is connected to one HeNBGW 74, it is not simultaneously connected to another HeNBGW 74 or another MME unit 73.

The TAC and PLMN ID of the Home-eNB 72-2 are supported by the HeNBGW 74. When the Home-eNB 72-2 is connected to the HeNBGW 74, selection of the MME unit 73 at "UE attachment" is performed by the HeNBGW 74 instead of the Home-eNB 72-2. The Home-eNB 72-2 may be deployed without network planning. In this case, the Home-eNB 72-2 is moved from one geographical area to another geographical area. Accordingly, the Home-eNB 72-2 in this case is required to be connected to a different HeNBGW 74 depending on its location.

Figure 10:
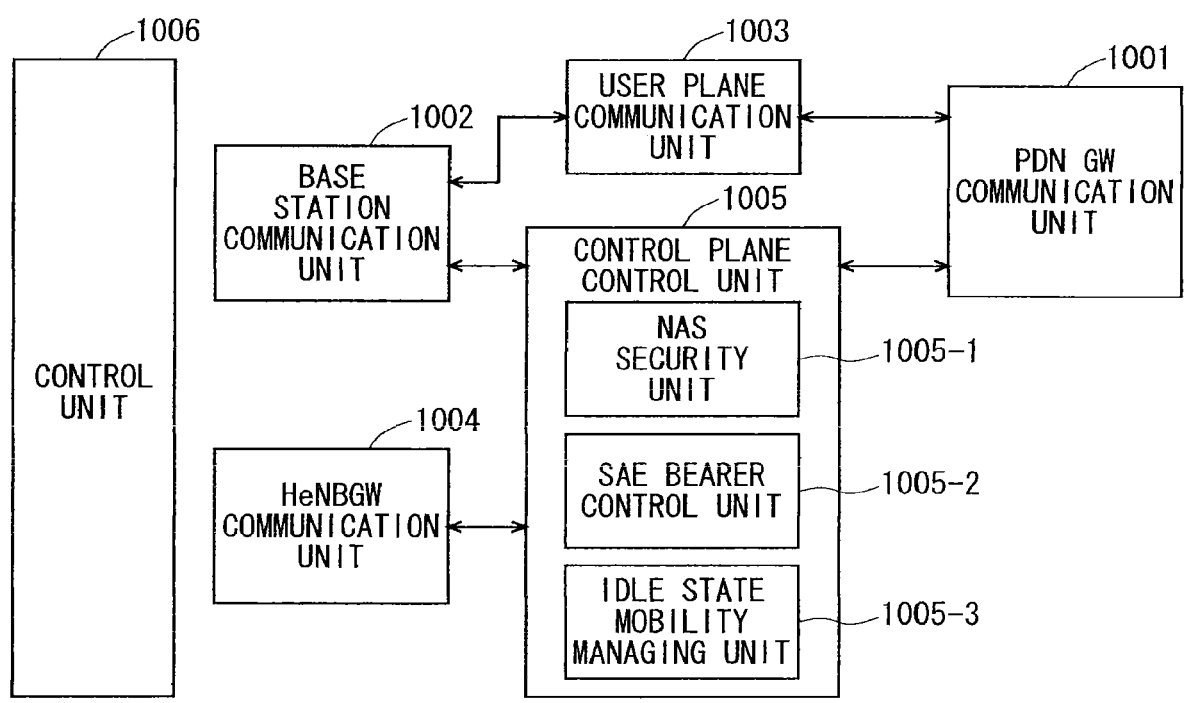
FIG. 10 is a block diagram showing the configuration of an MME (MME unit 73 of FIG. 7) according to the present invention.

FIG. 10 is a block diagram showing the configuration of the MME according to the present invention. FIG. 10 shows the configuration of an MME 73a included in the MME unit 73 shown in FIG. 7 described above. A PDN GW communication unit 1001 performs data transmission/reception between the MME 73a and a PDN GW. A base station communication unit 1002 performs data transmission/reception between the MME 73a and the base station 72 by means of the S1 interface. In the case where the data received from the PDN GW is user data, the user data is transmitted from the PDN GW communication unit 1001 to the base station communication unit 1002 through a user plane communication unit 1003 and is then transmitted to one or a plurality of base stations 72. In the case where the data received from the base station 72 is user data, the user data is transmitted from the base station communication unit 1002 to the PDN GW communication unit 1001 through the user plane commmunication unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005.

A HeNBGW communication unit 1004 is provided in the case where the HeNBGW 74 is provided, which performs data transmission/reception by means of the interface (IF) between the MME 73a and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by means of the S1 interface through the base station communication unit 1002, and are transmitted to one or a plurality of HeNBGWs 74 through the HeNBGW communication unit 1004.

The control plane control unit 1005 includes an NAS security unit 1005-1, an SAE bearer control unit 1005-2, and an idle state mobility managing unit 1005-3, and performs overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of paging signal in an idle state, addition, deletion, update, and search of a tracking area (TA) of one or a plurality of user equipments 71 being served thereby, and tracking area list (TA list) management.

The MME 73a begins a paging protocol by transmitting a paging message to the cell belonging to a tracking area (TA) in which the UE is registered. The idle state mobility managing unit 1005-3 may manage the CSG of the Home-eNBs 72-2 to be connected to the MME 73a, CSG-IDs, and a whitelist.

In the CSG-ID management, the relationship between a user equipment corresponding to the CSG-ID and the CSG cell is managed (added, deleted, updated or searched). For example, it may be the relationship between one or a plurality of user equipments whose user access registration has been performed with a CSG-ID and the CSG cells belonging to this CSG-ID. In the whitelist management, the relationship between the user equipment and the CSG-ID is managed (added, deleted, updated, or searched). For example, one or a plurality of CSG-IDs with which user registration has been performed by a user equipment may be stored in the whitelist. The above-mentioned management related to the CSG may be performed by another part of the MME 73a. A series of processes by the MME 73a is controlled by a control unit 1006. This means that, though not shown in FIG. 10, the control unit 1006 is connected to the respective units 1001 to 1005.

The function of the MME 73a currently under discussion of 3GPP is described below (see Chapter 4.6.2 of Non-Patent Document 1). The MME 73a performs access control for one or a plurality of user equipments being members of closed subscriber groups (CSGs). The MME 73a recognizes the execution of paging optimization as an option.

Figure 11:
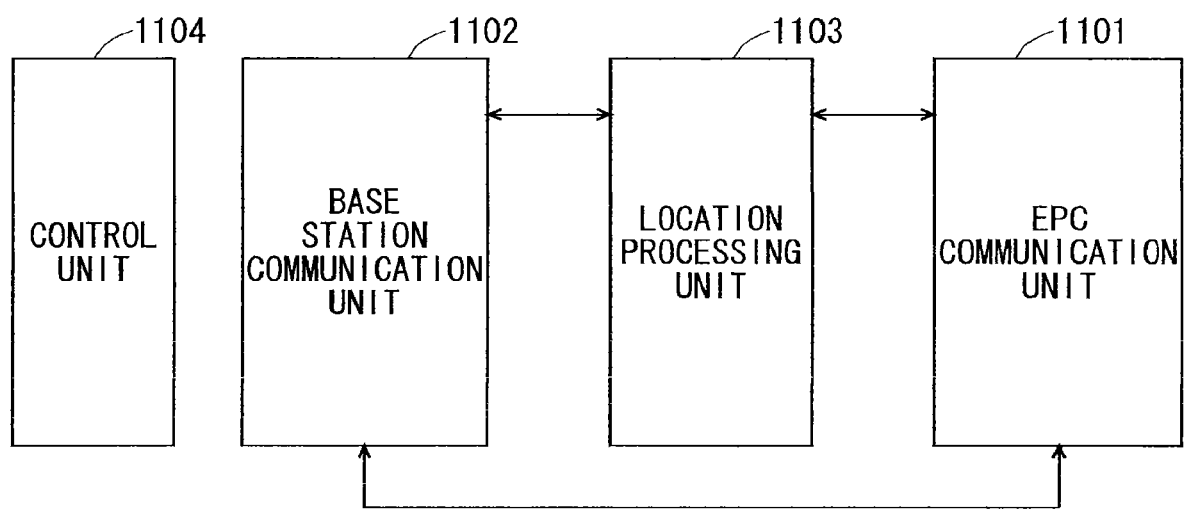
FIG. 11 is a block diagram showing the configuration of a HeNBGW 74 shown in FIG. 7 that is a HeNBGW according to the present invention.

FIG. 11 is a block diagram showing the configuration of the HeNBGW 74 shown in FIG. 7 that is a HeNBGW according to the present invention. An EPC communication unit 1101 performs data transmission/reception between the HeNBGW 74 and the MME 73a by means of the S1 interface. A base station communication unit 1102 performs data transmission/reception between the HeNBGW 74 and the Home-eNB 72-2 by means of the S1 interface. A location processing unit 1103 performs the process of transmitting, to a plurality of Home-eNBs 72-2, the registration information or the like among the data transmitted from the MME 73a through the EPC communication unit 1101. The data processed by the location processing unit 1103 is transmitted to the base station communication unit 1102 and is transmitted to one or a plurality of Home-eNBs 72-2 through the S1 interface.

The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of processes by the HeNBGW 74 is controlled by a control unit 1104. This means that, though not shown in FIG. 11, the control unit 1104 is connected to the respective units 1101 to 1103.

The function of the HeNBGW 74 currently under discussion of 3GPP is described below (see Chapter 4.6.2 of Non-Patent Document 1). The HeNBGW 74 relays an S1 application. The HeNBGW 74 terminates the S1 application that is not associated with the user equipment 71 though it is a part of the procedures toward the Home-eNB 72-2 and towards the MME 73a. When the HeNBGW 74 is deployed, the procedure that is not associated with the user equipment 71 is communicated between the Home-eNB 72-2 and the HeNBGW 74 and between the HeNBGW 74 and the MME 73a. The X2 interface is not set between the HeNBGW 74 and another node. The HeNBGW 74 recognizes the execution of paging optimization as an option.

Figure 12:
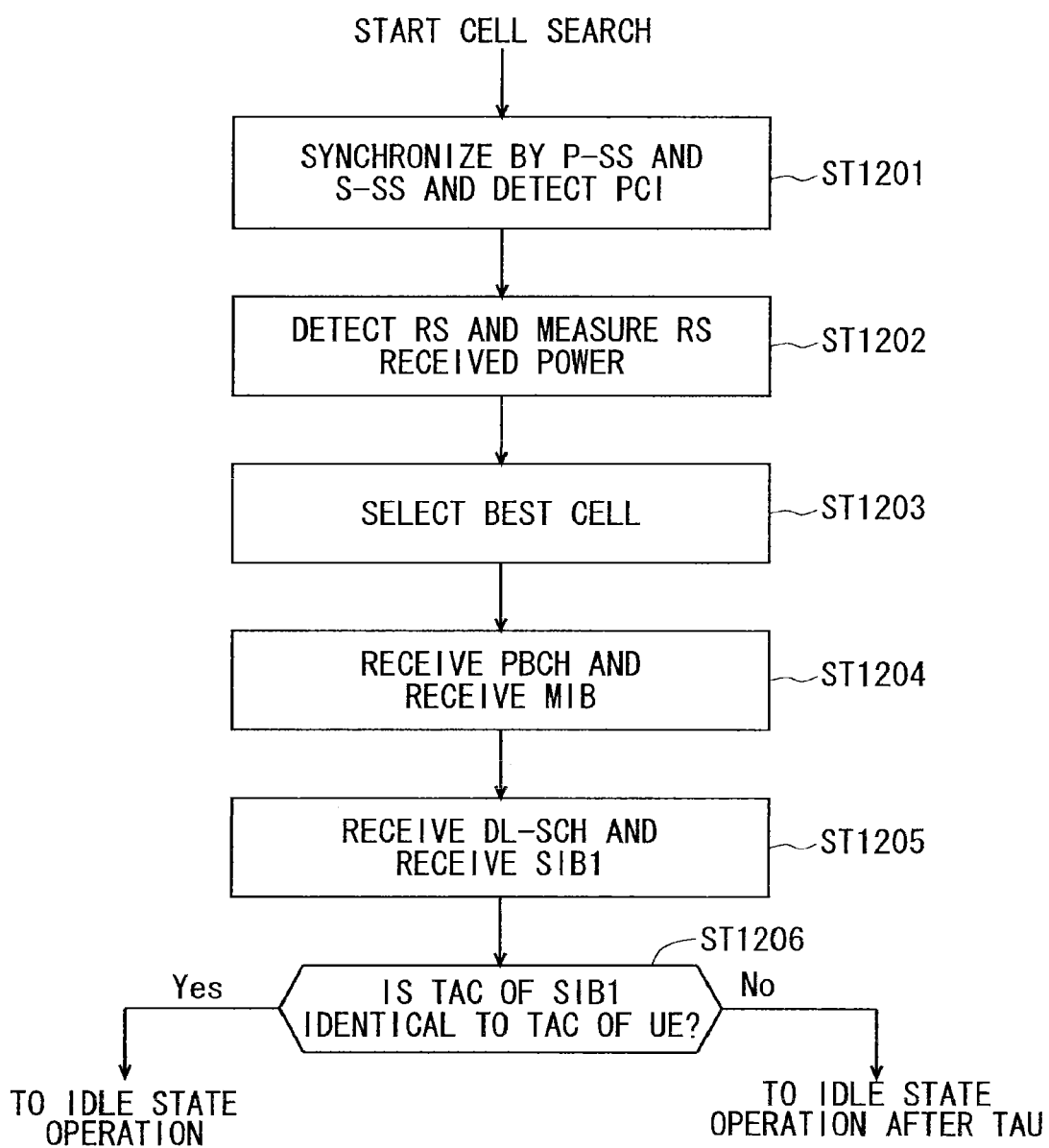
FIG. 12 is a flowchart showing an outline from a cell search to an idle state operation performed by a user equipment (UE) in the LTE communication system.

Next, an example of a typical cell search method in a mobile communication system is described. FIG. 12 is a flowchart showing an outline from cell search to idle state operation performed by a user equipment (UE) in the LTE communication system. When starting cell search, in Step ST1201, the user equipment synchronizes the slot timing and frame timing by a primary synchronization signal (P-SS) and a secondary synchronization signal (S-SS) transmitted from a neighbour base station. Synchronization codes, which correspond to physical cell identities (PCIs) assigned per cell one by one, are assigned to the synchronization signals (SS) including the P-SS and S-SS. The number of PCIs is currently studied in 504 ways, and these 504 ways are used for synchronization, and the PCIs of the synchronized cells are detected (specified).

Next, in Step ST1202, the user equipment detects a reference signal RS (cell-specific reference signal (CRS)) transmitted from the base station per cell and measures the received power (also referred to as RSRP). The code corresponding to the PCI one by one is used for the reference signal RS, and separation from another cell is enabled by correlation using the code. The code for RS of the cell is derived from the PCI specified in Step ST1201, which makes it possible to detect the RS and measure the RS received power.

Next, in Step ST1203, the user equipment selects the cell having the best RS reception quality (for example, cell having the highest RS received power, that is, best cell) from one or more cells that have been detected up to Step ST1202.

In Step ST1204, next, the user equipment receives the PBCH of the best cell and obtains the BCCH that is the broadcast information. A master information block (MIB) containing the cell configuration information is mapped on the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), transmission antenna number, and system frame number (SFN).

In Step ST1205, next, the user equipment receives the DL-SCH of the cell based on the cell configuration information of the MIB, to thereby obtain a system information block (SIB) 1 of the broadcast information BCCH. The SIB1 contains the information related to the access to the cell, information related to cell selection, and scheduling information of other SIB (SIBk; k is an integer equal to or larger than two). In addition, the SIB1 contains a tracking area code (TAC).

In Step ST1206, next, the user equipment compares the TAC of the SIB1 received in Step ST1205 with the TAC in the tracking area (TA) list that has been already possessed by the user equipment. In a case where the TAC received in Step ST1205 is identical to the TAC included in the TA list as a result of the comparison, the user equipment enters an idle state operation in the cell. In a case where the TAC received in Step ST1205 is not included in the TA list as a result of the comparison, the user equipment requires a core network (EPC) (including MME and the like) to change a TA through the cell for performing tracking area update (TAU). The core network updates the TA list based on an identification number (such as a UE-ID) of the user equipment transmitted from the user equipment together with a TAU request signal. The core network transmits the updated TA list to the user equipment. The user equipment rewrites (updates) the TAC list of the user equipment with the received TA list. After that, the user equipment enters the idle state operation in the cell.

In the LTE and universal mobile telecommunication system (UMTS), the introduction of a closed subscriber group (CSG) cell is studied. As described above, access is allowed for only one or a plurality of user equipments registered with the CSG cell. A CSG cell and one or a plurality of user equipments registered with the CSG cell constitute one CSG. A specific identification number referred to as CSG-ID is added to the thus constituted CSG. Note that one CSG may contain a plurality of CSG cells. After being registered with any one of the CSG cells, the user equipment can access another CSG cell of the CSG to which the registered CSG cell belongs.

Alternatively, the Home-eNB in the LTE or the Home-NB in the UMTS is used as the CSG cell in some cases. The user equipment registered with the CSG cell has a whitelist. Specifically, the whitelist is stored in the subscriber identity module (SIM)/USIM. The CSG information of the CSG cell with which the user equipment has been registered is stored in the whitelist. Specific examples of the CSG information include CSG-ID, tracking area identity (TAI) and TAC. Any one of the CSG-ID and TAC is adequate as long as they are associated with each other. Alternatively, GCI is adequate as long as the CSG-ID and TAC are associated with global cell identity (GCI).

As can be seen from the above, the user equipment that does not have a whitelist (including a case where the whitelist is empty in the present invention) is not allowed to access the CSG cell but is allowed to access the non-CSG cell only. On the other hand, the user equipment which has a whitelist is allowed to access the CSG cell of the CSG-ID with which registration has been performed as well as the non-CSG cell.

3GPP is discussing that all physical cell identities (PCIS) are split (referred to as PCI-split) into ones reserved for CSG cells and the others reserved for non-CSG cells (see Non-Patent Document 5). Further, 3GPP is discussing that the PCI split information is broadcast in the system information from the base station to the user equipments being served thereby. Non-Patent Document 5 discloses the basic operation of a user equipment by PCI split. The user equipment that does not have the PCI split information needs to perform cell search using all PCIs (for example, using all 504 codes). On the other hand, the user equipment that has the PCI split information is capable of performing cell search using the PCI split information.

Further, 3GPP has determined that the PCIs for hybrid cells are not contained in the PCI range for CSG cells (see Chapter 10.7 of Non-Patent Document 1).

In 3GPP, there are two modes in the method of selecting or reselecting a CSG cell by a user equipment. One is an automatic mode. The feature of the automatic mode is described below. The user equipment performs selection or reselection with the use of an allowed CSG list (allowed CSG ID list) in the user equipment. After the completion of PLMN selection, the user equipment camps on one cell in the selected PLMN only in a case of a non-CSG cell or a CSG cell with a CSG ID present in the allowed CSG list. The user equipment disables an autonomous search function of the CSG cell if the allowed CSG list of the user equipment is empty (see Chapter 5.2.4.8.1 of Non-Patent Document 3).

The second is a manual mode. The feature of the manual mode is described below. The user equipment shows a list of available CSGs in the currently selected PLMN to a user. The list of CSGs provided to the user by the user equipment is not limited to the CSGs included in the allowed CSG list stored in the user equipment. The user selects the CSG based on the list of CSGs, and then the user equipment camps on the cell with the selected CSG ID, to thereby attempt registration (see Chapter 5.2.4.8.1 of Non-Patent Document 3).

The HeNB and HNB are required to support various types of services. For example, an operator causes the predetermined HeNB and HNB to register user equipments therein and permits only the registered user equipments to access the cells of the HeNB and HNB, which increases radio resources available for the user equipments and enables high-speed communication. In such a service, the operator correspondingly sets a higher accounting fee compared with a normal service.

In order to achieve the above-mentioned service, the closed subscriber group cell (CSG cell) accessible only to the registered (subscribed or member) user equipments is introduced. It is required to install a large number of closed subscriber group cells (CSG cells) in shopping malls, apartment buildings, schools, companies and the like. For example, the following manner of use is required; the CSG cells are installed for each store in shopping malls, for each room in apartment buildings, for each classroom in schools, and for each section in companies such that only the users who have registered with the respective CSG cells are permitted to use those CSG cells. The HeNB/HNB is required not only to complement the communication outside the coverage of the macro cell but also to support various types of services as described above. This also leads to a case where the HeNB/HNB is installed within the coverage of the macro cell.

3GPP is pursuing the study of the MTC technique (see Non-Patent Documents 8 and 9). The MTC is machine to machine (M2M) communication, which differs from the conventional human to human (H2H) communication. In other words, the MTC does not require human interaction. Examples of applications of the service include metering of gas, power and water, and fleet management and order management (tracking and tracing). The MTC service is characterized by a large number of MTCDs. As one example, 30,000 or more MTCDs are assumed to be served by one cell. Non-Patent Document 8 shows the specifications regarding the MTC in 3GPP.

Figure 13:
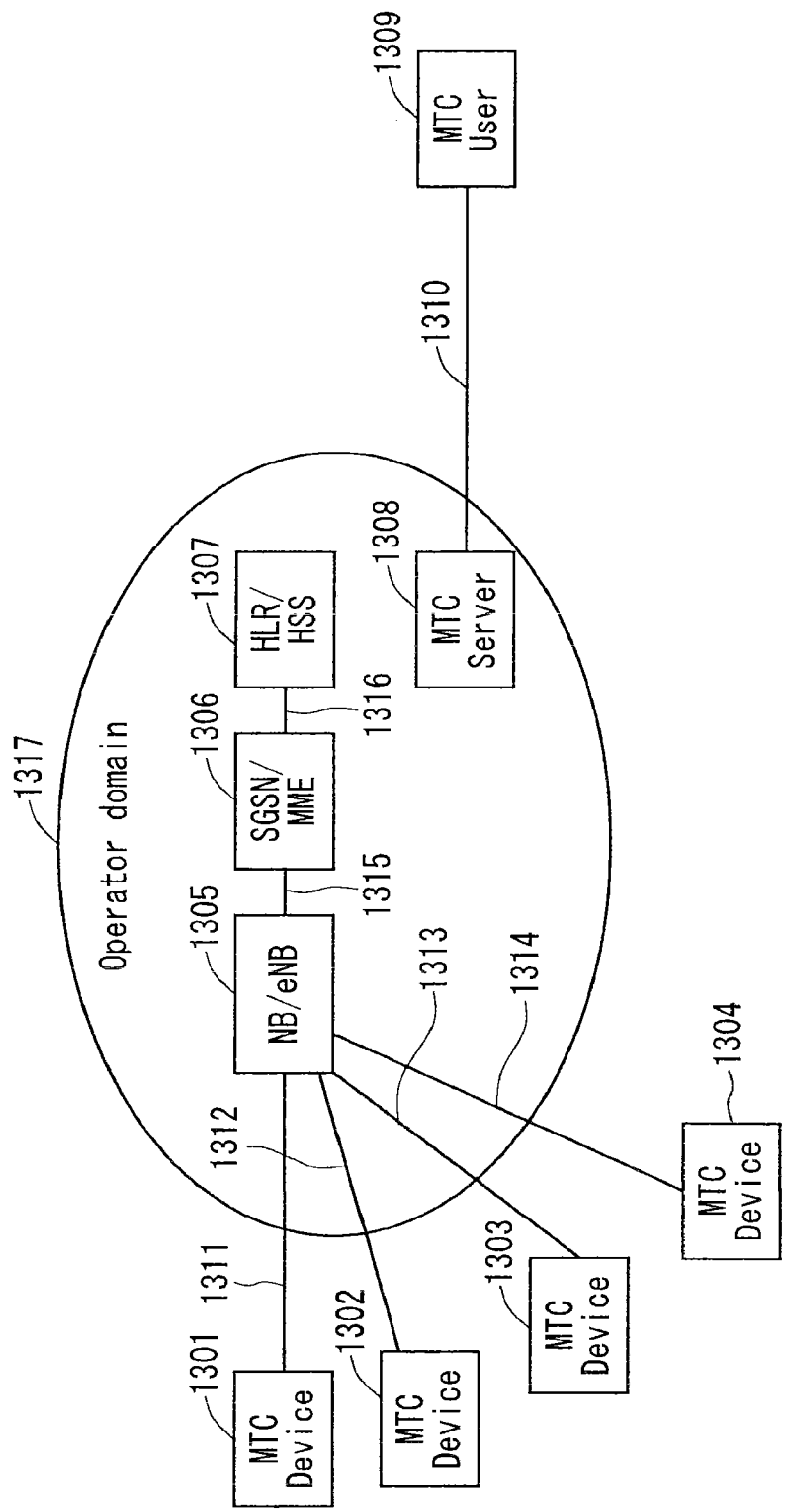
FIG. 13 is a diagram illustrating an example of an architecture of MTC, which is under discussion of 3GPP.

3GPP is studying the architecture of the MTC (see Non-Patent Document 9). FIG. 13 is a diagram illustrating an example of an architecture of the MTC, which is studied by 3GPP. The support of MTC service is studied not only in the LTE communication system but also in the WCDMA communication system.

With reference to FIG. 13, MTCDs 1301 to 1304 and an NB/eNB 1305 are connected by means of Uu interfaces 1311 to 1314, respectively. A serving GPRS support node/mobility management entity (SGSN/MME) 1306 is connected to the NB/eNB 1305 by means of an IuPS/S1 interface 1315. The MME and eNB are connected by means of an S1 interface. Though not shown here, a radio network controller (RNC) is located between the NB and the SGSN. The NB and the RNC are connected by means of an Iub interface, and the RNC is connected to the SGSN by means of an IuPS interface.

A home location register/home subscriber server (HLR/HSS) 1307 is connected to the SGSN/MME 1306 by means of a Gr/S6a interface 1316. A communication operator domain 1317 includes the NB/eNB 1305, SGSN/MME 1306, HLR/HSS 1307, and the like.

An MTC server 1308 is included in the communication operator domain 1317. Besides, a case in which the MTC server 1308 is not included in the communication operator domain 1317 is studied. An MTC user 1309 that performs MTC service is connected to the MTC server 1308 by means of an application program interface (API) 1310. 3GPP is currently studying a node in the communication operator domain 1317, to which the MTC server 1308 is connected.

The information for MTC service is notified by the MTC user 1309 from the MTC server 1308 to the MTCDs 1301 to 1304 with the use of the NB/eNB 1305, SGSN/MME 1306, and HLR/HSS 1307 that are nodes in the communication operator domain 1317. In contrast, the information from the MTCDs 1301 to 1304 is notified to the MTC server 1308 with the use of the NB/eNB 1305, SGSN/MME 1306, and HLR/HSS 1307 that are nodes in the communication operator domain 1317, and the MTC user 1309 uses the information.

In the MTC service, there occurs a situation where data is communicated from a large number of MTCDs or to a large number of MTCDs at the same time. The situation described above occurs in a case where, for example, metering data is transmitted from the MTCD to the MTC server at one o'clock in the morning once a day or the MTC server requests the MTCD to transmit the metering data. Another example is the case where, for example, data for upgrading software is transmitted to the all MTCDs simultaneously.

The conventional communication system is optimized for H2H communication, and thus, no measure is taken against a situation where a large number of MTCDs communicate data at the same time. A situation where data is communicated from a large number of MTCDs or to a large number of MTCDs at the same time causes a problem that a radio network and a core network become congested and those networks are overloaded.

For example, in the example shown in FIG. 13, in a case where the MTC server 1308 requests the large number of MTCDs 1301 to 1304 to transmit the metering data simultaneously, the MTCDs 1301 to 1304 are called simultaneously (hereinafter, referred to as "paging" in some cases) via the Uu interfaces 1311 to 1314 that are radio interfaces. Such a situation causes a problem that the paging load increases and an overloaded situation is caused, radio resources become short, and paging cannot be performed.

A case where, for example, the MTC server 1308 transmits data to the large number of MTCDs 1301 to 1304 simultaneously also causes a problem that radio resources for downlink data transmission become short in the Uu interfaces 1311 to 1314 being radio interfaces and downlink data cannot be transmitted.

Similarly, a case where the large number of MTCDs 1301 to 1304 simultaneously transmit the metering data to the MTC server 1308 causes a problem that radio resources for uplink signaling and data transmission become short in the Uu interfaces 1311 to 1314 being radio interfaces and uplink access cannot be made.

As the method of solving downlink congestion and a problem arising therefrom, 3GPP has proposed the techniques of Non-Patent Document 10, Non-Patent Document 11, and Non-Patent Document 12. Non-Patent Documents 10 to 12 each disclose the method of reducing a paging load by the transmission of paging per MTC group not per MTCD. In the methods disclosed in Non-Patent Documents 10 to 12 above, however, such a problem still remains that in a case where paging is simultaneously notified to a large number of MTCDs, radio resources for paging of user equipments that are not MTCDs (hereinafter, referred to as "normal UEs") become short. The MTCD group is equivalent to a terminal device group.

3GPP is proposed the technique of Non-Patent Document 13 as the method of solving uplink congestion and a problem arising therefrom. Non-Patent Document 13 describes that detach procedure is performed by an upper node even in a case where the MTCD does not request detach procedure. However, the method disclosed in Non-Patent Document 13 causes a problem that a radio resource for uplink RACH of the MTCD becomes short.

The present invention discloses the method of avoiding downlink congestion and radio resource shortages for downlink such as a shortage of radio resources for paging and a shortage of radio resources for downlink data described above, which arise from downlink congestion. In addition, the present invention discloses the method of avoiding uplink congestion and a shortage of radio resources for uplink such as a shortage of radio resources for uplink RACH, which arises from uplink congestion.

Figure 14:
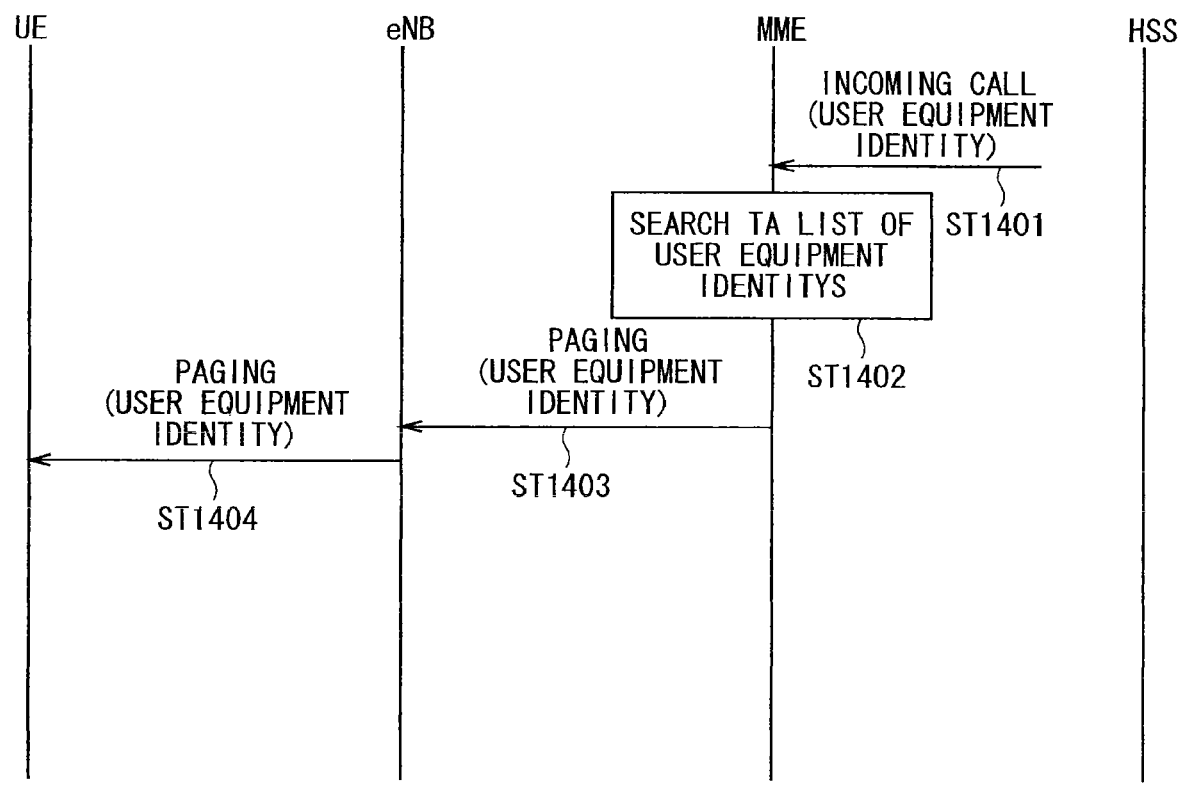
FIG. 14 is a diagram showing a sequence of paging in a conventional LTE communication system.

The paging method in the conventional LTE communication system is described below. FIG. 14 is a diagram showing a paging sequence in the conventional LTE communication system.

In Step ST1401, an originator notifies an MME that manages a destination user equipment of an incoming call message. The incoming call message contains a user equipment identity (identification number) of the destination. In Step ST1402, the MME searches a TA list of the user equipment identity. In this case, the MME obtains information from the HSS if necessary.

In Step ST1403, the MME transmits a paging message to one or a plurality of eNBs. Accordingly, a paging procedure is initiated. The paging message contains the user equipment identity of the destination. The destination user equipment identities (UE-IDs) of destinations contained in the paging message transmitted in Step ST1403 are classified into international mobile subscriber identity (IMSI) or serving temporary mobile subscriber identity (s-TMSI) being a user equipment identity, which is contained in the paging message in Step ST1404 described below, and a user equipment identity (UE_ID) for deriving the transmission timing of the paging message in Step ST1404.

In Step ST1404, the eNB that has received the paging message transmits the paging message to a user equipment (UE) being served thereby. The paging message contains the user equipment identity (UE-ID) of the destination. The IMSI or s-TMSI is used as the user equipment identity (UE-ID) of the destination, which is contained in the paging message transmitted in Step ST1404.

The MME transmits the paging message to the eNB by S1 signaling on an S1 interface in Step ST1403, where the paging message is transmitted to the eNB in the TA list to which the UE to be notified of paging belongs. In Step ST1404, the eNB transmits the paging message to the UE by means of a Uu interface that is an air interface. In Step ST1404, the paging message is transmitted periodically. This is because a UE is allowed to perform discontinuous reception (abbreviated as DRX) so as to reduce power consumption of the UE.

The radio frame (paging frame (PF)) and a subframe (paging occasion (PO)) in which a paging message for UE is transmitted are derived from a user equipment identity (UE_ID) for deriving a paging transmission timing of each UE. Hereinafter, the PF and PO are collectively referred to as "PF/PO" in some cases. The derivation formulae are described in Chapter 7 of Non-Patent Document 3. UE_ID may be derived from the IMSI of a user equipment. The parameters T and nB used in the derivation formulae are broadcast as system information. T refers to a DRX cycle, which is a cycle in which a paging message is transmitted to a target UE. nB is a parameter for determining the number of times PF/PO occurs in one DRX cycle. With the use of the above, parameters Ns and i_s representing the subframe numbers, which are described below, are derived with reference to Non-Patent Document 3.

The paging message is mapped to the PCCH being a logical channel, and further is mapped to the PCH being a transport channel and the PDSCH being a physical channel, as described above. The PDCCH in a subframe in which the paging message is transmitted includes radio resource allocation information. The radio resource allocation information for paging message that is included in the PDCCH is masked with the paging-radio network temporary identity (P-RNTI) that is an identity for paging.

It has been described that the radio resource allocation information is masked, and more specifically, a cyclic redundancy check (CRC) parity bit of the radio resource allocation information is masked. As a result, the UE can judge the presence or absence of a paging message by detecting, with the P-RNTI, the PDCCH in a subframe (PF/PO) of the timing at which a paging message addressed to itself is transmitted.

Examples of the information contained in the paging message include a paging record list (pagingRecordList) that is a paging record list, a system information modification (systemInfoModification), and an emergency information indication (etws-Indication). The paging record contains the IMSI or s-TMSI that is a user equipment (UE) identity. The UE that has received the paging message starts accessing a cell in a case of recognizing that the identity of the own UE is included in the UE identities contained in the paging records. A maximum value of the paging record is determined in specifications, where "16" is set.

In conventional LTE paging, as described in Non-Patent Document 2, the number of paging records is limited, and thus, the number of UEs that can be called in one subframe is limited. This causes a problem that in a case of a simultaneous paging for a large number of MTCDs, a long delay develops until the MTCDs are all notified of paging. For example, R2-102781 (hereinafter, referred to as "Non-Patent Document 14") by 3GPP describes that a delay of 11.15 seconds occurs until the MTCDs in a cell are all notified of paging.

There arises another problem that paging for normal UE cannot be transmitted. In a case where paging for normal UE and paging for MTCD occur at the same time, all paging records on one paging message become identities of the MTCDs and, in some cases, the identities of the normal UEs cannot be included. In such cases, a normal UE cannot be called. Also in the next paging occasion after the DRX cycle, paging for normal UE is highly likely to occur simultaneously with paging for MTCD, which makes it impossible to call a normal UE as well. Therefore, a long delay develops until a normal UE can receive a paging message addressed to itself.

Non-Patent Document 10 and Non-Patent Document 11 each disclose the method of reducing a paging load by the transmission of paging per MTC group not per MTCD. Even in the method above, however, in a case where paging for MTC group and paging for normal UE occur at the same time, some or all of the paging records on one paging message become identities of the MTC group, resulting in a reduction of the number of the identities of normal UEs that can be included. This makes it impossible to call some normal UEs, and accordingly, a long delay time develops until the normal UE can receive a paging message addressed to itself.

Human interaction is required in paging for a normal UE, which does not allow an increase of delay time. Therefore, in a case where paging for normal UE and paging for MTCD occur at the same time, it is extremely important to prevent an increase of delay time in paging for normal UE.

In order to solve the above-mentioned problem, the present embodiment discloses the method of calling an MTCD without reducing the number of normal UEs that can be called on one paging message. The following two, (1) and (2), are disclosed as a specific method of calling an MTCD; (1) higher priority is given to paging for normal UE than paging for MTCD, and (2) a maximum value of the number of paging records (hereinafter, referred to as "paging record number") is set per equipment type.

First, a specific example of the method in which (1) higher priority is given to paging for normal UE than paging for MTCD is described. The MME causes a paging message to be transmitted to the eNB to include the information indicating whether the paging by the paging message is for a normal UE or an MTCD. For example, as one bit information, "1" may be for a normal UE and "0" may be for an MTCD. Based on the information of the paging message received from the MME, the eNB describes a user equipment identity of the normal UE and a user equipment identity of the MTCD by giving higher priority to the former than the latter, and transmits paging. This enables to call a normal UE by giving higher priority than an MTCD.

The above-mentioned method is applicable also in a case where the paging from an MME is paging for an MTC group, not paging for an MTCD. In this case, it suffices that the paging message of paging from the MME is caused to include the information indicating whether the paging message is for a normal UE or an MTCD. Based on the information of the paging message received from the MME, the eNB describes a user equipment identity of the normal UE and a user equipment identity of the MTC group or the MTCD belonging to the MTC group in the paging record contained in one paging message by giving priority to the former than the latter, and transmits paging. This enables to call a normal UE by giving higher priority than an MTCD.

The use of the above-mentioned method enables to prevent an increase of delay time in paging for normal UE in a case where paging for normal UE and paging for MTCD occur at the same time.

Next, a specific example of the method in which (2) a maximum value of the paging record number is set per equipment type is described. A maximum value of the paging record number for MTCDs is newly set. The conventional maximum value of the paging record number is used for normal UEs, whereas the newly-set maximum value of the paging record number is used for MTCDs. The parameter indicating a conventional maximum value of the paging record numbers is set to "maxpagerec", and a maximum value of the number of normal UEs that can be called is set therein. The parameter indicating the newly-set maximum value of the paging record number is set to "mtc-maxpagerec", and a maximum value of the number of MTCDs that can be called is set therein. The use of this method enables to individually set the maximum value of the paging record number contained in the paging message between normal UEs and MTCDs.

A paging record list may be newly provided for MTCDs. The parameter indicating a conventional paging record list is set to "pagingrecordlist", and the user equipment identities for the number up to a maximum value (maxpagerec) of the paging record number of normal UEs, specifically, IMSIs or s-TMSIs can be described therein. It suffices that the parameter indicating a newly-provided paging record list is set to "mtc-pagingrecordlist" and the user equipment identities for the number up to the maximum value (mtc-maxpagerec) of the paging record number of the MTCDs, specifically, IMSIs or s-TMSIs can be described therein.

FIG. 15 is a diagram showing an example of the information contained in a paging message in the first embodiment. As shown in FIG. 15, the paging message contains a paging record list in which the user equipment identities of normal UEs to be called are described for the number up to the maximum value (maxpagerec) of the paging record number of the normal UEs, and a paging record list (mtc-pagingrecordlist) in which the user equipment identities of the MTCDs to be called are described for the number up to the maximum value (mtc-maxpagerec) of the paging record number of the MTCDs.

The eNB that has received the paging message from the MME determines the timing (PF/PO) for transmitting the paging message from the user equipment identity of the user equipment to be called. In a case where a plurality of user equipments are called simultaneously, at times, the plurality of user equipments are called by the same paging message at the same timing (PF/PO) determined by the user equipment identity. In a case where a large number of MTCDs are called simultaneously, a plurality of user equipments, in particular, a plurality of MTCDs are called by the same paging message at the same timing (PF/PO).

The eNB describes, in the paging record of the paging record list (pagingrecordlist), the user equipment identities of one or a plurality of normal UEs to be called by the same paging message for the number not exceeding the maximum value (maxpagerec) of the paging record number of the normal UEs. Further, the eNB describes, in the paging record of the paging record list (mtc-pagingrecordlist), the user equipment identities of one or a plurality of MTCDs to be called by the same paging message for the number not exceeding the maximum value (mtc-maxpagerec) of the paging record number of the MTCDs. The paging message is discontinuously transmitted in a periodic manner at the above-mentioned timing (PF/PO).

The normal UE and the MTCD that are user equipments perform discontinuous reception at the timing of PF/PO derived from the user equipment identity thereof and, in a case where there is a paging message, receive the paging message. If there is the user equipment identity thereof in the paging record of pagingrecordlist in the paging message, the normal UE judges that there is calling and starts uplink access. If there is the user equipment identity thereof in the paging record of mtc-pagingrecordlist in the paging message, the MTCD judges that there is calling and starts uplink access.

As described above, a maximum value of the paging record number and a paging record list are individually provided for normal UEs and MTCDs in the paging message. This enables to suppress effects on normal UEs also in a case where a large number of user equipments are called through one paging message. Accordingly, an increase of delay time in paging for normal UE, which particularly affects a system, can be prevented.

Not a user equipment identity per MTCD, but an identity per MTC group may be provided and described in the paging record of the MTC. As an identity per MTC group, an identity may be assigned from conventional user equipment identities (UE-IDs), or an identity dedicated for the MTC group may be provided separately from the conventional user equipment identity. In a case where an identity per MTC group is described in the paging record of the MTC, calling can be made per MTC group.

In a case where an identity per MTC group is described in the paging record of the MTC, the maximum value (mtc-maxpagerec) of the paging record number of the MTCDs may be applied to the maximum value of the paging record number. In this case, it suffices that the total number of the user equipment identities for individual MTCDs and the identities for individual MTC groups is set not to exceed the maximum value of the paging record number of the MTCDs.

In a case where the identity per MTC group is described in the paging record of the MTC, as another method, the maximum value of the paging record number of the MTC group may be provided separately from the maximum value of the paging record number of the normal UE and the maximum value of the paging record number of the MTCD. It suffices that the parameter indicating the maximum value of the paging record number of the MTC group is set to "mtcg-maxpagerec" and the maximum values for the number of MTC groups that can be called are set therein. With the use of this method, the maximum value of the paging record number of the MTC group contained in the paging message can be set separately from those of the normal UE and the MTCD. It suffices that the paging record list is newly provided for the MTC group as well. It suffices that the parameter indicating the paging record list for the MTC group is set to "mtcg-pagingrecordlist" and the MTC group identities for the number up to the maximum value (mtcg-maxpagerec) of the paging record number of the MTC group are described therein.

The maximum value (mtc-maxpagerec) of the paging record number of MTCD and the maximum value (mtcg-maxpagerec) of the paging record number of MTC group may be set in a static or semi-static manner.

In a case where the maximum values are set in a static manner, they are described in specifications in advance, whereby the MTCD and eNB can recognize the maximum value of the paging record number. In this case, signaling of parameters is not required. Accordingly, a communication error does not occur, and it is possible to reduce the consumption of radio resources.

In a case where the maximum values are set in a semi-static manner, the node which performs setting may be the eNB or MME. In a case where the eNB sets the maximum values, the eNB may broadcast the maximum value of the paging record number to the user equipments being served thereby as system information. In a case where the MME sets the maximum values, the MME may notify the eNB of the maximum value of the paging record number with the use of the S1 signaling message on the S1 interface. This enables the eNB to notify the user equipments being served thereby of the maximum value of the paging record number.

FIG. 16 is a diagram showing an example of a paging sequence in a case where a maximum value of the paging record number of MTCDs is set in a semi-static manner. In Step ST1601, the MME determines the maximum value of the paging record number for MTCD. In Step ST1602, the MME notifies the eNB of the determined maximum value by S1 signaling. In Step ST1603, the eNB notifies user equipments (UEs) being served thereby of the maximum value as system information. Accordingly, the user equipment can recognize the maximum values for the number of paging records for MTCDs contained in the paging message.

Step ST1604 to Step ST1607 show the same paging sequence as that of Step ST1401 to Step ST1404 shown in FIG. 14 described above, and calling to MTCD as a user equipment is disclosed in Step ST1604 to Step ST1607.

In Step ST1604, an originator notifies an MME of an incoming call message. The incoming call message contains an identity of the MTCD being a destination. In Step ST1605, the MME searches a TA list of the MTCD of the identity. In Step ST1606, the MME transmits the paging message to one or a plurality of eNBs. The paging message contains the identity of the MTCD being a destination. In Step ST1607, the eNB that has received the paging message transmits the paging message to user equipments being served thereby. The paging message contains the identity of the MTCD being a destination.

The number of MTCDs being served by the MME or being served by the eNB, or the amount of use of a radio resource per cell may be used as a criterion for determining the maximum value of the paging record number of the MTCD or the maximum value of the paging record number of the MTC group by the MME. Alternatively, those criteria may be used in combination. If the maximum value may be set in a semi-static manner with those criteria, the maximum value of the paging record number can be changed flexibly in accordance with the number of MTCDs or the number of MTC groups located in a cell. This enables to increase the use efficiency of radio resources required for paging, and the radio resources can be used effectively.

In a case where the number of MTCDs or the number of MTC groups located in a cell is relatively large, the maximum value of the paging record number of the MTCD or MTC group is set to a relatively large value. Meanwhile, in a case where the number of MTCDs or the number of MTC groups located in a cell is relatively small, the maximum value of the paging record number of the MTCD or MTC group is set to a relatively small value.

In the method described above, the maximum value of the paging record number is set per equipment type. Alternatively, as another method, the maximum values for the number of paging records contained in one paging message may be set, and the maximum value for the paging record number may be set per equipment type for the types of equipments except for any one equipment type.

For example, in a case where the equipment types are normal UE and MTC group, it suffices that the maximum values for the number of paging records contained in one paging message are set, and the maximum value of the paging record number of the MTC group is set. As a result, it is possible to secure the paging record number for normal UE similarly in the method described above.

With the use of the method disclosed in the present embodiment, the MTCD can be called without reducing the number of normal UEs that can be called through one paging message. Accordingly, it is possible to avoid downlink congestion in a case where paging for normal UE and paging for MTCD occur at the same time and radio resource shortages such as a shortage of radio resources for paging arising from the downlink congestion. Therefore, an increase of delay time in paging for normal UE can be prevented, which enables to construct a communication system capable of M2M communication while maintaining the communication optimum for H2H.

Second Embodiment

The present embodiment discloses another method capable of calling an MTCD without reducing the number of normal UEs that can be called through one paging message.

As a specific method, an indicator for calling an MTCD (hereinafter, referred to as "MTCD calling indicator" in some cases) is provided in a paging message. An MTCD calling indicator may be provided as the information that is not the paging record of a paging message.

FIG. 17 is a diagram showing an example of the information contained in a paging message in the second embodiment. The MTCD calling indicator is "mtc-indication". As shown in FIG. 17, the paging message in the present embodiment contains "mtc-indication" in addition to the information contained in the conventional paging message, specifically, "pagingrecordlist", "systeminfomodification", and "etws-indication". It may be assumed that the MTCD is called in a case of "1" or "true" and the MTCD is not called in a case of "0" or "false" where "mtc-indication" is taken as one bit information.

When recognizing that the MTCD calling indicator (mtc-indication) is contained in the paging message transmitted in the PF/PO derived from a user equipment identity thereof, that is, recognizing "true", the MTCD starts uplink access.

With the configuration as described above, it is not required to cause the paging record of a paging message to include an identity of the MTCD or MTC group for calling the MTCD, which enables to call the MTCD without reducing the number of normal UEs that can be included in the paging record in one paging message. This enables to avoid downlink congestion in a case where paging for normal UE and paging for MTCD occur at the same time and radio resource shortages such as radio resource shortage for paging arising from the downlink congestion. Therefore, an increase of delay time in paging for normal UE can be prevented, which enables to construct a communication system capable of M2M communication while maintaining the communication optimum for H2H.

In a case where an incoming call is made not for an MTCD but for an MTC group, it is required to bring the MTC group and the MTCDs belonging to the MTC group into correspondence with each other for transmitting paging for the MTCDs belonging to the MTC group. The MME or eNB may be used as the node that brings an MTC group and MTCDs belonging thereto into correspondence with each other.

In order to bring an MTC group and MTCDs belonging thereto into correspondence with each other, a correspondence list may be provided, in which an MTC group identity and user equipment identities of the MTCDs belonging to this MTC group are brought into correspondence with each other. It suffices that the correspondence list is configured and managed by the HSS, MME, or eNB.

In a case where the MME brings the MTC group and the MTCDs belonging thereto into correspondence with each other, it suffices that the MME obtains the information required for correspondence in advance from the HSS, MME itself, or eNB. An example of the information required for correspondence is the above-mentioned correspondence list.

Figure 18:
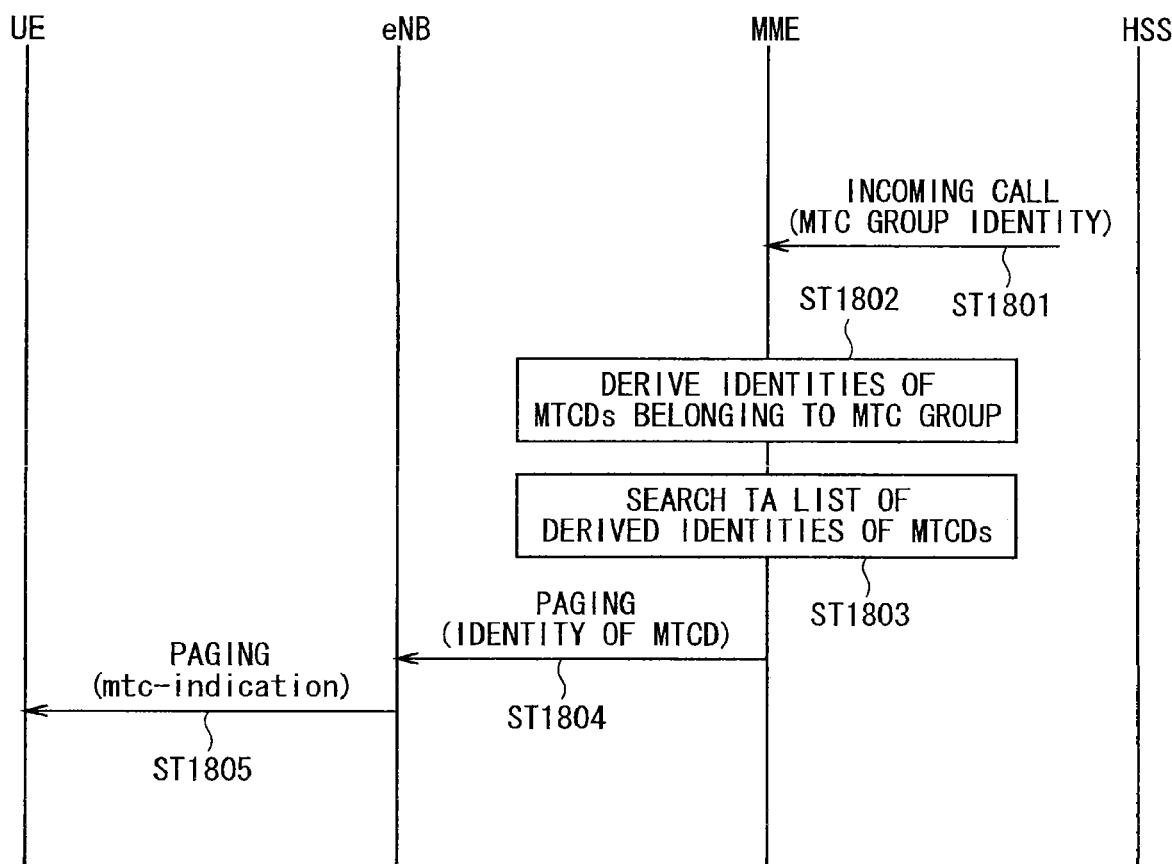
FIG. 18 is a diagram showing an example of a paging sequence in a case where an MME brings an MTC group and MTCDs belonging thereto into correspondence with each other.

FIG. 18 is a diagram showing an example of a paging sequence in a case where an MME brings an MTC group and MTCDs belonging thereto into correspondence with each other. In Step ST1802, the MME that has received an incoming call in Step ST1801 derives user equipment identities of the MTCDs belonging to the MTC group with the MTC group identity based on the MTC group identity contained in the received incoming call message. The MME may obtain, from the HSS, the information required for deriving the user equipment identities of the MTCDs, for example, the correspondence list of the MTC group identity and the user equipment identities of the MTCDs belonging to the MTC group with the MTC group identity.

In Step ST1803, the MME searches the TA list of the derived user equipment identities of the MTCDs. Also in this case, the MME may obtain the information required for retrieving the TA list of the user equipment identities of the MTCDs from the HSS.

In Step ST1804, the MME transmits a paging message to one or a plurality of eNBs in the TA list, to thereby initiate a paging procedure. The paging message contains the user equipment identity of the MTCD to be called. In Step ST1805, the eNB that has received the paging message transmits paging for user equipments (UEs) being served thereby. The paging message in paging does not contain the user equipment identity of the MTCD to be called but contains an MTCD calling indicator (mtc-indication).

The paging message to be transmitted from the MME to the eNB may be caused to include identities of one of a plurality of MTCDs belonging to one MTC group to be called. In this case, the eNB that has received one paging message transmits a paging message including an MTCD calling indicator (mtc-indication) to the one or plurality of MTCDs based on the identities of the one or plurality of MTCDs contained in the received paging message. As a result, only one paging signal is required between the MME and eNB, which enables to reduce an S1 signaling amount.

The TA list of the MTC group may be newly provided. The TA list of the MTC group may be used in a case where paging disclosed herein occurs for an MTC group. The information of the TA list of the MTC group may be listed and managed by the HSS, or may be listed and managed by the MME. In Step ST1803, the MME does not search the TA list for the derived identity of the MTCD but searches the TA list of the MTC group. On this occasion, in a case where the TA list is listed and managed by the HSS, the MME may obtain information from the HSS. The MME that has derived the TA list of the MTC group may transmit the paging message to one or a plurality of eNBs included in the TA list.

In a case where the eNB brings the MTC group and the MTCDs belonging thereto into correspondence with each other, it suffices that the eNB obtains the information required for correspondence in advance from the HSS, MME, or eNB itself. In a case of obtaining the information from the HSS, the eNB may obtain the information via the MME. An example of the information required for correspondence is the above-mentioned correspondence list.

The MME transmits a paging message including the MTC group identity to one or a plurality of eNBs included in the TA list of the MTC group. The eNB receives the MTC group identity, and derives the MTCDs belonging to the MTC group with that identity based on the correspondence of the above-mentioned correspondence list. The eNB transmits the paging message dedicatedly to the MTCDs that have been derived. The paging message contains an MTCD calling indicator (mtc-indication). Accordingly, it suffices that one paging signal between the MME and the eNB is required per group, which enables to reduce the S1 signaling amount.

First Modification of Second Embodiment

In the method of the second embodiment above, one MTCD calling indicator (mtc-indication) is contained. Therefore, in a case where a plurality of MTC groups are located in a cell and paging occurs for MTCDs belonging to different MTC groups at the same time, there arises a problem that the MTCD cannot distinguish whether it is the paging for the MTC group to which itself belongs.

In order to solve this problem, in the present modification, an indicator for calling an MTC group is provided in a paging message, in place of an indicator for calling an MTCD.

An identity of the MTC group may be used as a specific example of the indicator for calling an MTC group. In the case where the indicator for calling an MTC group is the identity of the MTC group, it suffices that the indicator for calling an MTC group is the bit count required for the identity of the MTC group.

The MTCD starts uplink access when recognizing that the paging message transmitted in the PF/PO derived from the user equipment identity thereof contains, as an indicator for calling an MTC group, the identity of the MTC group to which the own MTCD belongs.

This configuration enables, even in a case where paging occurs for the MTCDs belonging to different MTC groups at the same time, to notify the MTCDs for which MTC group the calling is. The MTCD can judge whether the paging message is for the calling to the MTC group to which the own MTCD belongs, and thus can judge whether or not to start uplink access following the reception of the paging message. Accordingly, in a case where the paging message is not the calling to the MTC group to which the own MTCD belongs, uplink access can be set not to start, leading to lower power consumption.

An MTC group identity is provided per system. It is assumed that the number of MTC groups in the system increases, which leads to a large bit count required for identities of the MTC groups. Accordingly, in a case where the MTC group identity is used as an indicator for calling an MTC group as in the method described above, the bit count required for the indicator for calling an MTC group becomes large.

Therefore, an MTC group identity per cell may be used as another example of the indicator for calling an MTC group.

To take one cell, the number of MTC services supported by one cell is limited. It is conceivable that, for example, the MTC group may be constructed per MTC service, and accordingly, the number of MTC groups supported by one cell may be smaller than the number of MTC groups supported in a system. Therefore, an amount of information of the MTC group identity can be reduced by reallocating an MTC group identity in a system per cell.

In the case where the MTC group identity in a system is reallocated per cell, for example, the eNB may allocate an MTC group identity per cell. In attach procedure between the MTCD and the MME, the eNB notifies the MTCD of the MTC group identity per cell in the MTC group to which the MTCD belongs, with the use of an RRC signaling message.

FIG. 19 is a diagram showing an example of a paging sequence in a case where the eNB allocates an MTC group identity per cell. In Step ST1901, when the MTCD initiates attach procedure, the MME performs setting for resources or the like with the upper node. In Step ST1902, the MME notifies the eNB of an attach accept message. The attach accept message contains an identity of the MTC group to which the MTCD belongs.

In Step ST1903, the eNB converts the MTC group identity in the system into the MTC group identity per cell. The correspondence relationship in this conversion of MTC group identity is stored in the eNB. For example, the correspondence relationship may be stored in the control unit 911, protocol processing unit 903, or the like of the eNB shown in FIG. 9.

In Step ST1904, the eNB causes the RRC connection reconfiguration message to contain the converted MTC group identity per cell, and transmits the message to the MTCD. The MTCD that has received the RRC connection reconfiguration message recognizes the MTC group identity per cell. While it is disclosed here that the converted MTC group identity per cell is contained in the RRC connection reconfiguration message, not limited thereto, the converted MTC group identity per cell may be contained in an attach completion message to be transmitted from the eNB to the MTCD.

In Step ST1906, the MME that has received an incoming call in Step ST1905 derives user equipment identities of MTCDs belonging to the MTC group with that MTC group identity, based on the MTC group identity contained in the incoming call message. The MME may obtain, from the HSS, the information required for deriving user equipment identities of MTCDs belonging to the MTC group, for example, the correspondence list of the MTC group identity and the user equipment identities of the MTCDs belonging to the MTC group with that MTC group identity.

In Step ST1907, the MME searches a TA list of the derived user equipment identities of the MTCDs. Also in this case, the MME may obtain the information required for retrieving the TA list of the user equipment identities of the MTCDs from the HSS.

In Step ST1908, the MME transmits a paging message to one or a plurality of eNBs in the TA list, to thereby initiate the paging procedure. The paging message contains a user equipment identity of an MTCD to be called.

In Step ST1909, the eNB that has received the paging message derives an MTC group identity per cell from the MTC group identities in the system. The correspondence relationship in the conversion performed in Step ST1903 is used in deriving an MTC group identity per cell.

In Step ST1910, the eNB transmits paging to user equipments (UEs) being served thereby. The paging message in paging contains an MTC group identity per cell in the MTC group to be called.

The MTCD starts uplink access when recognizing that the paging message transmitted in the PF/PO derived from the user equipment identity thereof contains the MTC group identity per cell which has been received in Step ST1904, to which the own MTCD belongs as an indicator for calling an MTC group.

Alternatively, an identity may be an MTC group identity per TA, not an MTC group identity per cell. In this case, it suffices that the MME allocates an MTC group identity per TA. In attach procedure between the MTCD and the MME, the MME notifies, by the attach accept message, an eNB of an MTC group identity per TA to which the MTCD belongs. The eNB notifies the MTCD of the MTC group identity per TA by an RRC signaling message.

As described above, an MTC group identity is provided per cell or each TA, and this identity is used for calling an MTC group, which enables to reduce a bit count of an indicator for calling an MTC group. Accordingly, radio resources can be reduced in a case where a large number of MTCDs are called, which enables to avoid congestion.

The provision of an MTC group identity per cell or per TA as described above is also applicable to a case in which an MTC group identity is used in the paging record of the paging message. This enables to reduce a bit count of the paging record, and thus, a maximum value of the paging record number can be made large. This enables to increase the number of user equipments that can be called through one paging message. Therefore, calling of a normal UE can be less affected.

Second Modification of Second Embodiment

The second embodiment and the first modification of the second embodiment have each described the case in which a user equipment identity of an MTCD is used for deriving PF/PO. In the present modification, an MTC group identity is used in place of a user equipment identity of an MTCD for deriving PF/PO. The MTC group identity in a system may be used as the MTC group identity, and besides, may be an MTC group identity per TA or an MTC group identity per cell.

The MTCD derives PF/PO from the identity of the own MTC group, and starts uplink access when recognizing that the paging message contains an indicator for calling an MTC, that is, "true".

With the use of this method, the PF/PO is distributed per the MTC group, which considerably reduces a possibility that a plurality of MTC groups may have the same PF/PO. This considerably reduces a possibility that the MTCD will start uplink access in response to the paging for an MTC group that is not the MTC group to which the own MTCD belongs. Accordingly, the power consumption of the MTCD can be reduced, and unnecessary uplink signaling can be reduced. Therefore, uplink congestion can be avoided.

As an identity of an MTC group for deriving PF/PO, such MTC group identities that make the results of deriving PF/PO differ between MTC groups, may be allocated to MTC groups. The configuration described above enables to prevent paging messages of a plurality of MTC groups from being generated in the same PF/PO.

This method is directed to the allocation of identities of MTC groups only for the MTCDs, and thus, it is not required to, for example, reallocate identities allocated to legacy user equipments, that is, user equipments in the previously released specifications. Therefore, in a case where the MTC is supported in a new version, this method can be introduced easily without affecting legacy user equipments.

Instead of providing MTC group identities, the same user equipment identity may be allocated to the all MTCDs of the same MTC group. Instead of separately providing an MTC group identity, a user equipment identity may be used as the MTC group identity.

A user equipment identity per MTC group may be dedicated for paging. In the paging message, IMSI and s-TMSI that are user equipment identities per MTC group may be used as the indicators for calling an MTC group, or in the paging record, IMSI and s-TMSI that are user equipment identities per MTC group may be included in the paging record.

Alternatively, a user equipment identity may be used in deriving the PF/PO. That is, the UE_ID or IMSI per MTC group may be used as the user equipment identity used in deriving the PF/PO.

Separately from the user equipment identity dedicated for paging, a user equipment identity per MTCD may be allocated. That is, both of a user equipment identity per user equipment and a user equipment identity per MTC group may be allocated to one MTCD.

The MTCD derives the PF/PO from the UE_ID or IMSI that is a user equipment identity dedicated for paging of an MTC group to which itself belongs and starts uplink access when recognizing that the IMSI or s-TMSI that is a user equipment identity allocated per MTC group is described in the paging record of the paging message mapped to the subframe thereof.

According to the method described above, an MTC group identity can be allocated among conventional user equipment identities, which does not require to provide identities in a new system or rule. Therefore, a system can be simplified, which enables to simplify the control in each node.

Third Embodiment

The present embodiment discloses another method capable of calling an MTCD without reducing the number of normal UEs that can be called through one paging message. Non-Patent Document 12 discloses the method of solving a shortage of radio resources for paging for normal UE by allocating, to the MTCD, such user equipment identities as to cause the PF/PO to differ between the MTCD and the normal UE. However, in the method disclosed in Non-Patent Document 12, user equipment identities have to be allocated such that the paging group differs between the MTCDs and normal UEs, including legacy user equipments. The user equipment identities have been allocated to the legacy user equipments, and thus, reallocation as described above is a complex and difficult task for an operator.

In the present embodiment, the PF/PO in which paging for normal UE occurs and the PF/PO in which paging for MTCD occurs differ from each other.

An example of the method of varying the PO is described below. The subframes to which a paging message is mapped are varied in advance.

FIG. 20 is a diagram showing subframes to which paging is mapped, which is determined in the current LTE. "N/A" shown in FIG. 20 represents that there is no relevant value (not available). The subframe numbers are determined in accordance with Ns derived with reference to Non-Patent Document 3 and i_s derived using the UE_ID or IMSI of a user equipment derived with reference to Non-Patent Document 3. These are taken as subframes to which paging for normal UE is mapped, and subframes to which paging for MTCDs is mapped are provided separately.

FIG. 21 is a diagram showing subframes to which paging for MTCD is mapped. "N/A" shown in FIG. 21 represents that there is no relevant value (not available). The subframe numbers are determined in accordance with Ns derived with reference to Non-Patent Document 3 and i_s derived from the UE_ID or IMSI of an MTCD derived with reference to Non-Patent Document 3.

As shown in FIG. 20 and FIG. 21, the subframes to which a paging message is mapped are varied between a normal UE and an MTCD in advance, whereby paging for normal UE and paging for MTCD are not generated in the same subframe. Accordingly, calling to a normal UE and calling to an MTCD are not contained in one paging message. A conventional method is applicable as the method of allocating user equipment identities.

Therefore, in a case where a large number of MTCDs are located in a cell, an MTCD can be called without reducing the number of normal UEs that can be called through one paging message, including legacy user equipments. This enables to prevent an increase of delay time in the paging for normal UE, whereby it is possible to construct a communication system capable of M2M communication while keeping the communication optimum for H2H.

Paging for MTCD may be mapped to one subframe. For example, as disclosed in the second embodiment, the configuration is made such that a paging record is not required by, for example, providing an indicator for calling an MTCD, with the result that the number of MTCDs that can be called through one paging message is not limited. Therefore, it is not necessary to provide a plurality of subframes.

FIG. 22 is a diagram showing an example of a subframe in a case where paging for MTCD is mapped to one subframe. FIG. 23 is a diagram showing another example of a subframe in a case where paging for MTCD is mapped to one subframe. The paging for MTCD is mapped to one subframe irrespective of a user equipment identity of an MTCD as described above, whereby an MBSFN subframe can be less affected.

First Modification of Third Embodiment

The present modification shows one example of the method of varying the PF. The radio frames to which a paging message is mapped are varied in advance.

Figure 24:
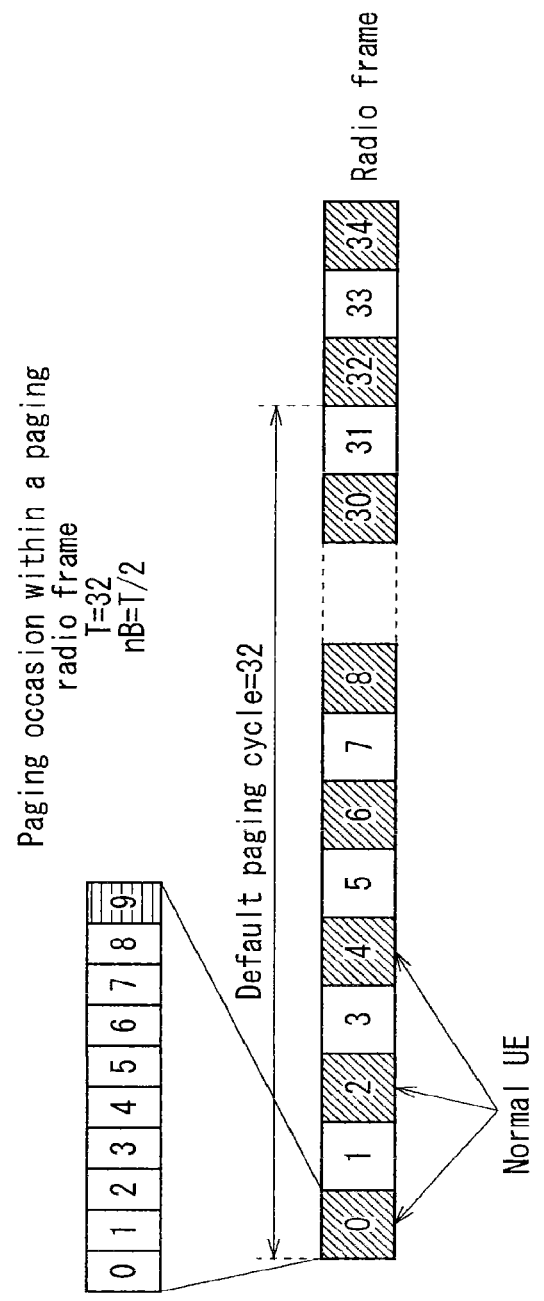
FIG. 24 is a diagram showing radio frames to which paging is mapped (PFs), which is determined in the current LTE.

FIG. 24 is a diagram showing radio frames to which the paging is mapped (PFs), which is determined in the current LTE. Here, the DRX cycle T is 32, and a parameter nB for determining the number of times PF is generated in one DRX cycle is 16. The method of deriving PF is described in Non-Patent Document 3.

In FIG. 24, radio frames diagonally shaded are radio frames to which paging for UE is mapped. A cycle T is 32, and thus, radio frames (rfs) numbered "0" to "31" constitute one cycle. The radio frames in which paging occurs (PFs) are even-numbered radio frames because nB=T/2. The subframe number in which paging occurs in the PF is "9". This PF is taken as a radio frame to which paging for normal UE is mapped, and a radio frame to which paging for MTCD is mapped is provided separately.

Figure 25:
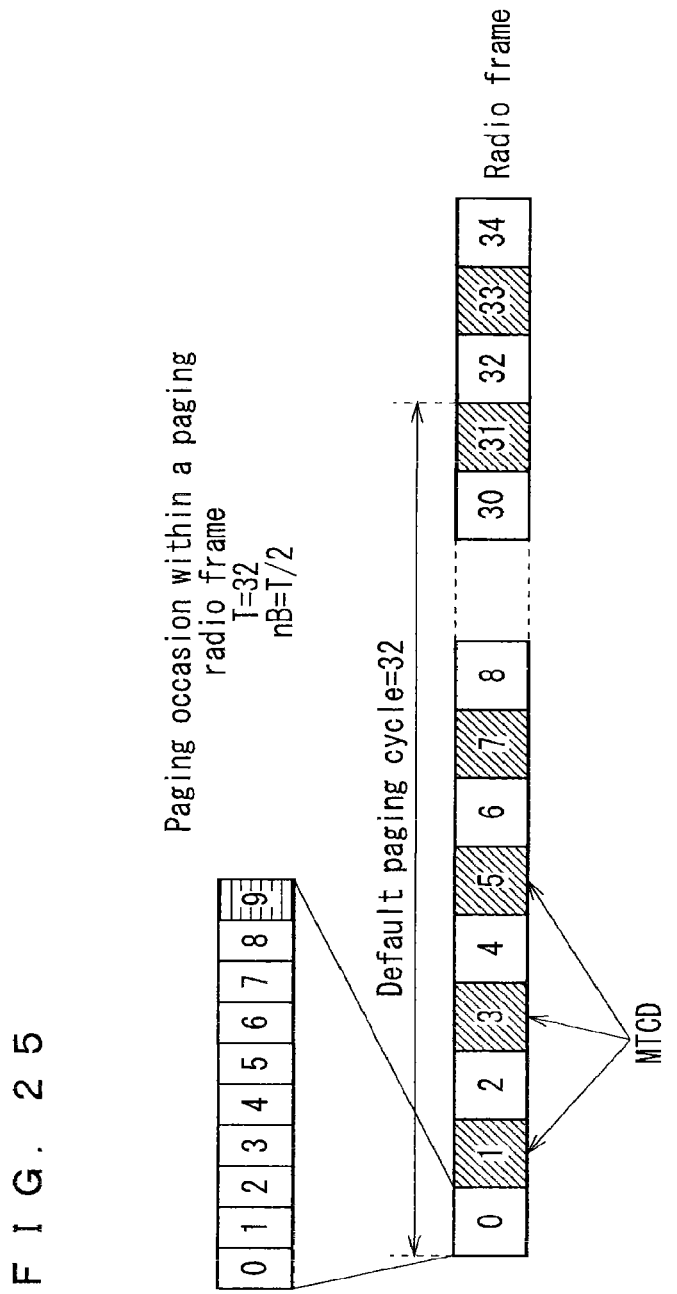
FIG. 25 is a diagram showing radio frames to which paging for MTCD is mapped (PFs).

FIG. 25 is a diagram showing radio frames to which paging for MTCD is mapped (PFs). As in FIG. 24, T is 32 and nB is 16. In FIG. 25, radio frames diagonally shaded, specifically, odd-numbered radio frames are radio frames to which paging for MTCD is mapped. In this manner, the radio frames to which paging for MTCD is mapped differs from the radio frames to which paging for normal UE is mapped.

Derivation Formula (2) below may be used as an example of the method of deriving a radio frame to which paging for MTCD is mapped (PF).

$$\text{SFN mod } T = (T \text{ div } N)*(\text{UE\_ID mod } N) + k \quad (2)$$

where k=1.

The value of k in Formula (2) may be set in accordance with nB. For example, in a case where nB=T/4, k may be any of 1, 2, and 3. As another example, k may be 2*nB/T.

Derivation Formula (3) below may be used as still another example.

$$\text{SFN mod } T = (T \text{ div } N)*(\text{UE\_ID mod } N) + 1 + (\text{UE\_ID mod}(m-1)) \quad (3)$$

where m=nB/T.

Accordingly, it is possible to use the all radio frames to which paging for normal UE is not mapped as radio frames to which paging for MTCD is mapped.

As disclosed in the present modification, the radio frames in which paging for normal UE occurs and the radio frames (PFs) in which paging for MTCD occurs differ from each other, whereby the paging for normal UE and the paging for MTCD do not occur in the same radio frame. Accordingly, one paging message does not contain paging for normal UE and paging for MTCD. In addition, a conventional method is applicable as the method of allocating a user equipment identity.

Therefore, in a case where a large number of MTCDs are located in a cell, an MTCD can be called without reducing the number of normal UEs that can be called through one paging message, including legacy user equipments.

The example above is applicable to a case where T>nB. In a case where T≤nB, paging for normal UE is mapped to the all radio frames, whereby radio frames to which paging for MTCD is mapped do not differ.

In order to solve this problem, it suffices that the MME or eNB determines values of T and nB in accordance with the number of user equipments located in a TA or cell, that is, in accordance with the number of normal UEs and the number of MTCDs. Also, a value of k in Formula (2) may be determined similarly to the values of T and nB or may be pre-determined in a static manner.

The MME or eNB determines values of T and nB in this manner, whereby it is possible to call, in a case where a large number of MTCDs are located in a cell, an MTCD without reducing the number of normal UEs that can be called through one paging message.

The radio frames in which paging occurs (PFs) may differ in the case where T>nB, and the subframe in which paging occurs (PO) may differ in the case where T≤nB. The method disclosed in the present modification may be applied as the method of varying radio frames in which paging occurs (PFs) in the case where T>nB, and the method disclosed in the third embodiment may be applied as the method of varying a subframe in which paging occurs (PO) in the case where T≤nB.

With the configuration as described above, in a case where a large number of MTCDs are located, an MTCD can be called without fail without reducing the number of normal UEs that can be called through one paging message.

Second Modification of Third Embodiment

In the third embodiment and the first modification of the third embodiment above, T and nB having the same value are used for deriving PF/PO of a normal UE and for deriving PF/PO of an MTCD. In the present modification, as another method, the values of T and nB are varied between for deriving PF/PO of a normal UE and for deriving PF/PO of an MTCD. As a specific example, T and nB are directed to deriving PF/PO of a normal UE, and T_mtc and nB_mtc are newly provided for deriving the PF/PO of an MTCD.

The methods disclosed in the third embodiment and the first modification of the third embodiment may be applied as the method of deriving the PF/PO. In this case, it suffices that T_mtc and nB_mtc are used in place of T and nB in deriving the PF/PO of an MTCD.

It suffices that an eNB broadcasts T and nB as system information to user equipments being served thereby. With the configuration above, the DRX cycle can differ between paging for normal UE and paging for MTCD, whereby it is possible to provide DRX cycles corresponding to the services supported by various user equipments. This enables to vary the power consumption in paging idle for each of the various user equipments.

The relationship between T and T_mtc may be set as shown in Formula (4) below.

$$T\_mtc = a*T \quad (4)$$

Further, the relationship between nB and nB_mtc may be set as shown in Formula (5) below.

$$nB \leq nB\_mtc \quad (5)$$

The method disclosed in the first modification of the third embodiment is applied as the above-mentioned configuration, which allows radio frames in which paging for normal UE occurs (PFs) and radio frames in which paging for MTCD occurs (PFs) to differ from each other.

The MTCD derives the PF/PO for MTCD with the use of UE_ID and IMSI that are user equipment identities thereof by the methods disclosed in the third embodiment to the second modification of the third embodiment. Then, the MTCD starts uplink access when recognizing that the paging record of a paging message contains IMSI or s-TMSI that is a user equipment identity thereof.

Even if the method of calling a user equipment by causing the user equipment identities of a normal UE and an MTCD that are user equipments to be included in the paging record is used, the PF/PO can differ between the normal UE and the MTCD through application of the methods disclosed in the third embodiment to the second modification of the third embodiment. Accordingly, it is possible to call an MTCD without reducing the number of normal UEs that can be called through one paging message.

The methods disclosed in the third embodiment to the second modification of the third embodiment, and the methods disclosed in the second embodiment to the second modification of the second embodiment can be used in combination. The methods disclosed in the third embodiment to the second modification of the third embodiment are also applicable to the case in which an indicator for calling an MTC is provided in a paging message, which has been disclosed in the second embodiment to the second modification of the second embodiment. Accordingly, a normal UE can be less affected and an increase of delay time in paging for normal UE can be prevented without considerably increasing an amount of information of a paging message.

The methods disclosed in the third embodiment to the second modification of the third embodiment are also applicable to the case in which an MTC group identity is used. Accordingly, as in the case of application to the case in which an indicator for calling an MTC is provided in a paging message, a normal UE can be less affected and an increase of delay time in paging for normal UE can be prevented without increasing an amount of information of a paging message.

Fourth Embodiment

The present embodiment discloses another method capable of calling an MTCD without reducing the number of normal UEs that can be called through one paging message.

Radio frames and a subframe to which a paging message for an MTCD is mapped are newly provided. Used here is the method different from the method of deriving the PF/PO for paging. That is, a user equipment identity is not used in deriving at least PF.

It suffices that a period, an offset value, and subframe numbers are newly provided as the configurations of the radio frame and subframe. For example, the period is mtc-period, the offset value is mtc-offset, and the subframe number is mtc-subframe.

Figure 26:
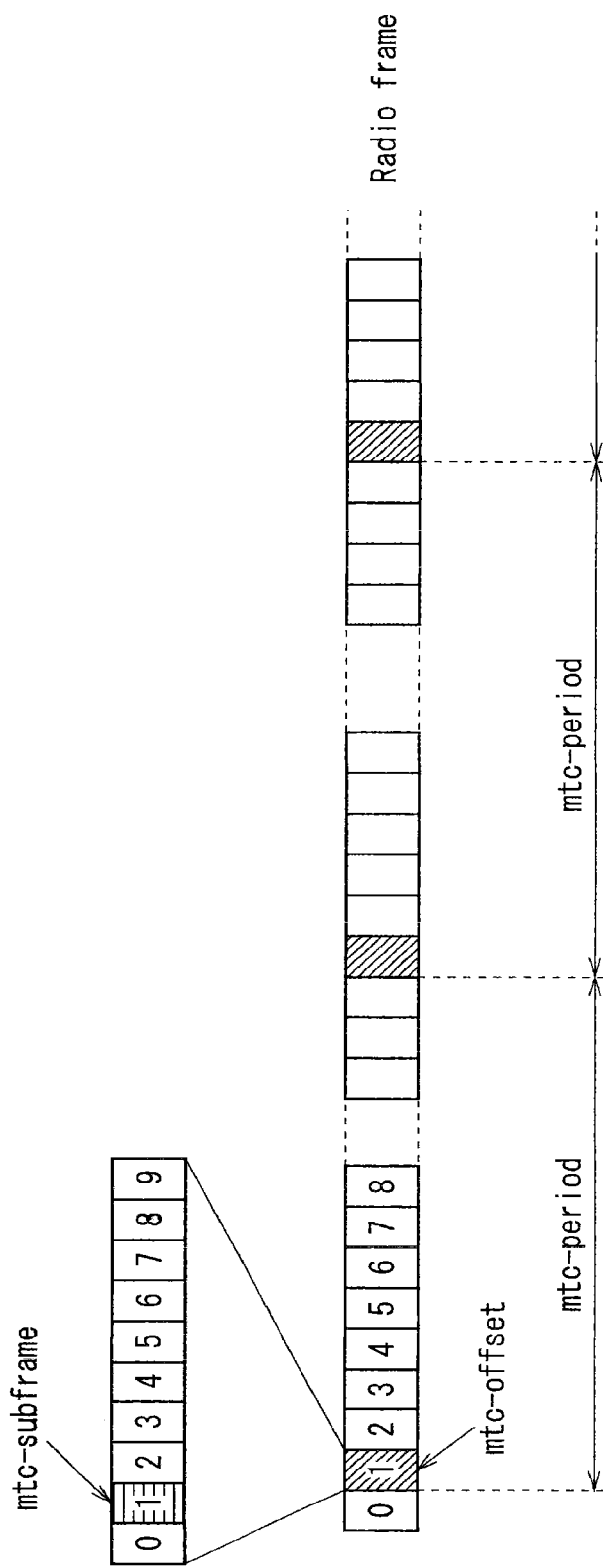
FIG. 26 is a diagram showing configurations of radio frames and a subframe to which a paging message for MTCD is mapped, which is disclosed in a fourth embodiment.

FIG. 26 is a diagram showing configurations of radio frames and a subframe to which a paging message for MTCD is mapped, which is disclosed in the fourth embodiment. The paging message for MTCD is mapped to radio frames periodically, its period is "mtc-period", and an offset value for determining a radio frame number is "mtc-offset". In addition, the subframe to which the paging message for MTCD is mapped is "mtc-subframe". FIG. 26 shows the case in which, for example, mtc-offset is "1" and mtc-subframe is "1".

An MME or eNB may determine the period, offset value, and subframe number of a radio frame for mapping a paging message for MTCD. The eNB may broadcast the period, offset value, and subframe number of a radio frame to the MTCD as system information.

The period of radio frame to which the paging message for MTCD is mapped may be a divisor of a maximum value of the radio frame number. In a case where the radio frame number to which paging is mapped exceeds a maximum value, the configuration can be configured such that the period does not change even if the radio frame number is newly counted again from an offset value.

With the configuration above, the radio frame and subframe to which the paging message for MTCD is mapped can be configured by the method different from that in the case of PF/PO for calling normal UE. This enables to flexibly configure the paging period, offset, and subframe for MTCD in accordance with the MTC service. This allows the power control of an MTCD suitable for MTC service, and thus, the power consumption of an MTCD can be optimized.

Disclosed below is the method of varying a radio frame and a subframe in which paging occurs between the normal UE and the MTCD.

In order to vary a subframe, it suffices that a subframe which is different from PO of a normal UE is configured. The eNB recognizes the subframe to which the PO of the normal UE is mapped. Accordingly, it is possible to vary a subframe in which paging for MTCD occurs.

For example, in a case where T and nB are configured such that Ns=2 in deriving the PO for normal UE, the subframe numbers thereof are 4 and 9. It suffices that the subframe in which paging for MTCD occurs is configured to have a subframe number except for 4 and 9. For example, it suffices that mtc-subframe=1.

In order to vary radio frames, it suffices that radio frames different from the PF of a normal UE are configured. The eNB recognizes the radio frames to which the PF of a normal UE is mapped. Therefore, it is possible to vary radio frames in which paging for MTCD occurs.

For example, in a case where configuration is made such that T=32 and nB=T/2 in deriving the PF for normal UE, as shown in FIG. 24 described above, the radio frames are even-numbered. Accordingly, the radio frames in which paging for MTCD occurs may be odd-numbered. For example, a period may be the number of even-numbered radio frames, and an offset value may be an odd-numbered radio frame. For example, it suffices that mtc-period=1024 and mtc-offset=1.

In the present embodiment, as described above, a paging message for MTCD can be mapped while avoiding the subframe of the PF/PO for normal UE. This enables to call an MTCD without reducing the number of normal UEs that can be called through one paging message. Accordingly, an increase of delay time in paging for normal UE can be prevented, whereby it is possible to construct a communication system capable of M2M communication while keeping the communication optimum for H2H.

The period, offset value, and subframe number may be set per MTC group.

FIG. 27 is a diagram showing an example in a case where a period, an offset value, and subframe numbers are configured per MTC group of two MTC groups. Of the two MTC groups, the period, offset value, and subframe number of a radio frame to which a paging message for a first MTC group is mapped are mtc-period #1, mtc-offset #1, and mtc-subframe #1, and the period, offset value, and subframe number of a radio frame to which a paging message for a second MTC group is mapped are mtc-period #2, mtc-offset #2, and mtc-subframe #2.

It suffices that an eNB broadcasts the period, offset value, and subframe number per MTC group to user equipments being served thereby as system information. With the configuration as described above, the configuration can be made in accordance with each MTC service. This allows the power control of an MTCD per MTC service, and thus, the power consumption of an MTCD can be optimized per MTC service.

The periods for each MTC group may be divisors or multiples of each other. Alternatively, an adoptable period is set as the n-th power of 2 ($2^n$), and an offset value of each MTC group is adjusted, to thereby prevent a simultaneous occurrence of paging for a plurality of MTC groups.

With the use of the method disclosed in the present embodiment, a radio frame and a subframe in which paging for an MTCD occurs can be configured more relatively easily and flexibly compared with the methods disclosed in the second embodiment and the third embodiment above.

Fifth Embodiment

As a measure of reducing a paging load, Non-Patent Document 9 discloses the technique of introducing an RNTI for paging specific to an MTC (MTC specific paging RNTI) for paging in M2M communication. The MTC specific paging RNTI is provided in addition to the RNTI for normal paging (P-RNTI). Accordingly, a normal UE is required to detect only P-RNTI, and the MTCD is required to detect only the MTC specific paging RNTI. That is, the normal UE does not have to receive a paging message in response to paging for MTCD. Meanwhile, the MTCD does not have to receive a paging message for normal UE. Accordingly, UEs that include a normal UE and an MTCD can simplify the reception process, leading to a reduction of power consumption.

However, in a case where paging for normal UE and paging for MTCD occur in the same subframe, there arises a problem that an eNB cannot judge to mask the paging message allocation information with any of the P-RNTI and MTC specific paging RNTI.

The present embodiment discloses the method of solving this problem. In a case where paging for normal UE and paging for MTCD occur in the same subframe, an eNB masks the paging message allocation information with the P-RNTI.

The normal UE detects the presence or absence of the allocation information masked with the P-RNTI on the PDCCH in a subframe of PF/PO derived from a user equipment identity thereof. In a case where there is the allocation information masked with the P-RNTI, the normal UE may receive a paging message in accordance with the allocation information.

Meanwhile, the MTCD not only detects the presence or absence of the allocation information masked with the MTC specific paging RNTI but also detects the presence or absence of the allocation information masked with the P-RNTI, on the PDCCH in a subframe of PF/PO derived from a user equipment identity thereof. In a case where there is the allocation information masked with the MTC specific paging RNTI or P-RNTI, the MTCD may receive a paging message in accordance with the allocation information.

With the configuration as described above, even in a case where paging for normal UE and paging for MTCD occur in the same subframe, each user equipment is capable of receiving paging without any problems.

The normal UE is capable of processing similarly to the conventional paging reception method. This enables paging for an MTCD without affecting a normal UE.

Figure 28:
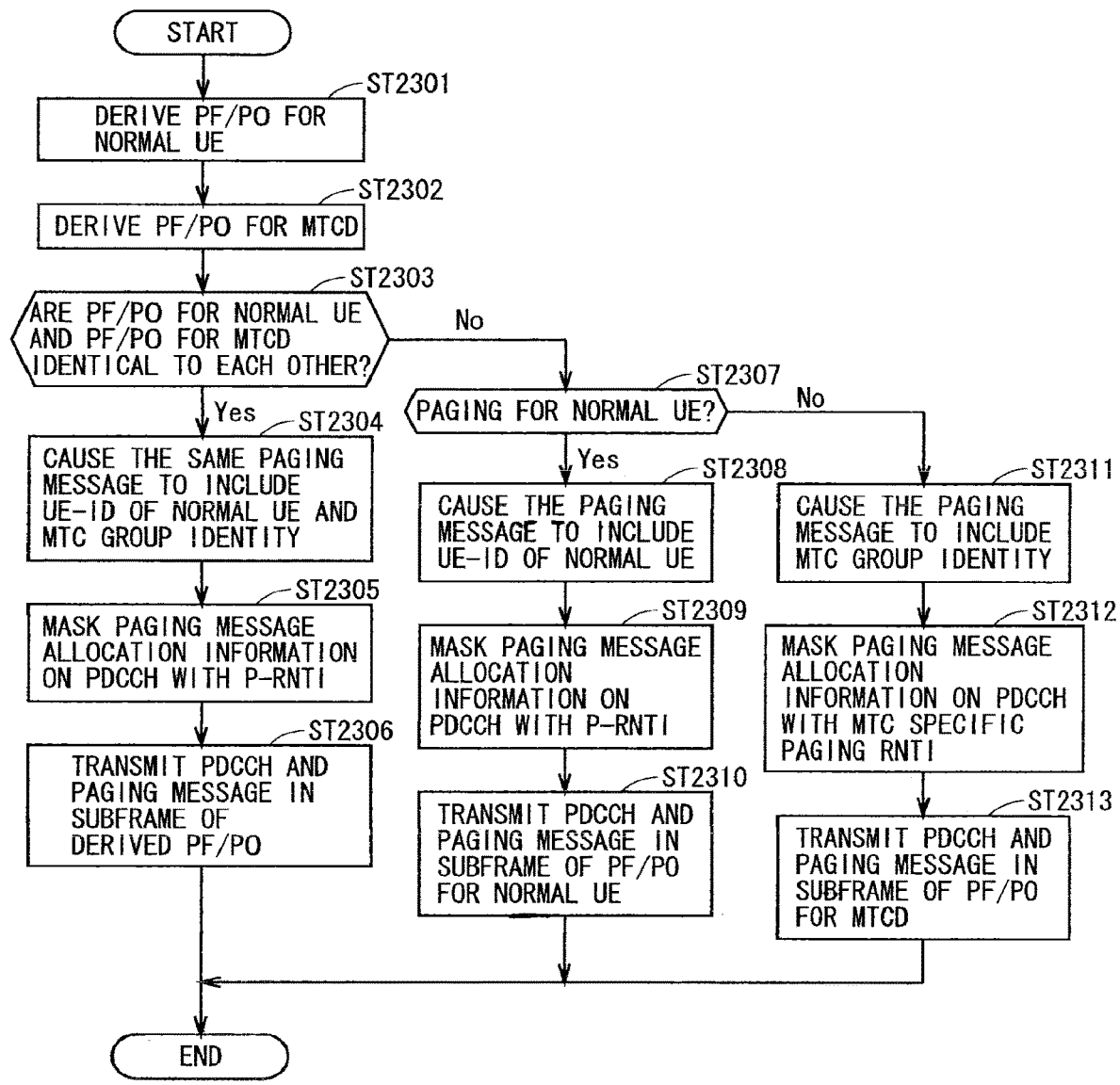
FIG. 28 is a flowchart showing a procedure of a method of masking with an RNTI by an eNB in a fifth embodiment.

FIG. 28 is a flowchart showing a procedure of a method of masking with an RNTI by an eNB in the fifth embodiment. The flowchart of FIG. 28 shows the case in which an eNB receives a paging message. In Step ST2301, an eNB derives the PF/PO for the paging message for normal UE. In Step ST2302, the eNB derives the PF/PO for a paging message for MTCD. Paging for normal UE and paging for MTCD may each occur a plurality of times. The PF/PO is derived as much as the number of times of paging.

In Step ST2303, the eNB judges whether or not the PF/PO for paging for normal UE and the PF/PO for paging for MTCD are identical to each other. In the case where each paging occurs a plurality of times, the eNB may judge whether or not there are identical ones. In a case of judging that the PF/PO for paging for normal UE and the PF/PO for paging for MTCD are identical to each other, the eNB moves to Step ST2304. In a case of judging that the PF/PO for paging for normal UE and the PF/PO for paging for MTCD are not identical to each other, the eNB moves to Step ST2307.

In Step ST2304, the eNB causes the same paging message to include the UE-ID of the normal UE and an identity of the MTC group to which the MTCD belongs. In Step ST2305, the eNB masks the physical resource allocation information to which a paging message is mapped with the P-RNTI, and maps the allocation information to the PDCCH.

In Step ST2306, the eNB transmits the PDCCH and the paging message in the subframe of the PF/PO derived in Step ST2301 or Step ST2302, and ends the all processes.

In a case of judging that the PF/PO of paging for normal UE and the PF/PO of paging for MTCD are not identical to each other in Step ST2303, in Step ST2307, the eNB judges whether or not the paging is paging for a normal UE. In a case of judging that the paging is paging for a normal UE, the eNB moves to Step ST2308. In a case of judging that the paging is not one for a normal UE, the eNB judges that the paging is to the MTCD and moves to Step ST2311.

In Step ST2308, the eNB causes the paging message to include the UE-ID of the normal UE. In Step ST2309, the eNB masks the physical resource allocation information to which the paging message is mapped with the P-RNTI, and maps the allocation information to the PDCCH.

In Step ST2310, the eNB transmits the PDCCH and paging message in the subframe of the PF/PO derived in Step ST2301, and then ends the all processes.

In a case of judging that the paging is paging for MTCD in Step ST2307, in Step ST2311, the eNB causes the paging message to include an identity of an MTC group to which the MTCD belongs. In Step ST2312, the eNB masks the physical resource allocation information to which the paging message is mapped with the MTC specific paging RNTI, and maps the allocation information to the PDCCH.

In Step ST2313, the eNB transmits the PDCCH and paging message in the subframe of the PF/PO derived in Step ST2302, and then ends the all processes.

With the configuration described above, even if paging for normal UE and paging for MTCD occur in the same subframe, it is possible to prevent a situation where the eNB cannot judge to mask the paging message allocation information with any of RNTIs.

FIG. 29 is a flowchart showing a procedure of the process of receiving a paging message by a normal UE in the fifth embodiment. In Step ST2401, the normal UE derives the PF/PO from a user equipment identity thereof. In Step ST2402, the normal UE detects the PDCCH in a subframe of the PF/PO with the P-RNTI. Accordingly, the normal UE performs discontinuous reception.

In Step ST2403, the normal UE judges whether or not to have detected the allocation information masked with the P-RNTI. In the case of judging to have detected the allocation information, the normal UE moves to Step ST2404. In the case of judging to have not detected the allocation information, the normal UE judges that the paging message has not been allocated to the subframe and returns to Step ST2402, to thereby repeat the above-mentioned process.

In Step ST2404, the normal UE receives the paging message in accordance with the allocation information on the PDCCH. In Step ST2405, the normal UE judges whether or not the paging message contains the user equipment identity thereof. In a case of judging that the user equipment identity thereof is contained, the normal UE judges that there is paging and moves to Step ST2406. Meanwhile, in a case of judging that the user equipment identity thereof is not contained, the normal UE judges that the paging message is not for itself and returns to Step ST2402, to thereby repeat the above-mentioned process. In Step ST2406, the normal UE starts uplink access.

The above-mentioned process of receiving a paging message by a normal UE in the present embodiment is the same as the conventional process of receiving a paging message by a user equipment irrespective of the presence or absence of the MTCD, that is, the presence or absence of the MTC specific paging RNTI. Therefore, in the present embodiment, the normal UE can use the same process as that of the conventional paging reception method.

FIG. 30 is a flowchart showing a procedure of the process of receiving a paging message by an MTCD in the fifth embodiment. In Step ST2501, the MTCD derives PF/PO from a user equipment identity thereof. In Step ST2502, the MTCD detects the PDCCH in the subframe in PF/PO with the MTC specific paging RNTI, to thereby perform discontinuous reception.

In Step ST2503, the MTCD judges whether or not to have detected the allocation information masked with the MTC specific paging RNTI. The MTCD moves to Step ST2504 in a case of judging to have detected the allocation information and moves to Step ST2507 in a case of judging to have not detected the allocation information.

In Step ST2504, the MTCD receives a paging message in accordance with the allocation information of the PDCCH. In Step ST2505, the MTCD judges whether or not the paging message contains an MTC group identity of an MTC group to which itself belongs. In a case of judging that the MTC group identity is contained, the MTCD judges that paging has occurred and moves to Step ST2506. In a case of judging that the MTC group identity is not contained, the MTCD returns to Step ST2502 and repeats the above-mentioned process.

In Step ST2506, the MTCD starts uplink access.

In Step ST2507, the MTCD detects the allocation information masked with the P-RNTI. In Step ST2508, the MTCD judges whether or not to have detected the allocation information masked with the P-RNTI. In a case of judging to have detected the allocation information, the MTCD moves to Step ST2509. In a case of judging to have not detected the allocation information, the MTCD returns to Step ST2502 and repeats the above-mentioned process.

In Step ST2509, the MTCD receives a paging message in accordance with the allocation information of the PDCCH. In Step ST2510, the MTCD judges whether or not the paging message contains an MTC group identity of an MTC group to which itself belongs. In a case of judging that the MTC group identity is contained, the MTCD judges that paging has occurred and moves to Step ST2511. In a case of judging that the MTC group identity is not contained, the MTCD judges that the paging message is not one for itself, and returns to Step ST2502, to thereby repeat the above-mentioned process. In Step ST2511, the MTCD starts uplink access.

The MTCD performs detection with the MTC specific paging RNTI and P-RNTI in this manner, and thus is capable of receiving the paging message for MTCD without fail.

With the use of the method disclosed in the present embodiment, also in a case where the MTC specific paging RNTI is provided in addition to a normal paging RNTI for reducing a paging load, the eNB is capable of judging to mask the paging message allocation information with any of RNTIs. This allows the normal UE and MTCD to receive a paging message without fail. Therefore, it is possible to construct a communication system capable of M2M communication while keeping the communication optimum for H2H.

Sixth Embodiment

The present embodiment discloses another method capable of calling an MTCD without reducing the number of normal UEs that can be called in a case where paging for normal UE and paging for MTCD occur at the same time. As a specific method, a plurality of PCCHs are mapped at the same transmission time intervals (TTIs).

In the conventional technique, in the case where paging for a plurality of user equipments occurs at the same time, the same paging message of the same TTI is caused to include the identities of the plurality of user equipments, to thereby call the plurality of user equipments.

In the present embodiment, a plurality of PCCHs are mapped in the same TTIs. Accordingly, even in a case where paging for normal UE and paging for MTCD occur at the same time, the paging message thereof can be mapped in the same TTIs, which enables to call both of the normal UE and the MTCD.

As an example, a plurality of PCCHs are PCCHs for individual equipment types. There are provided a PCCH to which a paging message for normal UE is mapped (hereinafter, referred to as "PCCH" in some cases) and a PCCH to which a paging message for MTCD is mapped (hereinafter, referred to as "MTC-PCCH" in some cases).

FIG. 31 is a diagram showing the correspondence relationship among downlink logical channels, downlink transport channels, and downlink physical channels in the sixth embodiment. Part (A) of FIG. 31 shows mapping between downlink logical channels and downlink transport channels. Part (B) of FIG. 31 shows mapping between downlink transport channels and downlink physical channels.

As shown in part (A) of FIG. 31, the PCCH being a logical channel is mapped to the PCH being a transport channel. The MTC-PCCH being a logical channel is mapped to the MTC-PCH being a newly provided transport channel. These are processed on the same TTIs in the MAC.

As shown in part (B) of FIG. 31, the PCH being a transport channel is mapped to the PDSCH being a physical channel. The MTC-PCH being a transport channel is also mapped to the PDSCH being a physical channel. The PDSCH is a shared channel. These are processed on the same TTIs in a physical layer.

At the same TTIs, mapping to the PDSCH is performed separately for a paging message for normal UE and a paging message for MTCD. Therefore, allocation of a physical resource to the PDSCH is performed individually therebetween. The allocation information is mapped to the PDCCH individually therebetween.

The physical resource allocation information of the PDSCH to which a different PCCH is mapped may be masked with a different RNTI and be mapped on a PDCCH. For example, the allocation information of the PDSCH to which a paging message for normal UE is mapped is masked with the P-RNTI. The PI-MTC-RNTI is newly provided for a paging message for MTCD. The allocation information of the PDSCH to which a paging message for MTCD is mapped is masked with the PI-MTC-RNTI.

FIG. 32 is a flowchart showing a procedure or a method of masking with an RNTI by an eNB in the sixth embodiment. The flowchart of FIG. 32 shows the case in which the eNB has received a paging message.

In Step ST2701, the eNB derives the PF/PO of the paging message for normal UE. In Step ST2702, the eNB derives the PF/PO of the paging message for MTCD. Paging for normal UE and paging for MTCD may each occur a plurality of times. The PF/PO is derived for each paging.

In Step ST2703, the eNB judges whether or not the paging is paging for normal UE. In a case of judging that the paging is for a normal UE, the eNB moves to Step ST2704. In a case of judging that the paging is not for a normal UE, the eNB judges that the paging is for an MTCD and moves to Step ST2707.

In Step ST2704, the eNB causes the paging message to include the UE-ID of the normal UE. In Step ST2705, the eNB masks the physical resource allocation information to which the paging message is mapped with the P-RNTI, and maps the allocation information on the PDCCH. In Step ST2706, the eNB transmits the PDCCH and paging message in the subframe of the PF/PO derived in Step ST2701, and then ends the all processes.

In a case of judging that the paging is not for a normal UE, that is, that the paging is for an MTCD in Step ST2703, in Step ST2707, the eNB causes the paging message to include an identity of an MTC group to which the MTCD belongs. In Step ST2708, the eNB masks the physical resource allocation information to which a paging message is mapped with the PI-MTC-RNTI and maps the allocation information on the PDCCH. In Step ST2709, the eNB transmits the PDCCH and paging message in the subframe of the PF/PO derived in Step ST2702, and then ends the all processes.

With the configuration above, a plurality of PCCHs can be mapped in the same TTIs, which enables to mask each of the pieces of paging message allocation information with a different RNTI and map the allocation information on the PDCCH.

Further, a plurality of PCCHs can be mapped in the same TTIs. Accordingly, it is not required to judge whether or not paging for normal UE and paging for MTCD occur at the same TTIs, and accordingly, it is not required to vary the process therebetween. Therefore, the paging process by an eNB can be simplified, which enables to reduce a process delay and power consumption.

FIG. 33 is a flowchart showing a procedure of the process of receiving a paging message by a normal UE in the sixth embodiment. In Step ST2801, the normal UE derives the PF/PO from a user equipment identity thereof. In Step ST2802, the normal UE detects the PDCCH in the subframe of the PF/PO with the P-RNTI, to thereby perform discontinuous reception.

In Step ST2803, the normal UE judges whether or not to have detected the allocation information masked with the P-RNTI. In a case of judging to have detected the allocation information, the normal UE moves to Step ST2804. In a case of judging to have not detected the allocation information, the normal UE judges that the paging message has not been allocated to the subframe and returns to Step ST2802, to thereby repeat the above-mentioned process.

In Step ST2804, the normal UE receives the paging message in accordance with the allocation information of the PDCCH. In Step ST2805, the normal UE judges whether or not the paging message contains a user equipment identity thereof. In a case of judging that the user equipment identity thereof is contained, the normal UE judges that paging has occurred and moves to Step ST2806. In a case of judging that the user equipment identity thereof is not contained, the normal UE judges that the paging message is not for itself and returns to Step ST2802, to thereby repeat the above-mentioned process. In Step ST2806, the normal UE starts uplink access.

The process of receiving a paging message by a normal UE in the present embodiment described above is the same as the conventional process of receiving a paging message by a user equipment irrespective of the presence or absence of an MTCD, that is, the presence or absence of an MTC specific paging RNTI. Accordingly, in the present embodiment, a normal UE is capable of employing the same process as that of the conventional paging reception method.

Figure 34:
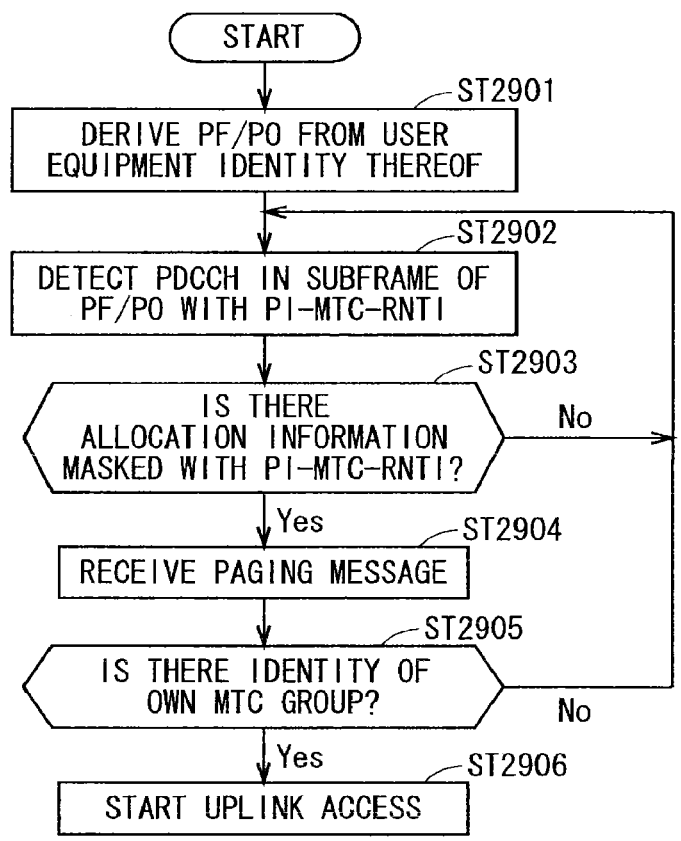
FIG. 34 is a flowchart showing a procedure of the process of receiving a paging message by an MTCD in the sixth embodiment.

FIG. 34 is a flowchart showing a procedure of the process of receiving a paging message by an MTCD in the sixth embodiment. In Step ST2901, the MTCD derives the PF/PO from a user equipment identity thereof. In Step ST2902, the MTCD detects the PDCCH in the subframe of PF/PO with the PI-MTC-RNTI, to thereby perform discontinuous reception.

In Step ST2903, the MTCD judges whether or not to have detected the allocation information masked with the PI-MTC-RNTI. In a case of judging to have detected the allocation information, the MTCD moves to Step ST2904. In a case of judging to have not detected the allocation information, the MTCD judges that the paging message is not allocated to the subframe and returns to Step ST2902, to thereby repeat the above-mentioned process.

In Step ST2904, the MTCD receives a paging message in accordance with the allocation information on the PDCCH. In Step ST2905, the MTCD judges whether or not the paging message contains an identity of an MTC group to which itself belongs. In a case of judging that the identity of the MTC group to which itself belongs is contained, the MTCD judges that there is the paging message for itself and moves to Step ST2906. In a case of judging that the identity of the MTC group to which itself belongs is not contained, the MTCD judges that the paging message is not for itself and returns to Step ST2902, to thereby repeat the above-mentioned process. In Step ST2906, the MTCD starts uplink access.

Of the process of receiving a paging message by an MTCD in the present embodiment described above, the process except for the processing of detecting the PDCCH using the PI-MTC-RNTI and the judging process based on the detection processing is the same as the conventional process of receiving paging by a user equipment. Therefore, for the MTCD, the RNTI is only required to be changed in the conventional method of receiving a paging message.

Further, a plurality of PCCHs can be mapped at the same TTIs, and each of the pieces of physical resource allocation information is masked with a different RNTI, whereby the normal UE is only required to perform the process of receiving a paging message as in the conventional case. Also, it suffices that only the RNTI is changed in the process of receiving a paging message by the MTCD, and the remaining of the process can be performed similarly to the conventional method.

In the method disclosed in the fifth embodiment, the MTCD has to perform detection with both of the MTC specific paging RNTI and P-RNTI. Meanwhile, in the present embodiment, it suffices that the PDCCH is detected with PI-MTC-RNTI solely. Therefore, it is possible to reduce the power consumption of the MTCD.

The PI-MTC-RNTI may be pre-allocated in a static manner or allocated to an MTCD from an eNB. In the case of the allocation to an MTCD from an eNB, it suffices that the eNB notifies the MTCD of the allocation in advance through an RRC message.

Alternatively, the PI-MTC-RNTI may be allocated per MTC group. The above-mentioned allocation per MTC group results in an effect that the MTCD does not need to receive a paging message for another MTC group to which itself does not belong. This further reduces the power consumption of the MTCD.

With the method disclosed in the present embodiment, also in a case where paging for normal UE and paging for MTCD occur at the same time, it is possible to call an MTCD without reducing the number of normal UEs that can be called. This avoids downlink congestion in a case where paging for normal UE and paging for MTCD occur at the same time and a shortage of radio resources for paging arising from the downlink congestion. Therefore, an increase of delay time in paging for normal UE can be prevented, which enables to construct a communication system capable of M2M communication while maintaining the communication optimum for H2H.

Seventh Embodiment

The first to sixth embodiments above have each disclosed the method of solving congestion in a case where paging is transmitted to a large number of MTCDs. The congestion in downlink communication to a large number of MTCDs occurs not only in paging transmission but also in data transmission. In the case where downlink data is transmitted over conventional dedicated channels, radio resources as many as the number of MTCDs are required for dedicated channels. Therefore, in a case where, for example, transmission of downlink data to a large number of MTCDs occurs simultaneously in the MTC service, radio resources become short, leading to a problem that downlink data cannot be transmitted.

The present embodiment discloses the method of avoiding congestion occurring in the transmission of downlink data to a large number of MTCDs. The paging mechanism is used for the transmission of downlink data for MTC service. First, the paging message contains the downlink data for MTC service.

FIG. 35 is a diagram showing an example of the information contained in a paging message in the seventh embodiment. Hereinafter, the downlink data for MTC service is referred to as "MTC data". As shown in FIG. 35, in the present embodiment, the paging message contains, for example, MTC data that is the downlink data for MTC service in addition to the information contained in a conventional paging message, specifically, "pagingRecordList" being a list of PagingRecord, "systemInfoModification", and "etws-Indication". The MTC data may be a predetermined bit count or byte count. The bit count or byte count, and a maximum value of the bit count or a maximum value of the byte count may be pre-determined in a static manner.

The downlink data for MTC service is assumed to have a small capacity. Therefore, the MTC data can be contained in the paging message. The MTC data is contained in the paging message, which enables to reduce the information other than the data required in a case of setting a dedicated channel per MTCD, that is, an overhead portion. This enables to considerably reduce radio resources for transmitting downlink data to the MTCD, whereby it is possible to avoid downlink congestion in a case where the downlink data occurs for a large number of MTCDs at the same time, and a shortage of radio resources for downlink data transmission arising from the downlink congestion. Therefore, a communication system capable of M2M communication while keeping the communication optimum for H2H can be constructed.

Next, the timing of transmitting downlink data for MTC service is disclosed. The timing of transmitting downlink data for MTC service is the PF/PO derived from a user equipment identity of the MTCD to which the downlink data is transmitted. In other words, that is the timing derived by the same method as that for the paging transmission timing. With the above-mentioned configuration, each MTCD is capable of discontinuous reception in the same cycle as that of paging, whereby an increase in power consumption of the MTCD can be prevented. In addition, the eNB and the MTCD are not required to separately decide the timing of transmitting/receiving MTC data and to notify each other of the transmission/reception timing. Therefore, it is possible to reduce a signaling amount required between the eNB and the MTCD.

Figure 36:
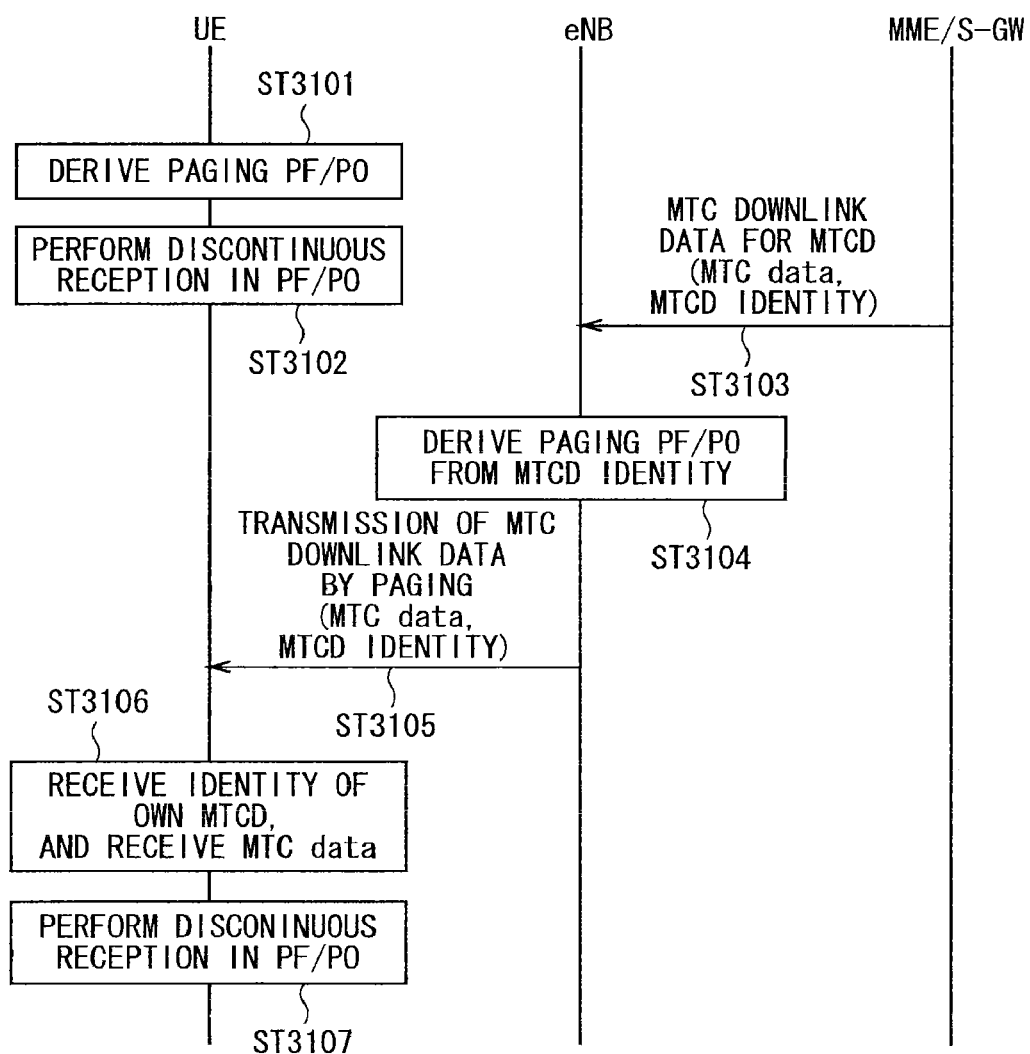
FIG. 36 is a diagram showing a sequence of the process of transmitting/receiving downlink data for MTC service using paging.

FIG. 36 is a diagram showing a sequence of the process of transmitting/receiving downlink data for MTC service with the use of paging. FIG. 36 shows the case in which a user equipment is an MTCD. In Step ST3101, the MTCD derives the PF/PO of paging based on a user equipment identity thereof. Then, in Step ST3102, the MTCD performs discontinuous reception in the PF/PO.

For example, in a case where downlink data for MTC service addressed to the MTCD occurs from an MTC server, in Step ST3103, MTC data that is the downlink data for MTC service addressed to the MTCD is transmitted to the eNB via the MME or S-GW. In Step ST3103, the MTCD user equipment identity indicating a destination MTCD is transmitted together with the MTC data that is the downlink data for MTC service.

Then, in Step ST3104, the eNB derives the PF/PO for paging from the MTCD user equipment identity. In Step ST3105, the eNB transmits MTC data that is the downlink data for MTC service, which is included in the paging message, in the subframe of the PF/PO for paging of the MTCD. In Step ST3105, the eNB transmits the MTCD user equipment identity together with MTC data.

In Step ST3106, the MTCD receives the paging message in the PF/PO for discontinuous reception. The MTCD that has received the paging message recognizes the MTC data addressed to itself through the reception of the user equipment identity thereof, and receives the MTC data contained in the paging message.

After the reception of MTC data, in Step ST3107, the MTCD shifts to discontinuous reception in the PF/PO derived from the user equipment identity thereof. In Step ST3105, the MTCD user equipment identity transmitted together with the MTC data may be contained in the paging message and paired with the MTC data to be transmitted, may be transmitted as an overhead of the paging message, or may be transmitted by another signaling or another message.

FIG. 37 is a diagram showing an example of the information contained in a paging message in a case where an MTCD user equipment identity is paired with MTC data to be transmitted. In a case of pairing the MTCD user equipment identity with the MTC data to be transmitted, as shown in FIG. 37, the paging message contains a list in which MTCD user equipment identities and pieces of MTC data for the MTCDs indicated by those MTCD identities are brought into correspondence with each other (hereinafter, referred to as "MTC data list" in some cases).

With the above-mentioned configuration, even if the downlink data for MTC service, which is addressed to a plurality of MTCDs, occurs simultaneously, the MTC data addressed to the plurality of MTCDs can be transmitted through one paging message. This enables to reduce a delay time occurring in a case where the MTCD receives the downlink data for MTC service.

Alternatively, the MTC data may be different per MTC group. In this case, it suffices that the MTC group identity is transmitted together with the paging message including data per MTC group. This allows the MTCD to judge whether or not the downlink data for MTC service is addressed to a group to which itself belongs. Still alternatively, the paging message may contain a list in which MTC group identities and pieces of MTC data for the MTC groups indicated by the MTC group identities are brought into correspondence with each other. Accordingly, it is not required to describe a plurality of MTCD user equipment identities for data per MTC group in the list, which only requires identities of the MTC groups. Therefore, an increase in amount of information of the paging message can be prevented.

Alternatively, a maximum value of the number of MTC data (hereinafter, referred to as "MTC data number" in some cases) contained in one paging message may be provided. In this case, it suffices that for example, a list in which MTC group identities for the number up to the maximum value of the MTC data number and pieces of downlink data for MTC service for the MTC groups indicated by the MTC group identities are described may be described in the paging message. The maximum value of the MTC data number may be determined in a static manner in, for example, specifications, or may be broadcast from an eNB in a semi-static manner as, for example, system information. This enables the MTCD to recognize a maximum value of the MTC data number contained in the paging message, and thus, erroneous reception of MTC data can be reduced.

The methods of the first to six embodiments above may be applied as the method of transmitting/receiving a paging message including MTC data. Similar effects to those of the present embodiment can be achieved also when the methods of the first to sixth embodiments described above are applied.

Eighth Embodiment

In a case where an MTCD is located within the same paging group as that of the normal UE when a paging message contains the information for MTC such as downlink data for MTC service, paging occurs despite the fact the paging is irrelevant to a normal UE. For this reason, the normal UE has to receive the paging, causing a problem of increased power consumption of the normal UE.

In order to solve this problem, the present embodiment discloses the method of providing the RNTI with which the physical resource allocation information is masked, per information type. As an example, MTC-RNTI is newly provided as the RNTI, with which the physical resource allocation information for the paging message including the downlink data for MTC service is masked. The RNTI, with which the physical resource allocation information for a conventional paging message that does not contain the downlink data for MTC service, is the P-RNTI as in the conventional case.

The normal UE detects the presence or absence of the allocation information masked with the P-RNTI on the PDCCH in the subframe of the PF/PO derived from the user equipment identity thereof. The normal UE does not have to receive the data for MTC, and is only required to detect the P-RNTI, with which the conventional paging information is masked. In a case where there is the allocation information masked with the P-RNTI, the normal UE may receive a paging message in accordance with the allocation information.

Meanwhile, the MTCD not only detects the presence or absence of the allocation information masked with the MTC-RNTI but also detects the presence or absence of the allocation information masked with the P-RNTI on the PDCCH in a subframe of the PF/PO derived from the user equipment identity thereof. In a case where there is the allocation information masked with the MTC-RNTI or P-RNTI, the MTCD may receive a paging message in accordance with the allocation information.

With the above-mentioned configuration, a normal UE is capable of using the same process as that of the conventional method of receiving a paging message, whereby an increase in power consumption can be prevented. Accordingly, it is possible to transmit the downlink data for MTC service to an MTCD without affecting a normal UE. Therefore, a communication system capable of M2M communication while keeping the communication optimum for H2H can be constructed.

In a case of the MTC service in which paging for MTCD does not occur, an MTCD does not have to detect the presence or absence of the allocation information masked with the P-RNTI but is only required to detect the allocation information masked with the MTC-RNTI.

3GPP is studying to cause a paging message to contain an indicator indicating that the downlink data for MTC service is broadcast in system information. The paging message including the indicator may be masked with MTC-RNTI. This enables to achieve similar effects to those described above.

Ninth Embodiment

Disclosed here is another method of avoiding congestion occurring in the transmission of downlink data to a large number of MTCDs. Radio resources for the transmission of downlink data for MTCD or for MTC service per MTC group, specifically, radio frames and subframes are provided. The information for notifying whether or not the data for MTC service has been generated is newly provided. For example, the information for notifying whether or not the data for MTC service has been generated is "MTC information notification".

Figure 38:
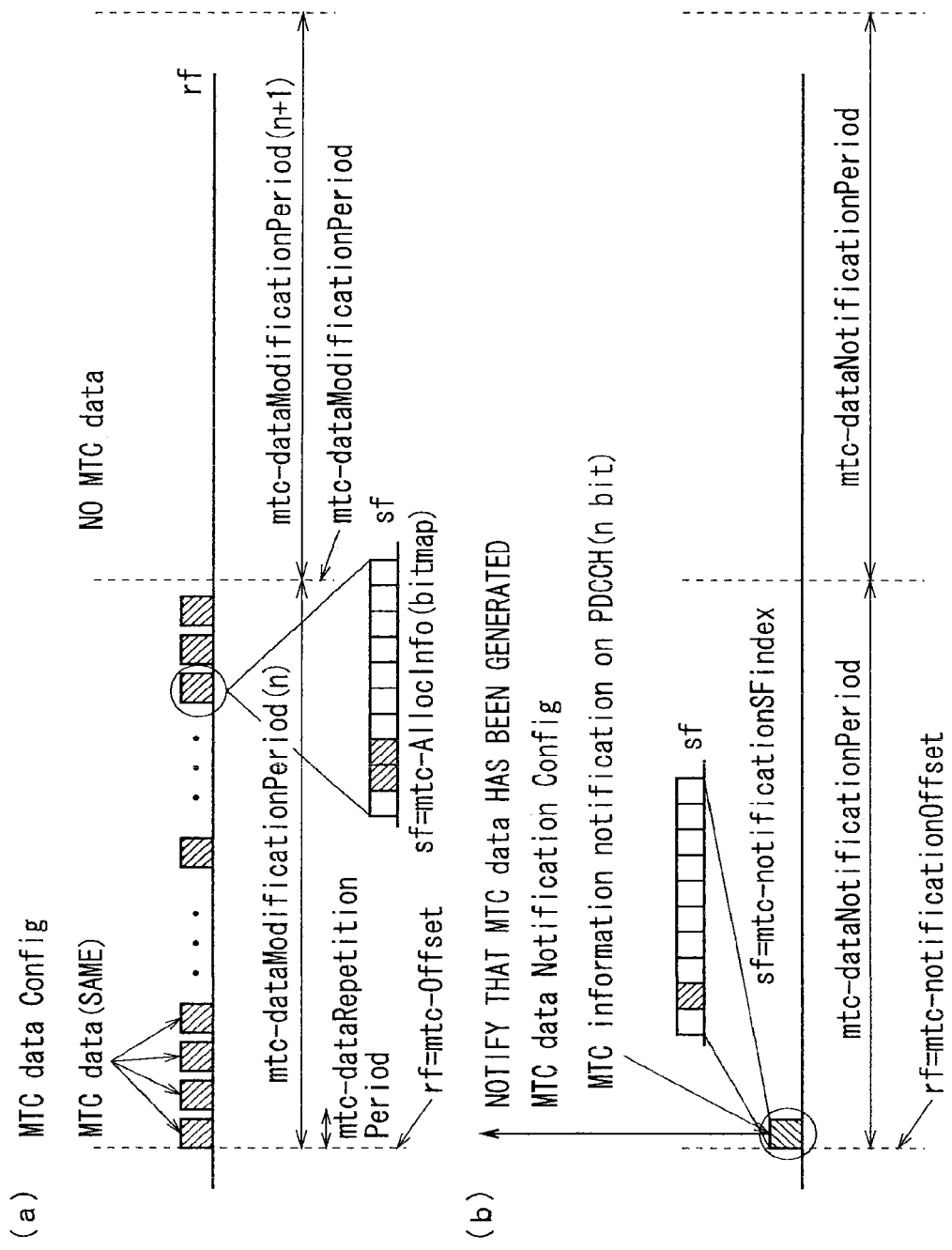
FIG. 38 is a diagram illustrating a specific example of the method of transmitting the information for notifying whether or not the data for MTC service has been generated and downlink data for MTC service.

FIG. 38 is a diagram illustrating a specific example of the method of transmitting the information for notifying whether or not the data for MTC service has been generated and downlink data for MTC service. Part (a) of FIG. 38 shows the configuration of the transmission of downlink data for MTC service (hereinafter, referred to as "MTC data Config" in some cases), and part (b) of FIG. 38 shows the configuration of the transmission of the information for notifying whether or not the data for MTC service has been generated (hereinafter, referred to as "MTC data Notification Config" in some cases).

In the present embodiment, the radio resource dedicated for downlink data for MTC service (MTC data) (hereinafter, referred to as "MTC data radio resource" in some cases) is periodically provided. That period is referred to as "MTC data repetition period (mtc-dataRepetitionPeriod)". An offset value is provided for determining the radio frame of the MTC data radio resource. The offset value is referred to as "mtc-Offset". In order to determine a subframe of the MTC data radio resource, the subframe allocation information is provided. The subframe allocation information is referred to as "mtc-AllocInfo". The allocation information may be one or a plurality of subframe numbers or a bitmap in which bits respectively correspond to the subframe numbers. FIG. 38 shows the case in which the allocation information is represented as a bitmap.

As shown in part (a) of FIG. 38, the MTC data is repeatedly transmitted in the MTC data radio resources for a predetermined period. This predetermined period is referred to as "mtc-dataModificationPeriod". The same MTC data may be repeatedly transmitted for a predetermined period.

In a case where the MTC data differs per MTCD, it suffices that radio resources on a subframe are allocated to the MTC data per MTCD, the allocation information thereof is masked with a user equipment identity of the MTCD, for example, UE-ID or C-RNTI, and the allocation information is mapped to the PDCCH. The MTCD searches the subframe in the radio frame of the MTC data with the use of an MTCD user equipment identity thereof, and judges whether or not there is the MTC data. In a case of detecting that the MTCD user equipment identity thereof has been masked, the MTCD is only required to receive the MTC data in accordance with the allocation information.

In a case where the same MTC data is transmitted to the all MTCDs being served by a cell, a specific RNTI, for example, mtc-data-RNTI may be provided, the MTC data radio resource allocation information may be masked with the RNTI, and the allocation information may be mapped to the PDCCH. Accordingly, the MTCD detects the allocation of MTC data radio resource with the use of RNTI, that is, mtc-data-RNTI, to thereby receive the MTC data. In a case where the MTCD cannot detect RNTI, specifically, mtc-data-RNTI, it suffices that the MTCD assumes that the MTC data has not been generated and avoids the process of receiving the MTC data. This enables to reduce the power consumption of the MTCD.

As shown in part (b) of FIG. 38, the timing at which the information for notifying whether or not the data for MTC service has been generated (MTC information notification) can be transmitted is made periodic. That period is referred to as "mtc-dataNotificationPeriod". An offset value is provided for determining a radio frame of the MTC information notification. The offset value is referred to as "mtc-notificationOffset". Additionally, the subframe allocation information is provided for determining the subframe of the MTC information notification. The subframe allocation information is referred to as "mtc-notificationSFindex". One subframe may be allocated, which is taken as a subframe number. Alternatively, a plurality of subframes may be set for the MTC information notification, and subframe numbers may be used as the allocation information of the subframe, or there may be provided a bitmap in which bits respectively correspond to subframe numbers.

The MTC data notification period may be the same as mtc-dataModificationPeriod. Further, the offset value (mtc-notificationOffset) may be the same as mtc-Offset. This enables the MTCD that has detected the MTC information notification to immediately perform the process of receiving the MTC data. Therefore, it is possible to reduce a control delay until the MTCD receives the MTC data.

In a case where the MTCD performs discontinuous reception, mtc-dataNotificationPeriod may be same period as the discontinuous reception period. This results in lower power consumption of the MTCD.

The MTC information notification may be mapped to the PDCCH. The physical resource allocation information of the PDSCH, which accompanies the MTC information notification, may not be contained. This allows the notification with few radio resources. There is no allocation of the PMCH or PDSCH.

A specific RNTI, for example, mtc-notification-RNTI may be provided, the MTC information notification may be masked with the RNTI and mapped to the PDCCH. As a result, the MTCD detects the MTC information notification on the PDCCH with the use of RNTI, to thereby know the generation of MTC data. In a case where the RNTI cannot be detected at the timing at which the MTC information notification is transmitted, the MTCD can recognize that the MTC data has not been generated and thus is not required to perform the process of receiving the MTC data. This enables to reduce the power consumption of the MTCD. Additionally, the normal UE can avoid receiving the PDCCH.

The mtc-notification-RNTI may be set solely for an MTC. Alternatively, the mtc-notification-RNTI may be pre-determined in a static manner or may be broadcast in the system information. In the case of the determination in a static manner, an amount of information which requires signaling can be reduced. In the case of the broadcast as the system information, the mtc-notification-RNTI does not have to be reserved in advance and can be changed, which allows flexible and efficient operation as a system.

Figure 40:
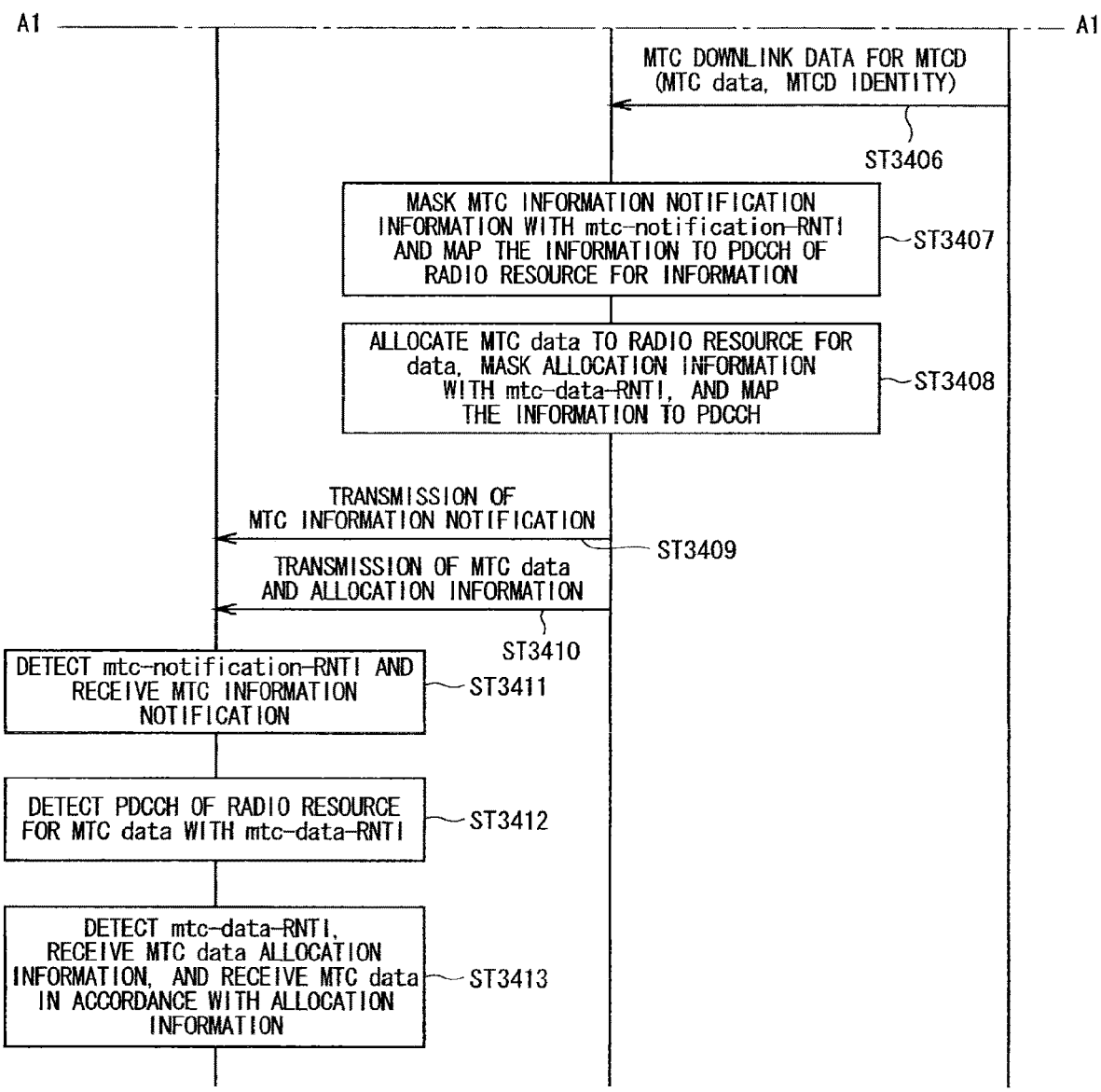
FIG. 40 is another diagram showing the sequence of the process of transmitting/receiving downlink data for MTC service in the ninth embodiment.

FIG. 39 and FIG. 40 are diagrams each showing a sequence of the process of transmitting/receiving downlink data for MTC service in the ninth embodiment. FIG. 39 and FIG. 40 are continuous with each other at a position of a boundary A1. FIG. 39 and FIG. 40 show the case in which a user equipment is an MTCD. Prior to the transmission of MTC data, in Step ST3401, an eNB determines the configuration of the radio resource for MTC data. Then, in Step ST3402, the eNB determines the configuration of the radio resource for MTC information notification that is the information for notifying whether or not the data for MTC service has been generated. In Step ST3403, the eNB broadcasts, to user equipments (UEs) being served thereby, the configuration of the radio resource for MTC data in the system information. Further, in Step ST3404, the eNB broadcasts, to the user equipments (UEs) being served thereby, the configuration of the radio resource for MTC information notification in the system information. The MTCD receives the configuration of the radio resource for MTC data and the configuration of radio resource for MTC information notification that have been broadcast from the eNB.

In Step ST3405, the MTCD discontinuously receives the radio resource in accordance with the configuration of the radio resource for MTC information notification, and detects the PDCCH in the subframe thereof with the use of mtc-notification-RNTI that is the RNTI for MTC information notification.

For example, in a case where the downlink data for MTC service, which is addressed to an MTCD from an MTC server, is generated, in Step ST3406, the MTC data that is the downlink data for MTC service, which is addressed to an MTCD, is transmitted to the eNB via the MME or S-GW. In Step ST3406, an MTCD user equipment identity indicating a destination MTCD is transmitted together with the MTC data.

Then, in Step ST3407, the eNB masks the information for notifying whether or not the data for MTC service has been generated with the RNTI for that information, and maps the information to the PDCCH in a subframe of a radio resource for that information, which has been determined in Step ST3402. Further, in Step ST3408, the eNB maps the MTC data to the radio resource for MTC data, which has been determined in Step ST3401, masks the allocation information for that radio resource with mtc-data-RNTI that is the RNTI for MTC data, and maps the allocation information to the PDCCH.

In Step ST3409, the eNB transmits the MTC information notification with the use of the radio resource determined in Step ST3402. Then, in Step ST3410, the eNB transmits the MTC data and the allocation information for that data with the use of the radio resource determined in Step ST3401.

In Step ST3411, the MTCD that has performed discontinuous reception in Step ST3405 detects mtc-notification-RNTI, to thereby receive an MTC information notification. The MTCD can recognize the transmission of MTC data by receiving the MTC information notification. Accordingly, in Step ST3412, the MTCD detects the PDCCH in a radio resource for MTCD data with mtc-data-RNTI. In Step ST3413, when detecting mtc-data-RNTI, the MTCD receives the MTC data allocation information of the PDCCH and receives the MTC data in accordance with the received allocation information.

This enables the transmission/reception of the downlink data for MTC service without using paging.

As described above, a radio frame and a subframe that are radio resources for the transmission of downlink data for MTCD or for MTC service per MTC group are provided, and the information for notifying whether or not the data for MTC service has been generated is newly provided. This enables to reduce the information other than the data required in a case of configuring a dedicated channel per MTCD at the timing per MTCD, that is, reduce an overhead portion.

This does not require the use of a logical control channel for MTC to transmit the downlink data for MTC service, whereby the radio resources for transmitting the downlink data for an MTCD can be reduced considerably. This enables to avoid downlink congestion in a case where downlink data is generated for a number of MTCDs at the same time, and a shortage of radio resources for downlink data transmission arising from the downlink congestion. Therefore, it is possible to construct a communication system capable of M2M communication while keeping the communication optimum for H2H.

In the present embodiment, the information for notifying whether or not the data for MTC service has been generated is used, and thus, the MTCD is capable of explicitly recognizing the case in which the downlink data for MTC service is generated. Accordingly, in the case in which the downlink data for MTC service is not generated, the eNB is capable of using the radio resource for other communication. Therefore, the use efficiency of radio resources used in downlink data communication can be improved as a communication system.

In the present embodiment, the radio resource is periodically provided, which is for transmitting the information for notifying whether or not the downlink data for MTCD or for MTC service per MTC group and the data for MTC service have been generated. Accordingly, the MTCD is capable of discontinuous reception, whereby an increase in power consumption of the MTCD can be suppressed.

In the present embodiment described above, the MTC information notification is newly provided as the information for notifying whether or not the data for MTC service has been generated. Alternatively, the MTC information notification may be newly provided as the information for notifying whether or not the data for MTC service has been changed, not whether or not the data for MTC service has been generated.

For example, in mtc-dataModificationPeriod following mtc-dataModificationPeriod that is the period in which the MTC data is repeated, the MTC data may be changed. The MTC information notification may be used for notifying that the MTC data has been changed.

Figure 41:
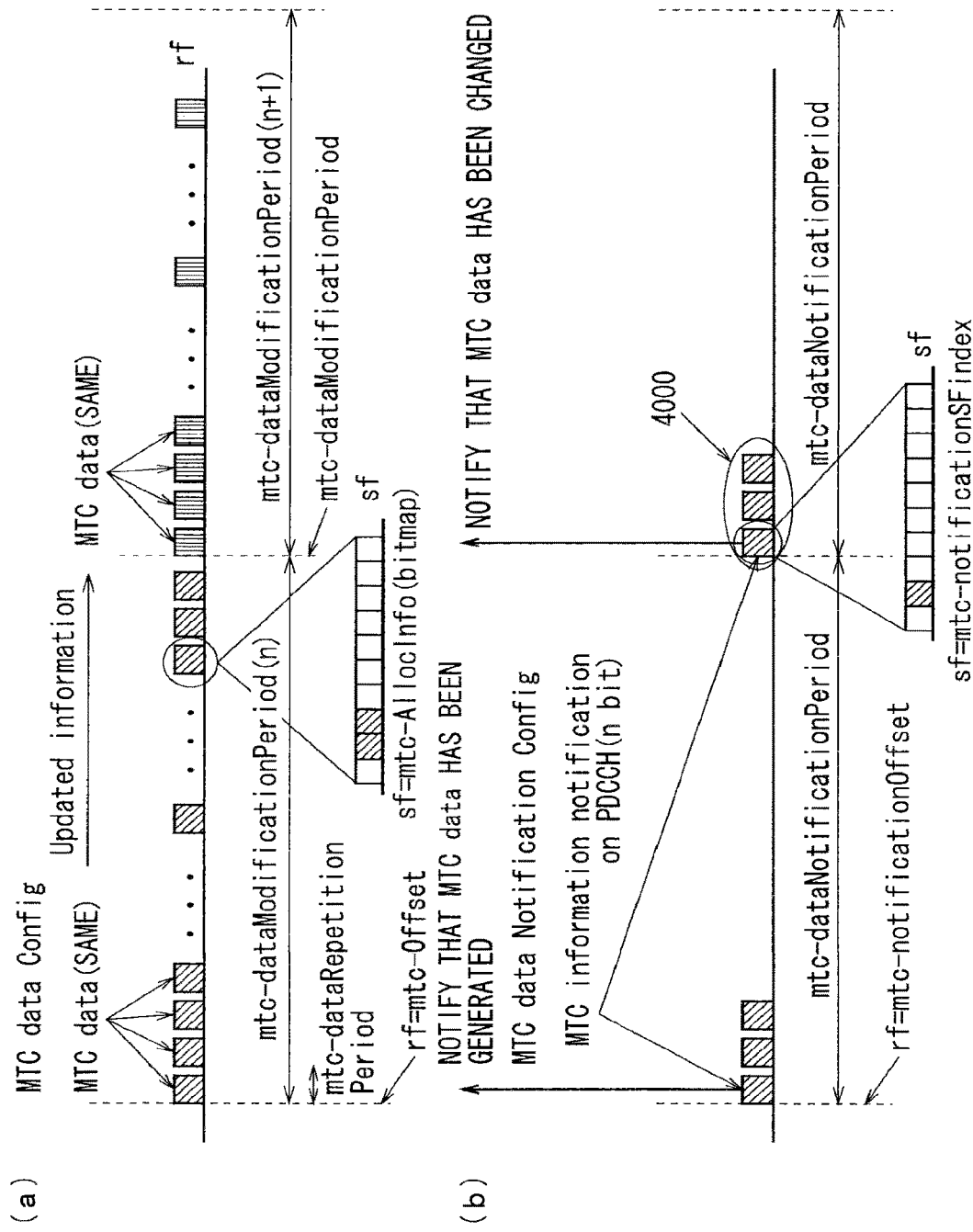
FIG. 41 is a diagram illustrating a specific example of a notification method in a case where data for MTC service has been changed.

FIG. 41 is a diagram illustrating a specific example of a notification method in a case where the data for MTC service has been changed. Part (a) of FIG. 41 shows the configuration of the transmission of downlink data for MTC service (MTC data Config), and part (b) of FIG. 41 shows the configuration of the transmission of the information for notifying whether or not the data for MTC service has been changed or generated (MTC data Notification Config).

The configuration of the radio resource for transmitting MTC data that is the downlink data for MTC service, which is shown in part (a) of FIG. 41, is the same as the configuration shown in part (a) of FIG. 38. The MTC data is changed after the same MTC data is repeatedly transmitted for a predetermined period (mtc-dataModificationPeriod), and the changed MTC data is repeatedly transmitted for the following predetermined period (mtc-dataModificationPeriod).

The configuration of the radio resource of MTC information notification that is the information for notifying whether or not the data for MTC service has been generated, which is shown in part (b) of FIG. 41, is the same as the configuration shown in part (b) of FIG. 38 described above. The radio resource is periodically configured per MTC-dataNotificationPeriod. In the radio resource in MTC-dataNotificationPeriod that corresponds to MTC-dataModificationPeriod, an MTC information notification for notifying that the MTC data has been generated is transmitted.

In a case where the MTC data is changed in MTC-dataModificationPeriod that is a predetermined period in which the following MTC data is repeatedly transmitted, in the radio resource in MTC-dataNotificationPeriod corresponding to MTC-dataModificationPeriod, the MTC information notification is transmitted for notifying that the MTC data has been changed.

As described above, not only in a case where the MTC data has been generated, but also in a case where the MTC data has been changed, through the transmission of MTC information notification that is the information for notifying whether or not the data for MTC service has been generated, the MTCD can recognize that the MTC data has been changed. Therefore, even in a case where the MTC data is continuously transmitted, the MTCD can recognize that the MTC data is different from the previous MTC data, and thus is capable of selectively receiving the changed MTC data. The MTC information notification is mapped to, for example, the PDCCH. There is no allocation to the PMCH or PDSCH.

The information for notifying whether or not the data for MTC service has been generated or changed may contain the information indicating whether or not the data is the same as in the previous MTC-dataModificationPeriod. This information indicating whether or not the data is the same as in the previous MTC-dataModificationPeriod may be used as an indicator. For example, as one bit information, the case of "0" may indicate the same data and the case of "1" may indicate different data.

The MTCD can receive the required MTC data by receiving the information indicating whether or not the MTC data is the same data, which is contained in the information for notifying whether or not the data for MTC service has been generated. For example, in a case where the same MTC data is transmitted over a plurality of MTC-dataModificationPeriods, the MTCD that has received the MTC data in the first MTC-dataModificationPeriod does not have to receive the MTC data in the MTC-dataModificationPeriod thereafter as long as the information indicating whether or not the MTC data is the same data indicates the same data. It suffices that the MTCD receives the information indicating whether or not the MTC data is the same data and receives the MTC data only in a case where the information indicates different data. Accordingly, the MTCD is only required to selectively receive the MTC data, and thus an unnecessary reception process can be eliminated and consumption power can be reduced.

The information for notifying whether or not the data for MTC service has been generated or changed may be notified discontinuously or periodically in mtc-dataNotificationPeriod. The period at that time may be an MTC data repetition period (mtc-dataRepetitionPeriod). The MTCD does not have to receive the information for notifying whether or not the data for MTC service has been generated or changed per mtc-dataRepetitionPeriod but is only required to receive the information once in mtc-dataNotificationPeriod.

Part (b) of FIG. 41 also shows the case in which the information for notifying whether or not the data for MTC service has been generated or changed is discontinuously notified. The subframe configuration is the same in each radio frame. As indicated by reference numeral "4000" in part (b) of FIG. 41, the information for notifying whether or not the data for MTC service has been generated or changed is discontinuously transmitted in, for example, a radio frame derived from MTC-notificationOffset and MTC-dataNotificationPeriod, and a subframe represented by MTC-notificationSFindex. The information may be transmitted discontinuously for a predetermined period or transmitted discontinuously a predetermined number of times. The predetermined period or predetermined number of times may be broadcast as the system information from the eNB, or may be broadcast as the system information having the same configuration of the radio resource for the information for notifying whether or not the data for MTC service has been generated or changed.

Accordingly, even if there occurs a case in which the MTCD cannot receive the information for notifying whether or not the data for MTC service has been generated or changed, the MTCD can recognize whether or not the MTC data has been generated or changed by receiving the following information. This enables to reduce an error in receiving the MTCD.

The MTC information notification may be provided per MTC group. For example, on the PDCCH, the information that is provided for the information for notifying whether or not the data for MTC service has been generated or changed may have n-bits such that a value of the n-th power of 2 ($2^n$) corresponds to each MTC group.

The value of n, and the correspondence relationship between the value of n and the MTC group identity may be determined as a system or may be determined per TA or per cell. The value of n, and the correspondence relationship between the value of n and the MTC group identity may be determined in a statistic manner, for example, in specifications in advance. Alternatively, those may be determined in a semi-static manner. For example, a value per TA or each cell may be broadcast from an eNB to user equipments being served thereby as the system information. Still alternatively, there may be used the method disclosed in the first modification of the second embodiment, in which an identity of an MTC group in a system, an identity of an MTC group in the TA, an identity of an MTC group in the cell, or the like is used as the identity of the MTC group.

In a case where the MTC data is transmitted per MTC group, RNTI may be provided per MTC group, the radio resource allocation information of the MTC data of each MTC group may be masked with the RNTI and then mapped to the PDCCH. As a result, the MTCD can receive the MTC data allocation information and the MTC data using the RNTI of the MTC group to which itself belongs. This prevents the reception of the MTC data allocation information and MTC data for another MTC group. Accordingly, the transmission/reception of the MTC data is enabled per MTC group, resulting in a reduction of power consumption in reception by the MTCD.

In a case where the MTC data differs among MTCDs, the MTC data per MTCD may be allocated to a dedicated channel. For example, the MTC data for a specific MTCD is mapped to the DTCH and is multiplexed per MTCD to be mapped to the DL-SCH. In a case where multiplexing is not required, multiplexing may be omitted. The DL-SCH is mapped to the PDSCH as is conventional. In a case where an uplink control channel can be transmitted per MTCD, a HARQ may be made for the MTC data in a MAC layer.

In a case where the same MTC data is transmitted to the all MTCDs being served by a cell, it suffices that the MTC data is allocated to a common channel. For example, a logical channel of the common channel is mtc-CTCH. The mtc-CTCH may be mapped to the transport channel DL-SCH and mapped to the PDSCH. In a case of MTC-CTCH, a HARQ cannot be made per MTCD, and thus, a HARQ should not be made.

In a case where the MTC data differs among MTC groups and the MTC data is the same in the MTC group, the MTC data may be allocated to a channel per MTC group. For example, the logical channel per MTC group is mtc-TCH, and the MTC data for a specific MTC group is mapped to mtc-TCH and is multiplexed per MTC group to be mapped to the DL-SCH. In a case where multiplexing is not required, multiplexing may be omitted. The DL-SCH is mapped to the PDSCH as is conventional. In a case of a channel per MTC group, a HARQ cannot be made per MTCD, and thus, the HARQ should not be made.

Through the above, the downlink data for the MTCD does not need to be transmitted per MTCD, which enables to considerably reduce radio resources for the transmission of downlink data for MTC service.

The radio resource configuration for MTC data and the radio resource configuration of the information for notifying whether or not the data for MTC service has been generated may be set per MTC group. That is, the radio resource configuration may differ among MTC groups. The radio resource configuration per MTC group may be broadcast to user equipments being served by an eNB in the system information. The radio resource configurations of the all MTC groups may be brought into correspondence with the MTC group identities to be included in the same system information block (SIB). This enables to set the radio resource configuration corresponding to the MTC service per MTC group. Therefore, the radio resource configuration can be set flexibly in accordance with the MTC service, which enables to improve the efficiency of using radio resources.

As to the period of the information for notifying whether or not the data for MTC service has been generated (mtc-dataNotificationPeriod), values for each MTC group may be set as multiples or divisors of each other. This enables to match the timing at which the MTCDs belonging to a plurality of MTC groups need reception. Accordingly, the power consumption of an MTCD can be reduced.

It suffices that the period of a radio resource for MTC data (mtc-dataModificationPeriod) is also set such that the values for each MTC group are multiples or divisors of each other similarly to the information for notifying whether or not the data for MTC service has been generated. Accordingly, similar effects can be achieved.

First Modification of Ninth Embodiment

In the present embodiment, the radio resource for MTC data that is the downlink data for MTC service is periodically provided, and the MTC data is repeatedly transmitted for a predetermined period. In the present modification, the transmission of MTC data becomes off, that is, is stopped after a lapse of a predetermined period.

Figure 42:
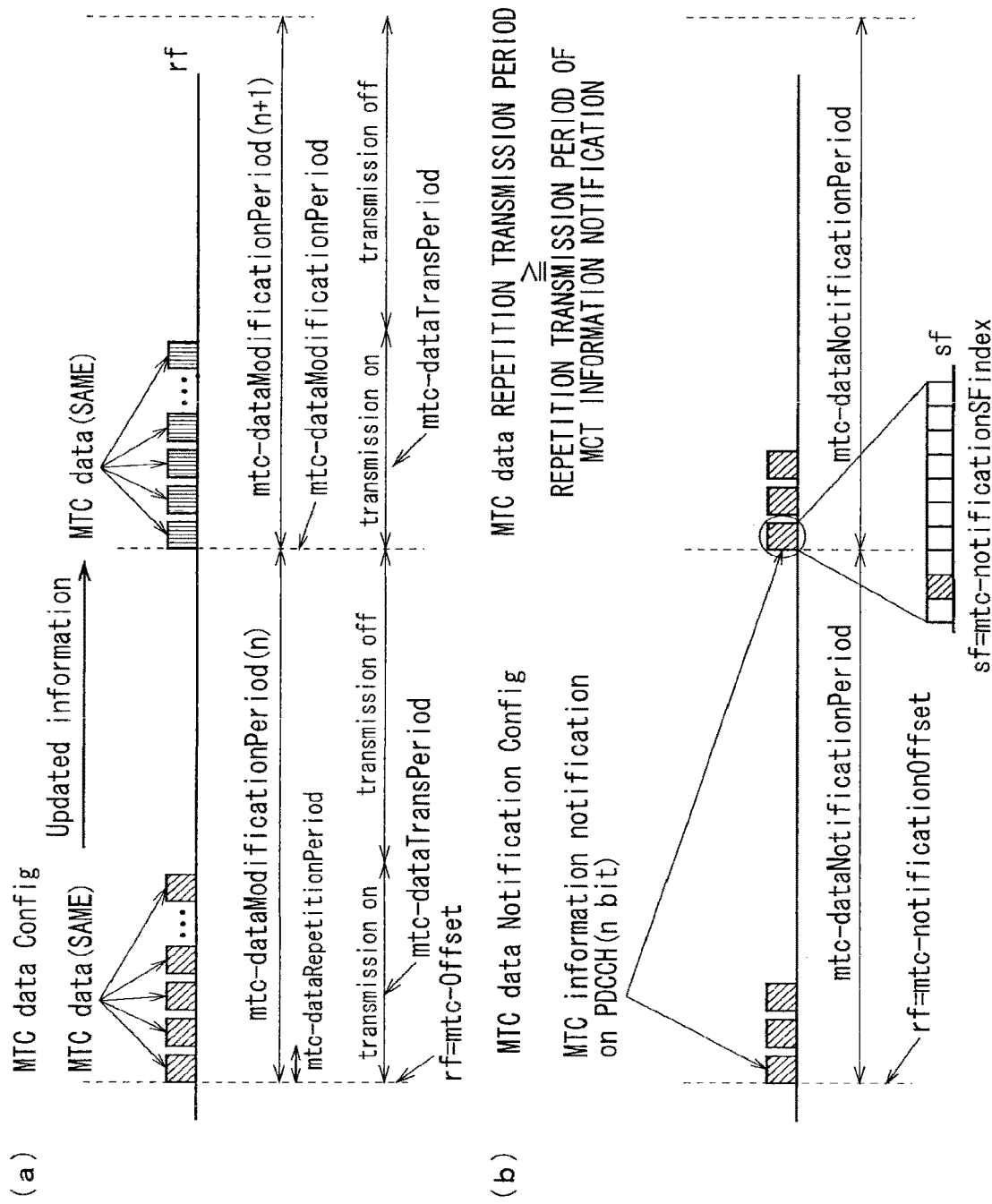
FIG. 42 is a diagram illustrating a specific example in a case where the transmission of MTC data becomes off after a lapse of a predetermined period.

FIG. 42 is a diagram illustrating a specific example in a case where the transmission of MTC data becomes off after a lapse of a predetermined period. Part (a) of FIG. 42 shows the configuration of the transmission of downlink data for MTC service (MTC data Config), and part (b) of FIG. 42 shows the configuration of the transmission of the information for notifying whether or not the data for MTC service has been generated (MTC data Notification Config).

The configuration of the radio resource of the MTC information notification that is the information for notifying whether or not the data for MTC service has been generated, which is shown in part (b) of FIG. 42, is the same as the configuration shown in part (b) of FIG. 41 described above. The configuration of a radio resource for MTC data that is the downlink data for MTC service, which is shown in part (a) of FIG. 42, partially differs from the configuration shown in part (a) of FIG. 41 described above. A different portion is described.

In the present modification, a period in which the MTC data is transmitted and a period in which the MTC data is not transmitted are provided in MTC-dataModificationPeriod. For example, the period in which the MTC data is transmitted is MTC-dataTransPeriod. In MTC-dataTransPeriod, the MTC data is repeatedly transmitted in the cycle MTC-dataRepetitionPeriod. After MTC-dataTransPeriod, the MTC data is not transmitted and the transmission becomes off until the following MTC-dataModificationPeriod.

The period in which the MTC data is not transmitted may be used for other communication without securing the radio resource for MTC data.

As another example of providing the period in which the MTC data is transmitted and the period in which the MTC data is not transmitted, the number of times the MTC data is repeatedly transmitted may be used. For example, the number of transmission times is n. In this case, the MTC data is repeatedly transmitted in cycles of MTC-dataRepetitionPeriod, whereby the period in which the MTC data is transmitted is n*MTC-dataRepetitionPeriod.

The period in which the MTC data is transmitted may be set to be equal to or larger than the period or the number of times in which the MTC information notification is repeatedly transmitted, which is disclosed in the present embodiment. As a result, the MTCD can receive the MTC data at least once even if recognizing whether or not the MTC data has been generated or changed by receiving any MTC information notification.

The period in which the MTC data is transmitted and the period in which the MTC data is not transmitted may be broadcast in the system information from an eNB. Those periods may be broadcast as the system information having the same configuration as that of the radio resource for MTC data that is the downlink data for MTC service. It is not required to notify both of the period in which the MTC data is transmitted and the period in which the MTC data is not transmitted, and any of them may be notified. The period can be derived from MTC-dataModificationPeriod. Alternatively, not the period in which the MTC data is transmitted but a difference value with the period in which the MTC information notification is repeatedly transmitted may be notified.

By the method disclosed in the present modification, the eNB does not have to transmit the same MTC data more than needed. This enables to reduce the amount of information of downlink data on a Uu interface, and thus, the congestion in downlink data transmission in a case where a large number of MTCDs are located can be reduced. In addition, the radio resource can be allocated to other communication in a period in which the transmission of MTC data becomes off. Accordingly, the amount of information in data transmission and speed of data transmission can be increased as a system.

Second Modification of Ninth Embodiment

The ninth embodiment and the first modification of the ninth embodiment have each described the method in which a logical control channel for MTC is not used for transmitting MTC data that is the downlink data for MTC service. As an example, the radio resource configuration of the downlink data for MTC service is broadcast in the broadcast information, and the MTC information notification is provided on the PDCCH, to thereby notify whether or not the MTC data has been generated or changed. In a case of receiving the MTC information notification and recognizing the presence of the MTC data, the MTCD receives the MTC data in accordance with the radio resource configuration of the downlink data for MTC service in the broadcast information.

The present modification is configured to provide a control channel for MTC (hereinafter, referred to as "MTC control channel" in some cases). The pieces of configuration information of the radio resources for MTC data for all MTC groups are mapped to a control channel for MTC. It suffices that the control channel for MTC is a common channel, not a dedicated channel per MTCD. The configuration of the radio resource to which the control channel for MTC is mapped is broadcast from an eNB to user equipments being served thereby as the system information.

As a specific example of the configuration of the radio resource to which the control channel for MTC is mapped, the configuration may be made similarly to the configuration of the radio resource of the MTC information notification. It suffices that the radio resource to which the control channel for MTC is mapped is periodic, and the cycle thereof, an offset value for determining a radio frame, and a subframe number or subframe allocation for determining the subframe are provided.

Alternatively, a specific RNTI for the control channel for MTC, for example, MTC-control-RNTI may be provided, and the physical resource allocation information of the control channel for MTC may be masked with the use of RNTI and mapped to the PDCCH. Accordingly, the MTCD detects the allocation information with use of the RNTI, to thereby receive the control channel for MTC.

The MTCD receives the MTC control channel in accordance with the information of a radio resource configuration of the MTC control channel broadcast from the eNB, and receives the configuration information of the MTC service downlink data for the MTC group to which itself belongs. It suffices that the MTCD receives the MTC data in accordance with the configuration information of the downlink data for MTC service. This enables the MTCD to receive the MTC data transmitted per MTC group.

The configuration information of the radio resource for MTC data for MTC group is mapped to the control channel for MTC, and thus, it is not required to broadcast, as the broadcast information, the radio resource configuration for the downlink data for MTC service. This enables to reduce the broadcast information. This effect becomes more conspicuous when the number of MTC groups to be supported increases.

In the specific example above, the pieces of configuration information of the radio resources for MTC data for all MTC groups are mapped to the control channel for MTC. Alternatively, in addition to the above, mapping may be performed including the configuration information of the MTC information notification for notifying whether or not the data for MTC service has been generated or changed, which has been disclosed in the ninth embodiment and the first modification of the ninth embodiment.

The MTCD receives the MTC control channel in accordance with the information of the radio resource configuration of the MTC control channel broadcast from the eNB, and receives the configuration information of the MTC information notification together with the configuration information of the downlink data for MTC service, which is directed to the MTC group to which itself belongs.

The MTCD receives the MTC information notification in accordance with the configuration information of the MTC information notification and recognizes whether or not the MTC data has been generated or changed. It suffices that the MTCD that has recognized the generation or change of the MTC data receives the MTC data in accordance with the configuration information of the MTC data of the MTC group to which itself belongs, which has been mapped to the MTC control channel.

Accordingly, the MTCD is capable of receiving the MTC data after recognizing the generation or change of the MTC data transmitted per MTC group. This allows the MTCD to omit the unnecessary reception processing for receiving the MTC data, leading to lower power consumption.

Tenth Embodiment

In some cases, a large number of MTCDs transmit the uplink RACH simultaneously. An example of the above is attach procedure in a case where power is temporarily turned off, that is, power-off, and then power is turned on, that is, power-on. This is because detach procedure is set to be performed after power is turned off in many cases.

In a case where the configuration is made such that a large number of MTCDs are turned on at the same time as the MTC service, attach procedure occurs simultaneously. Attach procedure starts from an uplink RACH procedure. As the method of avoiding the simultaneous generation of attach procedure in a large number of MTCDs, an MTCD may avoid detach procedure during power is turned off. However, resources of upper nodes are kept reserved if detach procedure is not performed.

It is assumed that an MTCD has a long time interval between turning-off of power and the next communication. Therefore, there is no use in the continuation of a state in which the resources for upper nodes are reserved for a long period of time, which leads to poor use efficiency. As a countermeasure against this, Non-Patent Document 13 describes that also in a case where there is no detach procedure from an MTCD, an upper node performs detach procedure. Non-Patent Document 13 does not describe a specific operation.

Disclosed here is an example of a specific operation of the method in which an upper node performs detach procedure in a case where there is no detach procedure from an MTCD. For example, in a case where an MTCD transmits uplink data after attach procedure, an upper node performs detach procedure after the end of the transmission of uplink data from the MTCD, and the resource of the upper node is released. Accordingly, the MTCD does not have to perform detach procedure, whereby it is possible to turn off power after the end of the transmission of uplink data.

However, in a case where an upper node performs detach procedure, the MTCD has to necessarily perform attach procedure in transmitting the next uplink data even if there is a short period of time until the transmission of the next uplink data by the MTCD. This leads to an increase of uplink RACHs. In addition, in a case where the upper node performs detach procedure, there arises another problem that whether or not the MTCD needs attach procedure in transmitting the next uplink data or power-on is ambiguous.

The present embodiment discloses the method of solving the above-mentioned problems and avoiding uplink congestion due to an increase of uplink RACHs. In the present embodiment, the information regarding whether or not attach procedure is required in the transmission by an MTCD (hereinafter, referred to as "attach necessary/unnecessary information" in some cases) is provided and the upper node notifies the MTCD of the information in advance. The above may be the information regarding whether or not attach procedure is required when the power of the MTCD turns on.

The following three (1) to (3) are disclosed as specific examples of the upper node that notifies the MTCD of the attach necessary/unnecessary information; (1) MME, (2) SGSN, and (3) HSS. In addition, the upper node that notifies the MTCD of the attach necessary/unnecessary information and the upper node that automatically initiates detach procedure may be the same.

The following four (1) to (4) are disclosed as specific examples of the method of notifying the attach necessary/unnecessary information; (1) a notification is made in the initial attach procedure from the MTCD, (2) a notification is made in the notification of the next transmission time or power-on time from the upper node to the MTCD, (3) a notification is made in processing a TAU from the MTCD, and (4) a notification is made in processing a service request from the MTCD. For example, in the case where a notification is made from the MME in the initial attach procedure from the MTCD, the MME notifies an eNB of the attach necessary/unnecessary information contained in the attach accept message on S1 signaling. The eNB that has received the attach necessary/unnecessary information notifies the MTCD of the attach necessary/unnecessary information contained in the RRC connection reconfiguration message. Not limited to the above, the attach necessary/unnecessary information may be contained in an attach completion message transmitted from the eNB to the MTCD.

The following two (1) and (2) are disclosed as specific examples of the information regarding whether or not attach procedure is required in the transmission or power-on by the MTCD, that is, the attach necessary/unnecessary information; (1) a threshold for judging whether or not attach procedure is required, and (2) an indicator regarding whether or not attach procedure is required.

A specific example in a case where the attach necessary/unnecessary information is the threshold for judging whether or not attach procedure is required is disclosed. A threshold is provided in a period of time between the end of the transmission of uplink data and the next transmission by the MTCD. For example, the threshold is Th-attach. In a case where the period of time between the end of the transmission of uplink data and the next transmission by the MTCD is equal to or more than Th-attach or is more than Th-attach, the MTCD performs attach procedure. In a case where the period of time between the end of the transmission of uplink data and the next transmission by the MTCD is equal to or less than Th-attach or is less than Th-attach, the MTCD does not perform attach procedure. The entity that judges whether or not attach procedure is required may be an MTCD. It suffices that the MTCD makes a judgment by a threshold and a period of time until the transmission of the next uplink data.

A specific example in the case where the attach necessary/unnecessary information is an indicator regarding whether or not attach procedure is required is disclosed here. For example, the attach necessary/unnecessary information has one bit, where attach procedure is performed in transmitting the next uplink data in the case of "1" and attach procedure is not performed in transmitting the next uplink data in the case of "0". The entity that judges whether or not attach procedure is required may be an upper node. For example, it suffices that in a case of recognizing the transmission time of the next uplink data by the MTCD, the upper node judges whether or not attach procedure is required based on the transmission time of the next uplink data by the MTCD.

In a case where the threshold for judging whether or not attach procedure is required is used as the attach necessary/unnecessary information regarding whether or not attach procedure is required in the transmission or power-on by the MTCD, the threshold may be determined in a static manner. For example, the threshold may be determined in advance in specifications. If the threshold is determined in a static manner as described above, the MTCD does not need to be notified of the threshold, leading to an effect that a signaling amount is reduced.

The upper node releases resources in accordance with the predetermined conditions. As specific examples of the predetermined conditions, the following two (1) and (2) are disclosed. The conditions below correspond to disconnection conditions; (1) in a case where the threshold for judging whether or not attach procedure is required is exceeded, and (2) in a case where it is judged that attach procedure is required in transmitting the next uplink data by the MTCD.

As specific examples of the resources of upper nodes, the following five (1) to (5) are disclosed; (1) radio control link between an MTCD and an eNB, (2) radio data link between an MTCD and an eNB, (3) radio access bearer between an eNB and an S-GW, (4) registration information of an MTCD on an HSS, and (5) configuration of a communication path between an S-GW and a P-GW. The resource may be one or a plurality of them.

Figure 43:
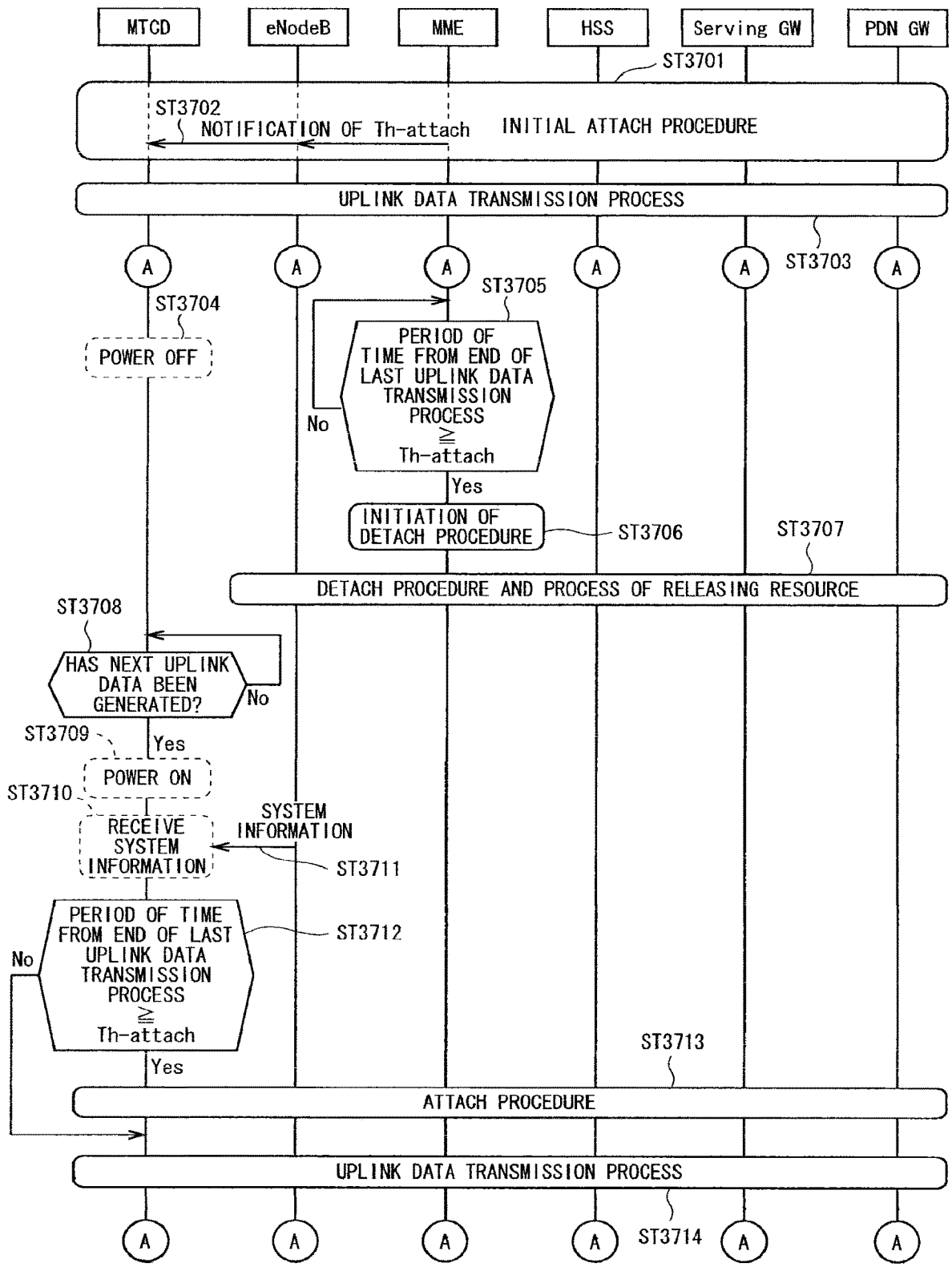
FIG. 43 is a diagram showing a sequence of the method of avoiding uplink congestion in a tenth embodiment.

FIG. 43 is a diagram showing a sequence of the method of avoiding uplink congestion in a tenth embodiment. In Step ST3701, an MTCD performs the initial attach procedure. The method described in TS 23.401 V9.4.0 (hereinafter, referred to as "Non-Patent Document 15") by 3GPP may be applied as this attach procedure. Attach procedure is initiated upon RACH transmission from the MTCD. In this initial attach procedure, in Step ST3702, an MME notifies an eNB of Th-attach, which is a threshold for judging whether or not attach procedure is required, contained in the attach accept message on S1 signaling. The eNB that has received Th-attach notifies an MTCD of the received information contained in an RRC connection reconfiguration message. In Step ST3703, the MTCD performs the uplink data transmission process. The uplink data transmission process is performed via one or a plurality of nodes of the MTCD, eNB, MME, HSS, serving GW (S-GW), and PDN GW (P-GW).

After performing the uplink data transmission process in Step ST3703, the MTCD may turn off power in Step ST3704. In Step ST3705, the MME that has finished the uplink data transmission process from the MTCD in Step ST3703 judges whether or not the period of time from the last uplink data transmission process is equal to or more than Th-attach. In a case where the period of time from the last uplink data transmission process is less than Th-attach, the MME returns to Step ST3705 and performs the judging process in Step ST3705 again. In the case where the period of time from the last uplink data transmission process is equal to or more than Th-attach, the MME moves to Step ST3706 and initiates detach procedure. In Step ST3707, the detach procedure and the process of releasing of a resource are performed by the eNB, and the MME, HSS, S-GW or P-GW that is an upper node. Accordingly, the reserved resource of the upper node is released, which can be used for communication with another user equipment.

In Step ST3708, the MTCD judges whether or not the next uplink data has been generated and, in a case where the next uplink data has not been generated, returns to Step ST3708 and repeats the judging process of Step ST3708 again. In a case where the next uplink data has been generated, the MTCD moves to the judging process of Step ST3712. In a case of turning off power in Step ST3704, the MTCD turns on power in Step ST3709 and, in Step ST3710, receives the system information broadcast from the eNB in Step ST3711.

In a case where the MTCD does not turn of power in Step ST3704, the reception of the system information in Step ST3710 may be appropriately performed. The MTCD may selectively and partially turn off power in Step ST3704 for recognizing whether or not the next uplink data has been generated. For example, power of one or a plurality of the frequency converting unit 806, modulating unit 805, demodulating unit 808, encoding unit 804, and decoding unit 809 shown in FIG. 8 described above may be turned off. Any one or a plurality of the transmission data buffer unit 803, application unit 802, protocol processing unit 801, and control unit 810 may judge whether or not the uplink data has been generated. This enables to judge the presence or absence of the generation of the next uplink data while reducing power consumption.

Alternatively, in a case where the time for power-on is set in advance or in a case where the time for power-on is notified from an MTC server in advance, the process of judging the presence or absence of the generation of the next uplink data in Step ST3708 may be performed after power-on. Accordingly, power is not turned on depending on the generation of the presence or absence of the next uplink data, but power can be turned on at a preset time.

In Step ST3712, the MTCD judges whether or not the period of time from the end of the last uplink data transmission process is equal to or more than Th-attach. In the case where the period of time from the last uplink data transmission process is less than Th-attach, the MTCD judges that the upper node has not initiated detach procedure and performs the uplink data transmission process in Step ST3714 without performing attach procedure of Step ST3713. In a case where the period of time from the last uplink data transmission process is equal to or more than Th-attach, the MTCD judges that the upper node has initiated detach procedure. Then, the MTCD performs attach procedure in Step ST3713, and after that, performs the uplink data transmission process in Step ST3714.

After that, each node returns to A and repeats the processes from Step ST3704 to Step ST3714.

As described above, the upper node performs detach procedure in the case where a predetermined period of time has elapsed from the last uplink data transmission process. This avoids the necessity for performing attach procedure without fail in the next uplink data transmission or power-on after the MTCD ends the uplink data transmission process, and thus, an increase of uplink RACHs can be prevented. Further, the MTCD can judge whether or not attach procedure is required in transmitting the next uplink data or power-on, depending on whether or not a predetermined period of time has elapsed from the last uplink data transmission process. This achieves effects that uplink congestion due to an increase of uplink RACHs can be avoided and that the MTCD can perform uplink data transmission. Accordingly, it is possible to construct a communication system capable of M2M communication while keeping the communication optimum for H2H.

Whether or not a predetermined period of time has elapsed from the last uplink data transmission process corresponds to a prediction condition being a condition that it is predicted that the base station device disconnects the communication with a user equipment. In addition, a lapse of a predetermined period of time from the last uplink data transmission process means that the prediction condition is satisfied.

The attach necessary/unnecessary information is not limited to a predetermined period of time, which may be the information regarding whether or not attach procedure is required in the transmission or power-on by an MTCD. This enables to achieve similar effects.

First Modification of Tenth Embodiment

In a case where a threshold for judging whether or not attach procedure is required is provided to judge whether or not attach procedure is required in the next transmission or power-on by an MTCD in accordance with the threshold, at times, it is preferred to perform attach procedure, that is, registration when, for example, an MTCD moves to another tracking area (TA) even if the period of time until the next transmission is within the threshold. This is because in a case where the MTCD moves to another TA, an upper node to be connected is changed, which requires resource reconfiguration. Therefore, if attach procedure is not performed when the MTCD moves to another TA, a resource is not reconfigured, and the resource of the node connected in the old TA is kept reserved, causing an unnecessary resource. In addition, the upper node is not changed and the resource is not configured in the new TA, which makes communication impossible.

The present modification discloses the method for solving those problems. As an indicator for judging whether or not attach procedure is required in the next transmission or power-on by an MTCD, whether or not the MTCD is located within a predetermined cell is added. As a specific example, it suffices that whether or not the cell selected when an MTCD performs the next transmission or turns on power is included in a predetermined list is used as an indicator for judgment. The following three (1) to (3) are disclosed as specific examples of the predetermined list; (1) TA list, (2) cell list per MTC service, and (3) cell list per MTC group.

An upper node notifies an MTCD of a predetermined list in advance. The method of notifying the information regarding whether or not attach procedure is required in the transmission or power-on by an MTCD, which has been disclosed in the tenth embodiment, may be applied as the notification method.

Figure 44:
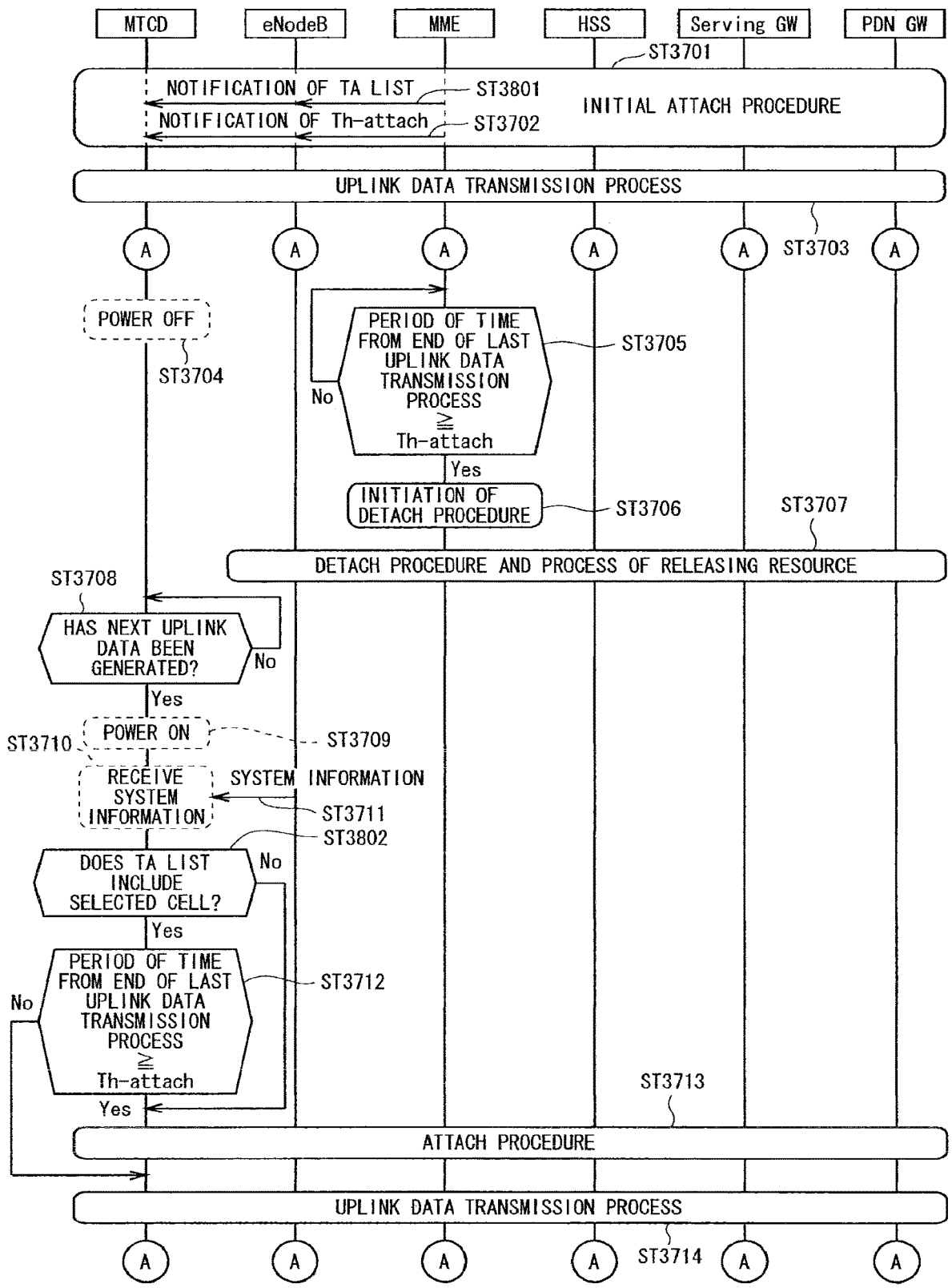
FIG. 44 is a diagram showing a sequence of the method of avoiding uplink congestion in a first modification of the tenth embodiment.

FIG. 44 is a diagram showing a sequence of the method of avoiding uplink congestion in the first modification of the tenth embodiment. In FIG. 44, the steps corresponding to the steps shown in FIG. 43 above are denoted by the same reference symbols, and the common description is omitted. FIG. 44 shows a case in which whether or not the cell selected by an MTCD is included in a TA list is added as an indicator for judgment.

In Step ST3801, an MME notifies an eNB of the TA list in the initial attach procedure from an MTCD, and the eNB notifies the MTCD of the TA list notified from the MME. For example, the MME notifies the eNB of the TA list contained in an attach accept message on S1 signaling, and the eNB notifies the MTCD of the TA list contained in an RRC connection reconfiguration message.

The MTCD judges that the next uplink data has been generated in Step ST3708, turns on power in Step ST3709, receives system information in Step ST3710, and then judges whether or not the selected cell is included in the TA list in Step ST3802. The MTCD receives the system information from the selected cell, receives a TAC or TAI in the received system information, and judges whether or not the received TAC or TAI is included in the TA list received in Step ST3801. In a case where the selected TAC or TAI is included in the TA list, the MTCD performs the above-mentioned process of Step ST3712. In a case where the selected TAC or TAI is not included in the TA list, the MTCD performs attach procedure of Step ST3713 without performing the process of Step ST3712. That is, the MTCD performs attach procedure irrespective of the period of time from the end of the last uplink data transmission process.

The method disclosed in the present modification enables to change an upper node and configure a resource in a new TA in a case where the MTCD moves from the TA in the TA list to another TA outside the TA list, which allows communication. Further, the resources of the upper nodes in the original TA are also released, whereby it is possible to increase the efficiency of using radio resources. In a case where the MTCD does not moves from the TA in the TA list, the effects that uplink congestion due to an increase of uplink RACHs can be avoided and that the MTCD can transmit uplink data are achieved.

The methods disclosed in the present invention are applicable not only to eNBs/NBs, but also to so-called local nodes such as HeNB, HNB, pico eNB (LTE pico cell (EUTRAN pico cell)), pico NB (WCDMA pico cell (UTRAN pico cell)), node for hotzone cells, relay node, and remote radio head (RRH). The methods disclosed in the present invention are applied to a local node that supports MTC service, which enables to avoid problems of downlink congestion and uplink congestion and problems arising therefrom.

While the LTE system (E-UTRAN) has been mainly described in the respective embodiments, the communication system of the present invention is also applicable to the W-CDMA system (UTRAN, UMTS) and LTE-Advanced.

While the invention has been shown and described in detail, the foregoing description is in all aspects illustrative and not restrictive. It is therefore understood that numerous modifications and variations can be devised without departing from the scope of the invention.

DESCRIPTION OF REFERENCE SYMBOLS

1301 to 1304 MTCD, 1305 NB/eNB, 1306 SGSN/MME, 1307 HLR/HSS, 1308 MTC server, 1309 MTC user, 1310 API, 1311 to 1314 Uu interface, 1315 IuPS/S1 interface, 1316 Gr/S6a interface, 1317 communication operator domain.

The invention claimed is:

1. A communication system comprising:
a terminal device; and
a base station configured to perform radio communication with the terminal device, wherein
machine type communication (MTC) control information that is control information for MTC is transmitted from the base station to the terminal device using a MTC control channel that is a control channel for MTC, and
the MTC control information includes radio resource information that is information of a radio resource for transmitting data for MTC.

2. The communication system according to claim 1, wherein
the terminal device is configured to receive the MTC control channel to obtain the MTC control information for the terminal device itself.

3. The communication system according to claim 1, wherein
the terminal device is configured to receive data for MTC based on the MTC control information.

4. The communication system according to claim 1, wherein
the MTC control channel is a common channel that can be commonly used by a plurality of terminal devices.

5. The communication system according to claim 1, wherein
radio resource information that is information of a radio resource for transmitting the MTC control channel is transmitted from the base station to the terminal device.

6. The communication system according to claim 5, wherein
the radio resource for transmitting the MTC control channel is periodically provided.

7. The communication system according to claim 6, wherein
the radio resource information includes a cycle of the radio resource.

8. The communication system according to claim 1, wherein
the base station identifies the MTC control channel to the terminal device via a temporary identifier of the MTC control channel.

9. A terminal device, which is configured to perform radio communication with a base station, wherein
the terminal device is configured to receive machine type communication (MTC) control information that is control information for MTC from the base station using a MTC control channel that is a control channel for MTC, and
the MTC control information includes radio resource information that is information of a radio resource for transmitting data for MTC.

10. The terminal device according to claim 9, wherein
the terminal device identifies the MTC control channel via a temporary identifier of the MTC control channel.

11. A base station, which is configured to perform radio communication with a terminal device, wherein
the base station is configured to transmit machine type communication (MTC) control information that is control information for MTC to the terminal device using a MTC control channel that is a control channel for MTC, and
the MTC control information includes radio resource information that is information of a radio resource for transmitting data for MTC.

12. The base station according to claim 11, wherein
the base station identifies the MTC control channel to the terminal device via a temporary identifier of the MTC control channel.

* * * * *